(12) United States Patent
Huang et al.

(10) Patent No.: US 12,505,478 B2
(45) Date of Patent: *Dec. 23, 2025

(54) SYSTEM AND METHOD FOR A REAL-TIME EGOCENTRIC COLLABORATIVE FILTER ON LARGE DATASETS

(71) Applicant: Palo Alto Research Center Incorporated, Palo Alto, CA (US)

(72) Inventors: Eric Huang, San Francisco, CA (US); Rong Zhou, San Jose, CA (US)

(73) Assignee: Xerox Corporation, Webster, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/871,285

(22) Filed: Jul. 22, 2022

(65) Prior Publication Data

US 2022/0358563 A1    Nov. 10, 2022

Related U.S. Application Data

(63) Continuation of application No. 15/074,922, filed on Mar. 18, 2016, now Pat. No. 11,436,656.

(51) Int. Cl.
*G06Q 30/0601*    (2023.01)
(52) U.S. Cl.
CPC ..... *G06Q 30/0631* (2013.01); *G06Q 30/0643* (2013.01)
(58) Field of Classification Search
None
See application file for complete search history.

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| AU | 2017202840 A1 | 5/2017 |
| CA | 2335801 | 5/2002 |

(Continued)

OTHER PUBLICATIONS

Rodriguez, Marko A., and Peter Neubauer. "The Graph Traversal Pattern." Graph Data Management, IGI Global, pp. 29-46. Crossref, https://doi.org/10.4018/978-1-61350-053-8.ch002. (Year: 2010).*

(Continued)

*Primary Examiner* — Michelle T Kringen
(74) *Attorney, Agent, or Firm* — Cesari and McKenna, LLP; Steven M. Mills

(57) ABSTRACT

One embodiment of the present invention provides a system for generating a product recommendation. During operation, the system obtains data indicating vertices and edges of a graph. The vertices represent consumers and products and an edge represents an access relationship. The system may receive a query indicating an ego for determining a product recommendation. The system may then traverse the graph from a vertex representing the ego through a plurality of edges to a plurality of vertices representing products. The system may traverse the graph from the plurality of vertices representing products to a plurality of vertices representing other consumers. The system may then traverse the graph from the plurality of vertices representing other consumers to a plurality of vertices representing other products. The system may generate a recommendation that based on the plurality of vertices representing other products.

16 Claims, 15 Drawing Sheets

(56) References Cited

U.S. PATENT DOCUMENTS

| | | |
|---|---|---|
| 4,921,898 A | 5/1990 | Lenney |
| 5,070,134 A | 12/1991 | Oyamada et al. |
| 5,110,856 A | 5/1992 | Oyamada et al. |
| 5,214,702 A | 5/1993 | Fischer |
| 5,361,340 A | 11/1994 | Kelly et al. |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 5,895,470 A | 4/1999 | Pirolli et al. |
| 5,966,534 A | 10/1999 | Cooke et al. |
| 6,021,403 A | 2/2000 | Horvitz |
| 6,037,976 A | 3/2000 | Wixson |
| 6,052,683 A | 4/2000 | Irwin |
| 6,085,320 A | 7/2000 | Kaliski, Jr. |
| 6,091,724 A | 7/2000 | Chandra |
| 6,131,110 A | 10/2000 | Bates et al. |
| 6,134,532 A | 10/2000 | Lazarus et al. |
| 6,173,364 B1 | 1/2001 | Zenchelsky |
| 6,175,831 B1 | 1/2001 | Weinreich et al. |
| 6,226,618 B1 | 5/2001 | Downs |
| 6,233,617 B1 | 5/2001 | Rothwein |
| 6,233,646 B1 | 5/2001 | Hahm |
| 6,249,807 B1 | 6/2001 | Shaw et al. |
| 6,320,495 B1 | 11/2001 | Sporgis |
| 6,332,158 B1 | 12/2001 | Risley |
| 6,338,066 B1 | 1/2002 | Martin et al. |
| 6,345,253 B1 | 2/2002 | Viswanathan |
| 6,366,988 B1 | 4/2002 | Skiba |
| 6,385,619 B1 | 5/2002 | Eichstaedt |
| 6,393,479 B1 | 5/2002 | Glommen et al. |
| 6,408,288 B1 | 6/2002 | Ariyoshi |
| 6,438,579 B1 | 8/2002 | Hosken |
| 6,456,234 B1 | 9/2002 | Johnson |
| 6,487,539 B1 | 11/2002 | Aggarwal et al. |
| 6,523,063 B1 | 2/2003 | Miller et al. |
| 6,526,351 B2 | 2/2003 | Whitham |
| 6,546,393 B1 | 4/2003 | Khan |
| 6,574,377 B1 | 6/2003 | Cahill |
| 6,587,835 B1 | 7/2003 | Treyz et al. |
| 6,654,735 B1 | 11/2003 | Eichstaedt |
| 6,654,792 B1 | 11/2003 | Verma |
| 6,667,957 B1 | 12/2003 | Corson |
| 6,680,675 B1 | 1/2004 | Suzuki |
| 6,681,220 B1 | 1/2004 | Kaplan |
| 6,681,326 B2 | 1/2004 | Son |
| 6,691,106 B1 | 2/2004 | Sathyanarayan |
| 6,714,778 B2 | 3/2004 | Nykanen et al. |
| 6,732,273 B1 | 5/2004 | Byers |
| 6,756,882 B2 | 6/2004 | Benes et al. |
| 6,769,066 B1 | 7/2004 | Botros |
| 6,772,333 B1 | 8/2004 | Brendel |
| 6,816,884 B1 | 11/2004 | Summers et al. |
| 6,853,982 B2 | 2/2005 | Smith et al. |
| 6,862,280 B1 | 3/2005 | Bertagna |
| 6,901,452 B1 | 5/2005 | Bertagna |
| 6,917,985 B2 | 7/2005 | Madruga |
| 6,968,179 B1 | 11/2005 | De Vries |
| 6,968,393 B1 | 11/2005 | Chen |
| 6,981,029 B1 | 12/2005 | Menditto |
| 6,981,040 B1 | 12/2005 | Konig et al. |
| 7,013,308 B1 | 3/2006 | Tunstall-Pedoe |
| 7,013,389 B1 | 3/2006 | Srivastava |
| 7,031,308 B2 | 4/2006 | Garcia-Luna-Aceves |
| 7,043,475 B2 | 5/2006 | Heer et al. |
| 7,061,877 B1 | 6/2006 | Gummalla |
| 7,130,622 B2 | 10/2006 | Vanska et al. |
| 7,152,094 B1 | 12/2006 | Jannu |
| 7,171,046 B2 | 1/2007 | Myers et al. |
| 7,177,646 B2 | 2/2007 | ONeill |
| 7,191,159 B2 | 3/2007 | Horvitz et al. |
| 7,194,454 B2 | 3/2007 | Hansen et al. |
| 7,200,637 B1 | 4/2007 | Klos et al. |
| 7,203,909 B1 | 4/2007 | Horvitz et al. |
| 7,206,860 B2 | 4/2007 | Murakami |
| 7,206,861 B1 | 4/2007 | Callon |
| 7,210,326 B2 | 5/2007 | Kawamoto |
| 7,213,260 B2 | 5/2007 | Judge |
| 7,231,607 B2 | 6/2007 | Neely et al. |
| 7,243,130 B2 | 7/2007 | Horvitz et al. |
| 7,246,159 B2 | 7/2007 | Aggarwal |
| 7,257,837 B2 | 8/2007 | Xu |
| 7,260,573 B1 | 8/2007 | Jeh et al. |
| 7,269,650 B2 | 9/2007 | Hamdan |
| 7,287,275 B2 | 10/2007 | Moskowitz |
| 7,305,436 B2 | 12/2007 | Willis |
| 7,315,541 B1 | 1/2008 | Housel |
| 7,315,883 B2 | 1/2008 | Fair et al. |
| 7,339,929 B2 | 3/2008 | Zelig |
| 7,346,668 B2 | 3/2008 | Willis |
| 7,346,703 B2 | 3/2008 | Cope |
| 7,349,827 B1 | 3/2008 | Heller et al. |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,401,087 B2 | 7/2008 | Copperman et al. |
| 7,430,755 B1 | 9/2008 | Hughes |
| 7,444,251 B2 | 10/2008 | Nikovski |
| 7,466,223 B2 | 12/2008 | Sefton |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,526,458 B2 | 4/2009 | Flinn et al. |
| 7,542,471 B2 | 6/2009 | Samuels |
| 7,543,031 B2 | 6/2009 | Heidloff et al. |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,565,425 B2 | 7/2009 | Van Fleet et al. |
| 7,567,547 B2 | 7/2009 | Mosko |
| 7,567,946 B2 | 7/2009 | Andreoli |
| 7,577,522 B2 | 8/2009 | Rosen |
| 7,580,971 B1 | 8/2009 | Gollapudi |
| 7,603,112 B2 | 10/2009 | Huomo et al. |
| 7,623,535 B2 | 11/2009 | Guichard |
| 7,639,840 B2 | 12/2009 | Hanna et al. |
| 7,647,507 B1 | 1/2010 | Feng |
| 7,652,594 B2 | 1/2010 | Lamont et al. |
| 7,660,324 B2 | 2/2010 | Oguchi |
| 7,668,885 B2 | 2/2010 | Wittke et al. |
| 7,685,290 B2 | 3/2010 | Satapati |
| 7,698,463 B2 | 4/2010 | Ogier |
| 7,698,559 B1 | 4/2010 | Chaudhury |
| 7,707,226 B1 | 4/2010 | Tonse |
| 7,716,651 B2 | 5/2010 | Cukierman et al. |
| 7,739,338 B2 | 6/2010 | Taylor |
| 7,739,602 B2 | 6/2010 | Feng et al. |
| 7,743,050 B1 | 6/2010 | Bem et al. |
| 7,765,470 B2 | 7/2010 | Epstein |
| 7,769,887 B1 | 8/2010 | Bhattacharyya |
| 7,779,467 B2 | 8/2010 | Choi |
| 7,801,177 B2 | 9/2010 | Luss |
| 7,809,601 B2 | 10/2010 | Shaya et al. |
| 7,816,441 B2 | 10/2010 | Elizalde |
| 7,831,670 B2 | 11/2010 | Goodman et al. |
| 7,831,707 B2 | 11/2010 | Bardsley |
| 7,831,733 B2 | 11/2010 | Sultan |
| 7,831,928 B1 | 11/2010 | Rose et al. |
| 7,835,578 B2 | 11/2010 | Cheng et al. |
| 7,885,844 B1 | 2/2011 | Cohen et al. |
| 7,886,011 B2 | 2/2011 | Buchheit |
| 7,908,337 B2 | 3/2011 | Garcia-Luna-Aceves |
| 7,924,837 B1 | 4/2011 | Shabtay |
| 7,945,653 B2 | 5/2011 | Zuckerberg et al. |
| 7,949,574 B2 | 5/2011 | Patel et al. |
| 7,953,014 B2 | 5/2011 | Toda |
| 7,953,885 B1 | 5/2011 | Devireddy |
| 7,984,006 B2 | 7/2011 | Price |

(56) References Cited

U.S. PATENT DOCUMENTS

| | | |
|---|---|---|
| 8,000,267 B2 | 8/2011 | Solis |
| 8,010,669 B2 | 8/2011 | Sathish |
| 8,010,691 B2 | 8/2011 | Kollmansberger |
| 8,060,406 B2 | 11/2011 | Blegen |
| 8,074,289 B1 | 12/2011 | Carpentier |
| 8,095,523 B2 | 1/2012 | Brave et al. |
| 8,103,729 B2 | 1/2012 | Tornabene et al. |
| 8,117,441 B2 | 2/2012 | Kurien |
| 8,135,718 B1 | 3/2012 | Das et al. |
| 8,145,512 B1 | 3/2012 | Henne |
| 8,160,069 B2 | 4/2012 | Jacobson |
| 8,165,985 B2 | 4/2012 | Stefik |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,460 B2 | 8/2012 | Meek et al. |
| 8,255,468 B2 | 8/2012 | Vitaldevara et al. |
| 8,271,413 B2 | 9/2012 | Agarwal et al. |
| 8,271,578 B2 | 9/2012 | Sheffi |
| 8,296,351 B2 | 10/2012 | Lazaridis et al. |
| 8,307,029 B2 | 11/2012 | Davis et al. |
| 8,312,064 B1 | 11/2012 | Gauvin |
| 8,356,044 B2 | 1/2013 | Stefik et al. |
| 8,386,622 B2 | 2/2013 | Jacobson |
| 8,428,614 B2 | 4/2013 | Wolfe |
| 8,428,777 B1 | 4/2013 | Poursohi |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,489,599 B2 | 7/2013 | Bellotti |
| 8,499,047 B2 | 7/2013 | Weyer et al. |
| 8,515,459 B2 | 8/2013 | Busch |
| 8,522,257 B2 | 8/2013 | Rupp et al. |
| 8,525,665 B1 | 9/2013 | Trundle et al. |
| 8,533,742 B2 | 9/2013 | Ginis |
| 8,549,013 B1 | 10/2013 | Sarma et al. |
| 8,553,562 B2 | 10/2013 | Allan |
| 8,554,703 B1 | 10/2013 | Lin |
| 8,572,214 B2 | 10/2013 | Garcia-Luna-Aceves |
| 8,589,494 B2 | 11/2013 | Garrett |
| 8,595,234 B2 | 11/2013 | Siripurapu et al. |
| 8,600,920 B2 | 12/2013 | Flynn |
| 8,606,297 B1 | 12/2013 | Simkhai et al. |
| 8,606,781 B2 | 12/2013 | Chi et al. |
| 8,620,764 B2 | 12/2013 | Moritz et al. |
| 8,654,649 B2 | 2/2014 | Vasseur |
| 8,661,046 B2 | 2/2014 | King |
| 8,665,757 B2 | 3/2014 | Kling |
| 8,667,172 B2 | 3/2014 | Ravindran |
| 8,676,929 B2 | 3/2014 | Lazaridis et al. |
| 8,677,451 B1 | 3/2014 | Bhimaraju |
| 8,688,619 B1 | 4/2014 | Ezick |
| 8,694,901 B2 | 4/2014 | Falchuk et al. |
| 8,699,350 B1 | 4/2014 | Kumar |
| 8,713,612 B2 | 4/2014 | Levy et al. |
| 8,718,055 B2 | 5/2014 | Vasseur |
| 8,719,391 B2 | 5/2014 | Hämäläinen et al. |
| 8,732,584 B2 | 5/2014 | Lee et al. |
| 8,738,431 B2 | 5/2014 | Elliott et al. |
| 8,750,820 B2 | 6/2014 | Allan |
| 8,761,022 B2 | 6/2014 | Chiabaut |
| 8,762,302 B1 | 6/2014 | Spivack |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,799,302 B2 | 8/2014 | Singerman et al. |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,868,472 B1 | 10/2014 | Lin |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,938,503 B2 | 1/2015 | Shoen et al. |
| 8,972,969 B2 | 3/2015 | Gaither |
| 8,977,596 B2 | 3/2015 | Montulli |
| 9,015,099 B2 | 4/2015 | Nitz et al. |
| 9,071,498 B2 | 6/2015 | Beser |
| 9,081,853 B2 | 7/2015 | Rao et al. |
| 9,098,834 B2 | 8/2015 | Ramanathaiah et al. |
| 9,112,895 B1 | 8/2015 | Lin |
| 9,137,190 B2 | 9/2015 | Nairn et al. |
| 9,195,640 B1 | 11/2015 | Donneau-Golencer |
| 9,195,765 B2 | 11/2015 | Russell et al. |
| 9,195,989 B2 | 11/2015 | Bosworth et al. |
| 9,208,439 B2 | 12/2015 | Roberts et al. |
| 9,245,010 B1 | 1/2016 | Donneau-Golencer et al. |
| 9,245,238 B2 | 1/2016 | Mejia et al. |
| 9,256,785 B2 | 2/2016 | Qvarfordt |
| 9,280,911 B2 | 3/2016 | Sadeh-Koniecpol |
| 9,286,391 B1 | 3/2016 | Dykstra |
| 9,374,434 B2 | 6/2016 | Sylvain |
| 9,467,530 B2 | 10/2016 | Belimpasakis et al. |
| 9,507,851 B1* | 11/2016 | Marquie ............ G06F 16/9535 |
| 9,589,560 B1 | 3/2017 | Vitaladevuni |
| 9,600,561 B2 | 3/2017 | Bhargava et al. |
| 9,659,214 B1 | 5/2017 | Kennedy |
| 9,691,073 B2 | 6/2017 | Tseng et al. |
| 9,715,543 B2 | 7/2017 | Macadaan et al. |
| 9,906,539 B2 | 2/2018 | Higbee et al. |
| 10,095,988 B2 | 10/2018 | Tseng et al. |
| 10,242,258 B2 | 3/2019 | Guo et al. |
| 10,304,066 B2 | 5/2019 | Tseng et al. |
| 10,330,440 B2 | 6/2019 | Lyren |
| 10,394,919 B2 | 8/2019 | Reese et al. |
| 10,438,130 B2 | 10/2019 | Rossi et al. |
| 10,885,478 B2 | 1/2021 | Roberts et al. |
| 11,093,834 B2 | 8/2021 | Ahern et al. |
| 11,127,020 B2 | 9/2021 | Partridge |
| 11,301,524 B2 | 4/2022 | Bhargava et al. |
| 11,436,656 B2 | 9/2022 | Huang et al. |
| 11,475,360 B2 | 10/2022 | Rossi et al. |
| 11,477,302 B2 | 10/2022 | Roberts et al. |
| 11,550,455 B2 | 1/2023 | Rossi et al. |
| 11,599,709 B2 | 3/2023 | Maxwell et al. |
| 12,242,580 B1 | 3/2025 | Philbrick |
| 2001/0032193 A1 | 10/2001 | Ferber |
| 2002/0010795 A1 | 1/2002 | Brown |
| 2002/0022516 A1 | 2/2002 | Forden |
| 2002/0038296 A1 | 3/2002 | Margolus |
| 2002/0046281 A1 | 4/2002 | Cope et al. |
| 2002/0048269 A1 | 4/2002 | Hong |
| 2002/0052781 A1 | 5/2002 | Aufricht et al. |
| 2002/0054593 A1 | 5/2002 | Morohashi |
| 2002/0077988 A1 | 6/2002 | Sasaki |
| 2002/0078066 A1 | 6/2002 | Robinson |
| 2002/0082910 A1 | 6/2002 | Kontogouris |
| 2002/0098891 A1 | 7/2002 | Graham et al. |
| 2002/0103698 A1 | 8/2002 | Cantrell |
| 2002/0111172 A1 | 8/2002 | DeWolf et al. |
| 2002/0138551 A1 | 9/2002 | Erickson |
| 2002/0143802 A1 | 10/2002 | Chi et al. |
| 2002/0152305 A1 | 10/2002 | Jackson |
| 2002/0164977 A1 | 11/2002 | Link, II et al. |
| 2002/0167939 A1* | 11/2002 | Weissman-Berman ................ H04L 67/34 370/352 |
| 2002/0173295 A1 | 11/2002 | Nykanen et al. |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0033394 A1 | 2/2003 | Stine |
| 2003/0046396 A1 | 3/2003 | Richter |
| 2003/0046437 A1 | 3/2003 | Eytchison |

(56) References Cited

U.S. PATENT DOCUMENTS

| | | |
|---|---|---|
| 2003/0048793 A1 | 3/2003 | Pochon |
| 2003/0051100 A1 | 3/2003 | Patel |
| 2003/0061384 A1 | 3/2003 | Nakatani |
| 2003/0063072 A1 | 4/2003 | Brandenberg et al. |
| 2003/0065731 A1 | 4/2003 | Mohammed et al. |
| 2003/0074409 A1 | 4/2003 | Bentley |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0163365 A1 | 8/2003 | Farnes |
| 2003/0200192 A1 | 10/2003 | Bell et al. |
| 2003/0229632 A1 | 12/2003 | Harris |
| 2003/0229892 A1 | 12/2003 | Sardera |
| 2004/0012625 A1 | 1/2004 | Lei et al. |
| 2004/0019603 A1 | 1/2004 | Haigh et al. |
| 2004/0024879 A1 | 2/2004 | Dingman |
| 2004/0030602 A1 | 2/2004 | Rosenquist |
| 2004/0059626 A1 | 3/2004 | Smallwood |
| 2004/0059736 A1 | 3/2004 | Willse |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0111477 A1 | 6/2004 | Boss et al. |
| 2004/0139230 A1 | 7/2004 | Kim |
| 2004/0141003 A1 | 7/2004 | Nivers et al. |
| 2004/0176966 A1 | 9/2004 | Chen |
| 2004/0199587 A1 | 10/2004 | McKnight |
| 2004/0215509 A1 | 10/2004 | Perry |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0138049 A1 | 6/2005 | Linden |
| 2005/0144000 A1 | 6/2005 | Yamasaki et al. |
| 2005/0149508 A1 | 7/2005 | Deshpande |
| 2005/0159823 A1 | 7/2005 | Hayes |
| 2005/0198351 A1 | 9/2005 | Nog |
| 2005/0216434 A1 | 9/2005 | Haveliwala et al. |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010240 A1 | 1/2006 | Chuah |
| 2006/0010249 A1 | 1/2006 | Sabesan |
| 2006/0020662 A1 | 1/2006 | Robinson |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0095457 A1 | 5/2006 | Glasspool |
| 2006/0099973 A1 | 5/2006 | Nair |
| 2006/0109237 A1 | 5/2006 | Morita et al. |
| 2006/0129444 A1 | 6/2006 | Baeza |
| 2006/0129514 A1 | 6/2006 | Watanabe |
| 2006/0133343 A1 | 6/2006 | Huang |
| 2006/0143278 A1 | 6/2006 | Bauchot et al. |
| 2006/0146686 A1 | 7/2006 | Kim |
| 2006/0156222 A1 | 7/2006 | Chi et al. |
| 2006/0173831 A1 | 8/2006 | Basso |
| 2006/0193295 A1 | 8/2006 | White |
| 2006/0200523 A1 | 9/2006 | Tokuda et al. |
| 2006/0200834 A1 | 9/2006 | Cukierman et al. |
| 2006/0203804 A1 | 9/2006 | Whitmore |
| 2006/0206445 A1 | 9/2006 | Andreoli |
| 2006/0206569 A1 | 9/2006 | Heidloff et al. |
| 2006/0206578 A1 | 9/2006 | Heidloff et al. |
| 2006/0215684 A1 | 9/2006 | Capone |
| 2006/0223504 A1 | 10/2006 | Ishak |
| 2006/0224552 A1 | 10/2006 | Riezler et al. |
| 2006/0235689 A1 | 10/2006 | Sugihara |
| 2006/0235696 A1 | 10/2006 | Bennett |
| 2006/0256767 A1 | 11/2006 | Suzuki |
| 2006/0268792 A1 | 11/2006 | Belcea |
| 2007/0019619 A1 | 1/2007 | Foster |
| 2007/0038777 A1 | 2/2007 | Low et al. |
| 2007/0061195 A1 | 3/2007 | Liu et al. |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0124721 A1 | 5/2007 | Cowing et al. |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0185744 A1 | 8/2007 | Robertson |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0233736 A1 | 10/2007 | Xiong |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0260596 A1 | 11/2007 | Koran |
| 2007/0260627 A1 | 11/2007 | Knittel et al. |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2007/0300174 A1 | 12/2007 | Macbeth |
| 2008/0005056 A1 | 1/2008 | Stelzig |
| 2008/0010366 A1 | 1/2008 | Duggan |
| 2008/0037420 A1 | 2/2008 | Tang |
| 2008/0039203 A1 | 2/2008 | Ackley et al. |
| 2008/0040126 A1 | 2/2008 | Estrada et al. |
| 2008/0043989 A1 | 2/2008 | Furutono |
| 2008/0046340 A1 | 2/2008 | Brown |
| 2008/0059631 A1 | 3/2008 | Bergstrom |
| 2008/0077569 A1 | 3/2008 | Lee et al. |
| 2008/0080440 A1 | 4/2008 | Yarvis |
| 2008/0098420 A1 | 4/2008 | Khivesara et al. |
| 2008/0101357 A1 | 5/2008 | Iovanna |
| 2008/0107034 A1 | 5/2008 | Jetcheva |
| 2008/0107259 A1 | 5/2008 | Satou |
| 2008/0114639 A1 | 5/2008 | Meek et al. |
| 2008/0123862 A1 | 5/2008 | Rowley |
| 2008/0133444 A1 | 6/2008 | Gao et al. |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0172363 A1 | 7/2008 | Wang et al. |
| 2008/0178081 A1 | 7/2008 | Reshef |
| 2008/0186901 A1 | 8/2008 | Itagaki |
| 2008/0200153 A1 | 8/2008 | Fitzpatrick |
| 2008/0205775 A1 | 8/2008 | Brinker et al. |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0294617 A1 | 11/2008 | Chakrabarti et al. |
| 2008/0297589 A1 | 12/2008 | Kurtz |

(56) References Cited

U.S. PATENT DOCUMENTS

| | | |
|---|---|---|
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0064053 A1 | 3/2009 | Crawford et al. |
| 2009/0067429 A1 | 3/2009 | Nagai |
| 2009/0077000 A1 | 3/2009 | Begole et al. |
| 2009/0077001 A1 | 3/2009 | Macready et al. |
| 2009/0077027 A1 | 3/2009 | King et al. |
| 2009/0077057 A1 | 3/2009 | Ducheneaut et al. |
| 2009/0077184 A1 | 3/2009 | Brewer |
| 2009/0089288 A1 | 4/2009 | Petersen |
| 2009/0092043 A1 | 4/2009 | Lapuh |
| 2009/0097631 A1 | 4/2009 | Gisby |
| 2009/0103515 A1 | 4/2009 | Pointer |
| 2009/0106040 A1 | 4/2009 | Jones |
| 2009/0113068 A1 | 4/2009 | Fujihira |
| 2009/0116393 A1 | 5/2009 | Hughes |
| 2009/0117922 A1 | 5/2009 | Bell |
| 2009/0125321 A1 | 5/2009 | Charlebois et al. |
| 2009/0132662 A1 | 5/2009 | Sheridan |
| 2009/0144272 A1 | 6/2009 | Adarsh et al. |
| 2009/0144300 A1 | 6/2009 | Chatley |
| 2009/0157828 A1 | 6/2009 | Agrawal |
| 2009/0157887 A1 | 6/2009 | Froment |
| 2009/0177541 A1 | 7/2009 | Martel et al. |
| 2009/0185745 A1 | 7/2009 | Momosaki |
| 2009/0193101 A1 | 7/2009 | Munetsugu |
| 2009/0204470 A1 | 8/2009 | Weyl et al. |
| 2009/0204471 A1 | 8/2009 | Elenbaas et al. |
| 2009/0210282 A1 | 8/2009 | Elenbaas et al. |
| 2009/0222344 A1 | 9/2009 | Greene |
| 2009/0224867 A1 | 9/2009 | O'Shaughnessy et al. |
| 2009/0228593 A1 | 9/2009 | Takeda |
| 2009/0234878 A1 | 9/2009 | Herz et al. |
| 2009/0234958 A1 | 9/2009 | Lee |
| 2009/0248819 A1 | 10/2009 | Hutchison et al. |
| 2009/0254572 A1 | 10/2009 | Redlich |
| 2009/0254971 A1 | 10/2009 | Herz et al. |
| 2009/0265764 A1 | 10/2009 | Schultz et al. |
| 2009/0268905 A1 | 10/2009 | Matsushima |
| 2009/0285209 A1 | 11/2009 | Stewart |
| 2009/0287835 A1 | 11/2009 | Jacobson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Karnath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0036856 A1 | 2/2010 | Portilla |
| 2010/0046546 A1 | 2/2010 | Ram |
| 2010/0057929 A1 | 3/2010 | Merat |
| 2010/0058346 A1 | 3/2010 | Narang |
| 2010/0064015 A1 | 3/2010 | Sacks et al. |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0106752 A1 | 4/2010 | Eckhardt, III |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0228582 A1 | 9/2010 | King et al. |
| 2010/0232402 A1 | 9/2010 | Przybysz |
| 2010/0232439 A1 | 9/2010 | Dham |
| 2010/0235516 A1 | 9/2010 | Nakamura |
| 2010/0241464 A1 | 9/2010 | Amigo et al. |
| 2010/0246549 A1 | 9/2010 | Zhang |
| 2010/0250497 A1 | 9/2010 | Redlich |
| 2010/0250939 A1 | 9/2010 | Adams |
| 2010/0262650 A1 | 10/2010 | Chauhan et al. |
| 2010/0268782 A1 | 10/2010 | Zombek |
| 2010/0272107 A1 | 10/2010 | Papp |
| 2010/0274628 A1 | 10/2010 | Kunz et al. |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0299275 A1 | 11/2010 | Greenspan |
| 2010/0322249 A1 | 12/2010 | Thathapudi |
| 2011/0013637 A1 | 1/2011 | Xue |
| 2011/0016161 A1 | 1/2011 | Loeb |
| 2011/0016206 A1 | 1/2011 | Kodialam et al. |
| 2011/0019674 A1 | 1/2011 | Iovanna |
| 2011/0022812 A1 | 1/2011 | vanderlinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0119302 A1 | 5/2011 | Gorman et al. |
| 2011/0125678 A1 | 5/2011 | Partridge |
| 2011/0138000 A1 | 6/2011 | Balasubramanian et al. |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161308 A1 | 6/2011 | Andersen |
| 2011/0161408 A1 | 6/2011 | Kim |
| 2011/0202609 A1 | 8/2011 | Chaturvedi |
| 2011/0219427 A1 | 9/2011 | Hito |
| 2011/0231578 A1 | 9/2011 | Nagappan |
| 2011/0239256 A1 | 9/2011 | Gholmieh |
| 2011/0246600 A1 | 10/2011 | Kageyama |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295612 A1 | 12/2011 | Donneau-Golencer et al. |
| 2011/0295783 A1 | 12/2011 | Zhao |
| 2011/0299454 A1 | 12/2011 | Krishnaswamy |
| 2011/0302169 A1 | 12/2011 | Brdiczka |
| 2011/0320550 A1 | 12/2011 | Lawson et al. |
| 2012/0001919 A1 | 1/2012 | Lumer |
| 2012/0011170 A1 | 1/2012 | Elad |
| 2012/0011551 A1 | 1/2012 | Levy |
| 2012/0016875 A1 | 1/2012 | Jin et al. |
| 2012/0023113 A1 | 1/2012 | Ferren |
| 2012/0023226 A1 | 1/2012 | Petersen |
| 2012/0036180 A1 | 2/2012 | Thornton |
| 2012/0041969 A1 | 2/2012 | Priyadarshan |
| 2012/0046966 A1 | 2/2012 | Chang et al. |
| 2012/0047361 A1 | 2/2012 | Erdmann |
| 2012/0066727 A1 | 3/2012 | Nozoe |
| 2012/0096114 A1 | 4/2012 | Mccolgan et al. |

(56) References Cited

U.S. PATENT DOCUMENTS

| | | |
|---|---|---|
| 2012/0102121 A1 | 4/2012 | Wu et al. |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0131020 A1 | 5/2012 | Nitz et al. |
| 2012/0135751 A1 | 5/2012 | Mishra |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166377 A1 | 6/2012 | Sathish et al. |
| 2012/0170913 A1 | 7/2012 | Isozaki |
| 2012/0179653 A1 | 7/2012 | Araki |
| 2012/0191716 A1 | 7/2012 | Omoigui |
| 2012/0197690 A1 | 8/2012 | Agulnek |
| 2012/0198048 A1 | 8/2012 | Ioffe |
| 2012/0209654 A1 | 8/2012 | Romagiano |
| 2012/0221150 A1 | 8/2012 | Arensmeier |
| 2012/0224487 A1 | 9/2012 | Hui |
| 2012/0226902 A1 | 9/2012 | Kim |
| 2012/0233207 A1 | 9/2012 | Mohajer |
| 2012/0257500 A1 | 10/2012 | Lynch |
| 2012/0257733 A1 | 10/2012 | Kosseifi et al. |
| 2012/0278127 A1 | 11/2012 | Kirakosyan et al. |
| 2012/0278300 A1 | 11/2012 | Soubbotin |
| 2012/0278388 A1 | 11/2012 | Kleinbart |
| 2012/0278473 A1 | 11/2012 | Griffiths |
| 2012/0284791 A1 | 11/2012 | Miller |
| 2012/0290520 A1 | 11/2012 | Frank |
| 2012/0290669 A1 | 11/2012 | Parks |
| 2012/0290919 A1 | 11/2012 | Melnyk |
| 2012/0291102 A1 | 11/2012 | Cohen |
| 2012/0310587 A1 | 12/2012 | Tu |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0324004 A1 | 12/2012 | Le et al. |
| 2012/0330975 A1 | 12/2012 | Lee et al. |
| 2012/0331112 A1 | 12/2012 | Chatani |
| 2013/0006991 A1 | 1/2013 | Nagano et al. |
| 2013/0009993 A1 | 1/2013 | Horseman |
| 2013/0018954 A1 | 1/2013 | Cheng |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0066823 A1 | 3/2013 | Sweeney |
| 2013/0070928 A1 | 3/2013 | Ellis |
| 2013/0073552 A1 | 3/2013 | Rangwala |
| 2013/0074155 A1 | 3/2013 | Huh |
| 2013/0091539 A1 | 4/2013 | Khurana |
| 2013/0097664 A1 | 4/2013 | Herz |
| 2013/0110987 A1 | 5/2013 | Kim |
| 2013/0110992 A1 | 5/2013 | Ravindra et al. |
| 2013/0111063 A1 | 5/2013 | Lee |
| 2013/0125057 A1 | 5/2013 | Kashik et al. |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0159100 A1 | 6/2013 | Raina et al. |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0198197 A1 | 8/2013 | Sawhney et al. |
| 2013/0204813 A1 | 8/2013 | Master |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0226865 A1 | 8/2013 | Munemann |
| 2013/0227114 A1 | 8/2013 | Vasseur |
| 2013/0227166 A1 | 8/2013 | Ravindran |
| 2013/0242996 A1 | 9/2013 | Varvello |
| 2013/0246050 A1 | 9/2013 | Yu et al. |
| 2013/0246383 A1 | 9/2013 | White |
| 2013/0250809 A1 | 9/2013 | Hui |
| 2013/0253913 A1 | 9/2013 | Tunstall-Pedoe |
| 2013/0262216 A1 | 10/2013 | Zhang |
| 2013/0262365 A1 | 10/2013 | Dolbear |
| 2013/0271454 A1 | 10/2013 | Lyons et al. |
| 2013/0273941 A1 | 10/2013 | Grokop |
| 2013/0282854 A1 | 10/2013 | Jang |
| 2013/0282860 A1 | 10/2013 | Zhang |
| 2013/0282889 A1 | 10/2013 | Tito |
| 2013/0282920 A1 | 10/2013 | Zhang |
| 2013/0290369 A1 | 10/2013 | Sayers et al. |
| 2013/0304758 A1 | 11/2013 | Gruber |
| 2013/0304937 A1 | 11/2013 | Lee |
| 2013/0325858 A1 | 12/2013 | Xu |
| 2013/0325888 A1 | 12/2013 | Oneppo |
| 2013/0325970 A1 | 12/2013 | Roberts et al. |
| 2013/0329696 A1 | 12/2013 | Xu |
| 2013/0336103 A1 | 12/2013 | Vasseur |
| 2013/0336323 A1 | 12/2013 | Srinivasan |
| 2013/0338995 A1 | 12/2013 | Elkins et al. |
| 2013/0339481 A1 | 12/2013 | Hong |
| 2013/0343408 A1 | 12/2013 | Cook |
| 2014/0003232 A1 | 1/2014 | Guichard |
| 2014/0006012 A1 | 1/2014 | Zhou et al. |
| 2014/0006354 A1 | 1/2014 | Parkison |
| 2014/0006565 A1 | 1/2014 | Muscariello |
| 2014/0016820 A1 | 1/2014 | Roberts et al. |
| 2014/0029445 A1 | 1/2014 | Hui |
| 2014/0032714 A1 | 1/2014 | Liu |
| 2014/0040370 A1 | 2/2014 | Buhr |
| 2014/0040505 A1 | 2/2014 | Barton |
| 2014/0040628 A1 | 2/2014 | Fort |
| 2014/0043325 A1 | 2/2014 | Ruble et al. |
| 2014/0046983 A1 | 2/2014 | Galloway |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0089048 A1 | 3/2014 | Bruich |
| 2014/0089454 A1 | 3/2014 | Jeon |
| 2014/0096249 A1 | 4/2014 | Dupont |
| 2014/0108313 A1 | 4/2014 | Heidasch |
| 2014/0108445 A1 | 4/2014 | Oztekin |
| 2014/0108474 A1 | 4/2014 | David |
| 2014/0115037 A1 | 4/2014 | Liu |
| 2014/0129736 A1 | 5/2014 | Yu |
| 2014/0136508 A1 | 5/2014 | Lyngbaek |
| 2014/0136528 A1 | 5/2014 | Anima et al. |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156282 A1 | 6/2014 | Madere et al. |
| 2014/0156396 A1 | 6/2014 | deKozan |
| 2014/0156567 A1 | 6/2014 | Scholtes |
| 2014/0156654 A1 | 6/2014 | Dutta et al. |
| 2014/0156681 A1 | 6/2014 | Lee et al. |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |

(56) References Cited

U.S. PATENT DOCUMENTS

| | | |
|---|---|---|
| 2014/0195328 A1 | 7/2014 | Ferens |
| 2014/0195641 A1 | 7/2014 | Wang |
| 2014/0195666 A1 | 7/2014 | Dumitriu |
| 2014/0199663 A1 | 7/2014 | Sadeh-Koniecpol |
| 2014/0214942 A1 | 7/2014 | Ozonat |
| 2014/0233575 A1 | 8/2014 | Xie |
| 2014/0237085 A1 | 8/2014 | Park |
| 2014/0237595 A1 | 8/2014 | Sridhara |
| 2014/0245359 A1 | 8/2014 | DeFoy |
| 2014/0254595 A1 | 9/2014 | Luo |
| 2014/0257540 A1 | 9/2014 | Pacione et al. |
| 2014/0280208 A1 | 9/2014 | McConky |
| 2014/0280214 A1 | 9/2014 | Han et al. |
| 2014/0280823 A1 | 9/2014 | Varvello |
| 2014/0281489 A1 | 9/2014 | Peterka |
| 2014/0281505 A1 | 9/2014 | Zhang |
| 2014/0282257 A1 | 9/2014 | Nixon et al. |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337266 A1 | 11/2014 | Kalns |
| 2014/0337276 A1 | 11/2014 | Iordanov |
| 2014/0365550 A1 | 12/2014 | Jang |
| 2015/0006316 A1* | 1/2015 | Zhou .............. G06F 16/278 705/26.7 |
| 2015/0006528 A1 | 1/2015 | Rao |
| 2015/0006896 A1 | 1/2015 | Franck |
| 2015/0018770 A1 | 1/2015 | Baran |
| 2015/0032892 A1 | 1/2015 | Narayanan |
| 2015/0039890 A1 | 2/2015 | Khosravi |
| 2015/0049591 A1 | 2/2015 | Adams |
| 2015/0063802 A1 | 3/2015 | Bahadur |
| 2015/0066554 A1 | 3/2015 | Red et al. |
| 2015/0089081 A1 | 3/2015 | Thubert |
| 2015/0095182 A1* | 4/2015 | Zhou .............. H04N 21/4668 705/26.7 |
| 2015/0095481 A1 | 4/2015 | Ohnishi |
| 2015/0095514 A1 | 4/2015 | Yu |
| 2015/0131850 A1 | 5/2015 | Qvarfordt |
| 2015/0134612 A1 | 5/2015 | Silberstein |
| 2015/0149484 A1 | 5/2015 | Kelley |
| 2015/0188770 A1 | 7/2015 | Naiksatam |
| 2015/0193695 A1 | 7/2015 | Cruz Mota |
| 2015/0195149 A1 | 7/2015 | Vasseur |
| 2015/0207633 A1 | 7/2015 | Ravindran |
| 2015/0207864 A1 | 7/2015 | Wilson |
| 2015/0261867 A1 | 9/2015 | Singal et al. |
| 2015/0262067 A1 | 9/2015 | Sridhara |
| 2015/0277846 A1 | 10/2015 | Yen et al. |
| 2015/0289797 A1 | 10/2015 | Pacione |
| 2015/0309769 A1 | 10/2015 | Greene |
| 2015/0324686 A1 | 11/2015 | Julian |
| 2015/0356462 A1 | 12/2015 | Fawaz |
| 2016/0042539 A1 | 2/2016 | Ye et al. |
| 2016/0048500 A1 | 2/2016 | Hebert |
| 2016/0093154 A1 | 3/2016 | Bytnar et al. |
| 2016/0119364 A1 | 4/2016 | Zolli |
| 2016/0140481 A1 | 5/2016 | Huang et al. |
| 2016/0142435 A1 | 5/2016 | Bernstein |
| 2016/0147892 A1* | 5/2016 | Gilbert ............... G06F 16/245 707/738 |
| 2016/0180438 A1 | 6/2016 | Boston et al. |
| 2016/0196335 A1 | 7/2016 | Vee |
| 2016/0203002 A1 | 7/2016 | Kannan |
| 2016/0222459 A1 | 8/2016 | Keating |
| 2016/0234143 A1 | 8/2016 | Choudhary |
| 2016/0253710 A1 | 9/2016 | Publicover |
| 2016/0283887 A1 | 9/2016 | Jagyasi et al. |
| 2016/0314627 A1 | 10/2016 | Fish et al. |
| 2016/0321616 A1 | 11/2016 | Gedge |
| 2016/0335683 A1 | 11/2016 | Roberts |
| 2016/0335686 A1 | 11/2016 | AthuluruTlrumala |
| 2016/0350662 A1 | 12/2016 | Jin et al. |
| 2016/0358065 A1 | 12/2016 | Gedge |
| 2016/0359993 A1 | 12/2016 | Hendrickson |
| 2016/0379136 A1 | 12/2016 | Chen |
| 2017/0032248 A1 | 2/2017 | Dotan-Cohen |
| 2017/0085672 A1 | 3/2017 | Liu |
| 2017/0111237 A1 | 4/2017 | Shah et al. |
| 2017/0126963 A1 | 5/2017 | Todasco |
| 2017/0140285 A1 | 5/2017 | Dotan-Cohen |
| 2017/0154282 A1 | 6/2017 | Rossi et al. |
| 2017/0163503 A1 | 6/2017 | Black |
| 2017/0177833 A1 | 6/2017 | Lewallen |
| 2017/0178024 A1 | 6/2017 | Kida |
| 2017/0187807 A1 | 6/2017 | Clernon |
| 2017/0201779 A1 | 7/2017 | Publicover |
| 2017/0242920 A1 | 8/2017 | Neland |
| 2017/0277559 A1 | 9/2017 | Mullins |
| 2017/0279827 A1 | 9/2017 | Savalle |
| 2017/0289769 A1 | 10/2017 | Ceker |
| 2017/0309196 A1 | 10/2017 | Vangala |
| 2017/0323233 A1 | 11/2017 | Bencke et al. |
| 2017/0323463 A1 | 11/2017 | Leiba |
| 2017/0337177 A1 | 11/2017 | Maxwell, III et al. |
| 2018/0307995 A1 | 10/2018 | Conroy et al. |
| 2019/0311718 A1 | 10/2019 | Huber et al. |
| 2021/0275023 A1 | 9/2021 | Kalantarian et al. |
| 2023/0186192 A1 | 6/2023 | Xia |
| 2024/0054430 A1 | 2/2024 | Maikhuri |
| 2024/0135090 A1 | 4/2024 | Kapcar et al. |

FOREIGN PATENT DOCUMENTS

| | | |
|---|---|---|
| CA | 2 378 765 A1 | 9/2002 |
| EP | 1 024 437 A2 | 8/2000 |
| EP | 1077422 | 2/2001 |
| EP | 1850134 B1 | 10/2007 |
| EP | 2120402 | 11/2009 |
| EP | 2120419 | 11/2009 |
| EP | 2124415 | 11/2009 |
| EP | 2214357 | 8/2010 |
| EP | 2523436 A1 | 11/2012 |
| JP | 2000112978 A | 4/2000 |
| JP | 2000215023 A | 8/2000 |
| JP | 2003330697 A | 11/2003 |
| JP | 2006293830 | 10/2006 |
| JP | 2016201140 A | 5/2016 |
| KR | 20170036805 A | 4/2017 |
| WO | 0120481 A2 | 3/2001 |
| WO | 2003005288 | 1/2003 |
| WO | 2003049369 | 6/2003 |
| WO | 2006104345 | 10/2006 |
| WO | 2006104345 A1 | 10/2006 |
| WO | 2007144388 | 12/2007 |
| WO | 2008113425 A1 | 9/2008 |
| WO | 2011019295 A1 | 2/2011 |
| WO | 2011049890 | 4/2011 |
| WO | 2011140701 A1 | 11/2011 |
| WO | 2013059906 | 5/2013 |
| WO | 2013123410 | 8/2013 |

OTHER PUBLICATIONS

"5 Tips for Creating an Advertisement on Facebook", Facebook, Nov. 11, 2011, retrieved from https://web.archive.org/web/20111111002017/http://www.advertisementinfacebook.com/advertisement-for-facebook.html.

"Advertisement In Facebook Information", Facebook, Nov. 11, 2011, retrieved from https://web.archive.org/web/20111112062703/http:/www.advertisementinfacebook.com/index.html.

Albino, "GPS-tracking apps: Helicopter parenting or smart solution?". Today's Parent, Nov. 1, 2013, retrieved from https://www.todaysparent.com/family/gps-tracking-kids/.

"Bear Group's Experience With DoubleClick", 2007, https://www.beargroup.com/system-integrations/ad-servers/doubleclick.

Bellotti et al., "Activity-Based Serendipitous Recommendations with the Magitti Mobile Leisure Guide", CHI 2008 Proceedings, 2008, pp. 1157-1166.

(56) References Cited

OTHER PUBLICATIONS

Coburn, "Gowalla for the iPad: Map Views and Consumption", May 1, 2010, The Next Web, retrieved from https://thenextweb.com/insider/2010/05/01/gowalla-ipad-map-views-consumption/.
Curtiss et al., "Unicorn: A System for Searching the Social Graph", The 39th International Conference on Very Large Data Bases, Aug. 26-30, 2013, Facebook, Inc.
Dey et al., "CybreMinder: A Context-Aware System for Supporting Reminders", 2000, Georgia Tech, retrieved from https://www.cc.gatech.edu/projects/infosphere/papers/CybreMinder.pdf.
Downey, "Minority Report advertising is already here: privacy at CES 2013, day 1", Abine, Jan. 9, 2013, retrieved from https://www.abine.com/blog/201 3/privacy-at-ces-day-1/.
Gaudin, "New PARC software turns a cell phone into a personal assistant", Computerworld, Nov. 21, 2007.
Glinton, "From Grindr Team, a Meet-'N'-Greet App for the Rest", WBUR News. Dec. 12, 2011, retrieved from https://www.wbur.org/npr/143585501/from-grindr-team-a-meet-n-greet-app-for-the-rest.
Greene, "Smart Phone Suggests Things to Do", MIT Technology Review, Nov. 13, 2007, retrieved from https://www.technologyreview.com/2007/11/13/128685/smart-phone-suggests-things-to-do/.
Harris, "How Does the Nike Plus Work?", Livestrong.com, 2006, retrieved from https://www.livestrong.com/article/533191-how-does-the-nike-plus-work/.
Hickman, "How I became a Foursquare cyberstalker", The Guardian, Jul. 23, 2010, retrieved from https://www.theguardian.com/technology/2010/jul/23/foursquare.
Kelly, "Business Models Based on Advertising". Technical Business, and Legal Dimensions of Protecting Children from Pornography on the Internet: Proceedings of a Workshop, 2002, retrieved from https://www.nap.edu/read/1 0324/chapter/17#105.
Kim, "Pebble watch: Smartwatch Review", PCMag, Dec. 7, 2016, retrieved from https://www.pcmag.com/reviews/pebble-smartwatch.
Kovach, "How To Use Gowalla To Check-In With Foursquare", Business Insider, Dec. 3, 2010, retrieved from https://www.businessinsider.com/heres-a-tour-of-gowallas-latest-iphone-app-2010-12.
"Nike + iPod Exercise", HowStuffWorks 2007, retrieved from https://electronics.howstuffworks.com/gadgets/fitness/nike-ipod.htm.
"Nike + iPod Experience Coming To A Gym Near You", Nike News, Mar. 4, 2008, retrieved from https://news.nike.com/news/nike-ipod-experience-coming-to-a-gym-near-you.
"Nike Plus Review", Video, YouTube, Feb. 29, 2012, retrieved from https://www.youtube.com/watch?v=CkyecA724es.
Patel, "Pebble Smartwatch Review", The Verge, Jan. 28, 2013, retrieved from https://www.theverge.com/2013/1/28/3924904/pebble-smartwatch-review.
Piquepaille, "A phone that tells you what to do", ZDNet, Nov. 14, 2007, retrieved from https://www.zdnet.com/article/a-phone-that-tells-you-what-to-do.
Prasad, "Magitti: The Intelligent Mobile Platform", Geospatial World, Nov. 24, 2010, retrieved from https://www.geospatialworld.net/article/magitti-the-intelligent-mobile-platform/.
"Ringing in the Rain: An Agent Based Weather Warning System", MIT, Jan. 2008, retrieved from alumni.media.mit.edu/~ccchang/RITR/RingingInTheRain.htm.
Saint, "What is Foursquare And How Do I Use it?", Business Insider, Jan. 28, 2010. retrieved from https://www.businessinsider.com/how-hit-location-based-social-app-foursquare-works-2010-1.
Schonfeld, "Liveblogging Facebook Advertising Announcement (Social Ads + Beacon + Insights)", Tech Crunch, Nov. 6, 2007, retrieved from https://techcrunch.com/2007/11/06/liveblogging-facebook-advertising-announcement/.
Stern, "Pebble Watch: Behind the Smartwatch Sensation", ABC News, Jul. 10, 2012, retrieved from https://abcnews.go.com/Technology/pebble-watch-smartwatch-iphone-android/story?id=16750944.
Stevens, "Nike + iPod Sports Kit review", CNET, Jan. 23, 2007, retrieved from https://www.cnet.com/reviews/nike-plus-ipod-sport-kit-review/.
Takeuchi et al., "An Outdoor Recommendation System based on User Location History", ubiPCMM, 2006, retrieved from https://citeseerx.ist.psu.edu/viewdoc/download?doi=10.1.1.91.813&rep=rep1&type=pdf.
Belotti et al., "Activity-Based Serendipitous Recommendations with the Magitti Mobile Leisure Guide," CHI '08: Proceedings of the SIGCHI Conference on Human Factors in Computing Systems, pp. 1157-1166, https://doi.org/10.1145/1357054.1357237 (Apr. 2008), 10 pages.
Blaze et al., "Divertible Protocols and Atomic Proxy Cryptography," EUROCRYPT 1998: Advances in Cryptology—EUROCRYPT'98, pp. 127-144 (1998), 18 pages.
Boneh et al., "Hierarchical Identity Based Encryption with Constant Size Ciphertext," from Advances in Cryptology—EUROCRYPT 2005, vol. 3493 LNCS, pp. 440-456, (2005), 29 pages.
Cherven, K., "Mastering Gephi Network Realization," [Excerpt] Mastering Gephi Network Realization, Packt Publishing (Jan. 2015), 50 pages.
Data J Lab, "Gelphi Tutorial: Visualizing Facebook Network," YouTube Sep. 30, 2013, [online] Retrieved from URL: https://www.youtube.com/watch?v=kbLFMObmLNQ (2013), 4 pages.
Eivazi et al., "Predicting Problem-Solving Behavior and Performance Levels from Visual Attention Data," 2nd Workshop on Eye Gaze in Intelligent Human Machine Interaction, pp. 9-16 (Feb. 13, 2012), 8 pages.
Fleseriu, G., "C++ Tutorial: A Beginner's Guide to std::vector, Part 1," [Online] Retrieved from URL: https://www.codeguru.com/cpp/cpp/cpp mfc/stl/article. php/c4027 /C-Tutorial-A-Beginners-Guide-to-stdvector-Part-1 .htm on Sep. 18, 2018, (Feb. 2003) 36 pages.
Getoor et al., "Chapter 5: Probabilistic Relational Models," in Introduction to Statistical Relational Learning, MIT Press (2007), 46 pages.
GFC LearnFree, [online] Retrieved from URL: www.gfclearnfree.org/windowsxp/working-with-windows-explorer/1/ (2018), 7 pages.
Harley, A., "Slider Design: Rules of Thumb," Nielsen Norman Group, [online] Retrieved from URL: www.nngroup.com/articles/gui-slider-controls/ (Sep. 2015), 3 pages.
Hastie et al., "Automatic Evaluation: Using a Date Dialogue Act Tagger for User Satisfaction and Task Completion," Proc. Lang. Resources Eval. Conf., pp. 1-8 (2002), 8 pages.
Keranen et al., "Interactive Connectivity Establishment (ICE): A Protocol for Network Address Translator (NAT) Traversal for Offer/Answer Protocols," IETF (2013), 118 pages.
Naor et al., "Efficient trace and revoke schemes," In: Frankel, Y. (eds) Financial Cryptography, FC 2000, Lecture Notes in Computer Science, vol. 1962, Springer, Berlin, Heidelberg, DOI: 10.1007/3-540-45472-1_1 (2001), 20 pages.
Project CCNx—Content Centric Networking Project (CCN) [online] Retrieved from URL: http://ccnx.org/releases/latest/ doc/technical/ on Mar. 9, 2015, 5 pages.
Ratwani et al., "A Real-Time Eye Tracking System for Predicting and Preventing Postcompletion Errors," Human-Computer Interaction, vol. 26, pp. 205-245 (2011), 42 pages.
Rello et al., "Detecting Readers with Dyslexia Using Machine Learning with Eye Tracking Measures," May 18-20, 2015; W4A'15—Proceedings of the 112th Web For All Conference (2015), 8 pages.
Ricci et al., "Acquiring and Revising Preferences in a Critique-Based Mobile Recommender System," in IEEE Intelligent Systems, vol. 22, No. 3, pp. 22-29, DOI: 10.1109/MIS.2007.43 (May-Jun. 2007), 8 pages.
Rossi et al., "Parallel Maximum Clique Algorithms with Applications to Network Analysis and Storage," Dec. 26, 2013, pp. 1-11 (2013), 28 pages.
Rossi et al., "Scalable Relational Learning for Large Heterogenous Networks," 2015, pp. 1-10 (2015), 10 pages.
Rossi et al., "Transforming Graph Data for Statistical Relational Learning," Journal of Artificial Intelligence Research vol. 45(1), pp. 363-441 (2012), 79 pages.

(56) References Cited

OTHER PUBLICATIONS

Schiller et al., "Location-Based Services," The Morgan Kaufmann Series in Data Management Systems, Morgan Kaufmann Publishers / Elsevier, DOI: 10.1016/B978-1-55860-929-7.X5000-6 (2004), 266 pages.
Siddheswar Ray and Rose H Turi. "Determination of Number of Clusters in K-Means Clustering and Application in Colour Image Segmentation" 1999 [online] Retrieved from URL: http://citeseerx.ist.psu.edu/viewdoc/download?doi=10.1.1.587.3517&rep=rep1&type=pdf on Apr. 28, 2017, 7 pages.
Soulie, J., "Variables. Data Types," Cplusplus.com Apr. 20, 2009 verified by wayback machine [online] Retrieved from URL: https://web.archive.org/web/20090420124459/http://www.cplusplus.com/doc/tutorial/variables/ on Feb. 6, 2018, 5 pages.
Takeuchi et al., "CityVoyager: An Outdoor Recommendation System Based on User Location History," Ubiquitous Intelligence and Computing Lecture Notes in Computer Science; LNCS, Springer, Berlin, DE, vol. 4159, (Jan. 1, 2006), pp. 625-636, 12 pages.
Vo et al., "Towards Context-Aware Task Recommendation," 2009 Joint Conferences on Pervasive Computing (JCPC); DOI:10.1109/jgpg.2009.5420173 (2009), 4 pages.
Yi et al., "On the Role of Routing in Named Data Networking," NDN Technical Report NEN-0016 (2013), 10 pages.
Wayback Machine Capture of "Analytics," Twitter, retrieved from URL: https://web.archive.org/web/20130307212005/https:/business.twitter.com/products/analytics-self-service, 3 pgs. (Mar. 7, 2013).
"Apple introduces the New iPhone 3G," Apple Newsroom, retrieved from URL: https://www.apple.com/newsroom/2008/06/09Apple-introduces-the-New-iPhone-3G, 4 pgs. (Jun. 9, 2008).
Bharat et al., "Personalized, interactive news on the Web," Multimedia Systems 6, pp. 349-358, https://doi.org/10.1007/s005300050098] (1998).
Carlson, "Eclipse Distilled," Addison-Wesley, pub., 12 pgs. (2005).
Chen et al., "Multi-Modal Browsing of Images in Web Documents," Proceedings vol. 3651, Document Recognition and Retrieval VI; DOI:10.1117/12.335809 [Event: Electronic Imaging '99, 1999, San Jose, CA, United States], 12 pgs. (1999).
Chi et al., "An Operator Interaction Framework for Visualization Systems," Proceedings IEEE Symposium on Information Visualization (Cat. No. 98TB100258), DOI: 10.1109/INFVIS.1998.729560, 8 pgs. (1998).
Wayback Machine Capture of "Cloudee Alpha," retrieved from URL: https://web.archive.org/web/20080227033020/ http://www.cloudee.com:80, 2 pgs. (2008).
Cradler, D., excerpts from "Hacker's Guide to Navigator," Waite Group Press, Corte Madera, California, USA, 25 pgs. (1997).
Dargie, W. (ed.), "Context-Aware Computing and Self-Managing Systems," CRC Press, 202 pgs. (2009).
Wayback Machine Capture of "Eclipse.org," retrieved from URL: https://web.archive.org/web/20080307093622 /https://www.eclipse.org, 1 pg. (2008).
Wayback Machine Capture of "Fab" homepage, available at URL: https://web.archive.org/web/19971021223905/ http://fab.stanford.edu:80, 1 pg. (Oct. 21, 1997).
Google Scholar results for 2001-2002 articles citing Jeffrey Heer and Ed H. Chi, "Identification of Web User Traffic Composition Using Multi-Modal Clustering and Information Scent," published as part of the Proceedings of the Workshop on Web Mining, First SIAM Conference on Data Mining (SMD 2001), Chicago, Illinois; retrieved from URL: https://scholar.google.com/scholar?cluster=18250606965757252436&hl=en&as_sdt=400005&sciodt=0,14&as_ylo=2001&as_yhi=2002, 4 pgs. (Apr. 7, 2001).
Hahn, J. and Kaufman, R., "Evaluating Web Site Performance in Internet-Based Selling from a Business Value Perspective," 2001 International Conference on Electronic Commerce, Vienna, Austria, 25 pgs. (Oct. 2001).
Hazel, P., excerpts from "EXIM: The Mail Transfer Agent," O'Reilly & Assoc., pub., 182 pgs. (2001).
Heer, J., "Capturing and Analyzing the Web Experience," 2002 Workshop CHI, 5 pgs. (Apr. 2002).
Hsu et al., "Ranking Comments on the Social Web," 2009 Int'l Conf. Computational Sci. & Engineering, vol. 4., 8 pgs. (2009).
IEEE Information re: ICONS International Conference on Systems and Yau, available at URL: https://ieeexplore.ieee.org/xpl/con-home/4196296/proceeding, 30 pgs. (2021).
IEEE Information re: Yau, available at https://ieeexplore.ieee.org/document/4196333, 3 pgs. (2021).
Joachims et al., "WebWatcher: A Tour Guide for the World Wide Web," Proceedings of IJCAI97, 6 pgs. (Aug. 1997).
Kim et al., "CASTmiddleware: Security Middleware of Context-Awareness Simulation Toolkit for Ubiquitous Computing Research Environment," ICIC2006, LNCIS 344, 8 pgs. (2006).
Liu, M., "A Study of Mobile Sensing Using Smartphones," International Journal of Distributed Sensor Networks, vol. 2013, Article ID 272916, 11 pgs. (2013).
Mallick, "Mobile and Wireless Design Essentials," Wiley Publishing, retrieved from URL: https://archive.org/details/mobilewirelessde0000mall, 51 pgs. (2003).
Excerpts from Microsoft Computer Dictionary, 14 pgs. (5th ed., 2002).
Miller, M., excerpts from "Absolute Beginner's Guide to Computer Basics," 6 pgs. (4th ed., 2007).
Mladenic, "Using Text Learning to Help Web Browsing," Proceedings of the Ninth Int'l Conf. on Human-Computer Interaction, 5 pgs. (2001).
Mladenic, "Machine Learning Used by Personal WebWatcher," Proceedings of ACAI-99 Workshop on Machine Learning and Intelligent Agents, 9 pgs. (1999).
Murchison, K., Request for Comments (RFC) 5233, retrieved from URL: https://web.archive.org/web/20080217091813/https:/www.ietf.org/rfc/rfc5233.txt, 5 pgs. (Jan. 2008).
Neufeld, G. et al., Request for Comments (RFC) 2369, Retrieved from: https://web.archive.org/web/20000411210542/ https:/www.ietf.org/rfc/rfc2369.txt, 10 pgs. (Jul. 1998).
Excerpts from The New Penguin Dictionary of Computing, 6 pgs. (2001).
Postel, J. et al., "Request for Comments 1543: Instructions to RFC Authors," 16 pgs. (Oct. 1993).
Powell, Thomas A., excerpts from "AJAX: The Complete Reference," McGraw Hill (pub.), 89 pgs. (2008).
Reardon, M., "Motion Sensing comes to mobile phones," CNET, 4 pgs. (Jun. 11, 2007).
Resnick, P., "Request for Comments 2822: Internet Message Format," 44 pgs. (Apr. 2001).
Richardson et al., excerpts from "RESTful Web Services," O'Reilly Media, Inc. (pub.), 74 pgs. (2007).
Schwab et al., "Adaptivity through Unobtrusive Learning," KI 2002/3, Special Issue on Adaptivity and User Modeling, 8 pgs. (2002).
Shalloway et al., excerpts from "Design Patterns Explained: A New Perspective on Object-Oriented Design," 84 pgs. (2nd ed., 2005).
Sharp et al., "Establishing Requirements for a Mobile Learning System," Interaction Design 2nd Edition, 14 pgs. (2007).
Sizov et al., "BINGO!: Bookmark-Induced Gathering of Information," Proceedings of the Third International Conference on Web Information Systems Engineering, Wise 2002, 10 pgs., DOI:10.1109/WISE.2002.1181668 (2002).
Sizov et al., "The BINGO! System for Information Portal Generation and Expert Web Search," University of Saarland, Dept. of Computer Science, Saarbrucken, Germany, 12 pgs. (Jan. 5-8, 2003).
Springer Information re: Kim, available at URL: https://link.springer.com/bookseries/642, 1 pg. (2020).
Story, L., "Online Customized Ads Move a Step Closer," New York Times, retrieved from URL: http://www.nytimes.com/2007/07/02/technology/02yahoo.html, 4 pgs. (Jul. 2, 2007).
Strang, T., "A Context Modeling Survey," First International Workshop on Advanced Context Modelling, Reasoning And Management at UbiComp 2004, Nottingham, England, 8 pgs. (Sep. 7, 2004).
Wayback Machine Capture of "Technorati Support: Site Guide—Channels," retrieved from URL: https://web.archive.org/web/20080512023633/http://support.technorati.com/support/siteguide/channels, 1 pg. (2008).

(56) References Cited

OTHER PUBLICATIONS

"Visa DPS—Debit and ATM Processing: Quick Reference Guide," Visa, 5 pgs. (2012).
Excerpts from Webster's New World Dictionary of Computer Terms, 6 pgs. (7th ed., 1999).
White, R., excerpts from "How Computers Work," Que Corp. (pub.), 5 pgs. (6th ed., 2002).
U.S. Appl. No. 60/819,576 to Jason H. Wolfe (provisional to U.S. Pat. No. 8,428,614 to Jason H. Wolfe), filed Jul. 10, 2006 (27 pgs.).
Prosecution History of U.S. Pat. No. 9,137,190, 145 pgs.
Prosecution History of U.S. Pat. No. 9,208,439, 144 pgs.
Prosecution History of U.S. Pat. No. 7,043,475, 157 pgs.
Prosecution History of U.S. Pat. No. 8,489,599, 474 pgs.
Prosecution History for U.S. Pat. No. 8,606,781, 463 pgs. (Pts. 1 [146 pgs.], 2 [167 pgs.], 3 [150 pgs.]).
"Defendant's Initial Invalidity Contentions," *Palo Alto Research Center Inc.* v. *Facebook, Inc.*, Case No. 2:20-cv-10753-AB(MRWx), United States District Court, Central District of California, Western Division (Jun. 15, 2021).
"SNAP Inc.'s Initial Invalidity Contentions," *Palo Alto Research Center Inc.* v. *SNAP Inc.*, Case No. 2:20-cv-10755-AB-MRW, United States District Court, Central District of California, Western Division (Jun. 15, 2021).
"Twitter's Initial Invalidity Contentions," *Palo Alto Research Center Inc.* v. *Twitter, Inc.*, Case No. 2:20-cv-10754-AB(MRWx), United States District Court, Central District of California, Western Division (Jun. 15, 2021) [Pt. 1, 165 pgs; Pt. 2, 166 pgs.].
Cetintemel et al., "Self-Adaptive User Profiles for Large Scale Data Delivery", ICDE '00: Proceedings of the 16th International Conference on Data Engineering, 2000.
Chang et al., "Mining the World Wide Web: An Information Search Approach", The Kluwer International Series on Information Retreival, 2001.
Lazerow, "Twitter's Ads API is Here: So What and Now What?", Ad Age, Feb. 20, 2013, retrieved from https://web.archive.org/web/20130223013656/http:/adage.com/article/digitalnext/twitter-s-ads-api/239913/.
Millhollon et al., "Microsoft Internet Explorer 3.0 F", Coriolis Group, 1996, available at: https://archive.org/deta ils/microsoftinterne000 0mill/.
Sterling, "New SmartAds: The Future of Graphical Advertising at Yahoo", Search Engine Land, Jul. 2, 2007, retrieved from https://searchengineland.com/new-smartads-the-future-of-graphical-advertising-at-yahoo-11607.
"Vrettos et al.,""A Fuzzy Rule-Based Agent for Web Retrieval-Filtering"", WI 2001: WebIntelligence: Research and Development, 2001."
Wang, "Beginning Programming for Dummies", 1999, IDG Books Worldwide, Inc.
"About Alarm Clock", Oct. 11, 2007, retrieved from https://web.archive.org/web/20071011022121/http://www.robbiehanson.com/alarmclock/index.html.
"About PlaceIQ", 2012, retrieved from https://www.placeiq.com/aboutplaceiq/.
"Alcatel-Lucent, 1020 Placecast partner on location-based mobile advertising", Marketing Dive, retrieved from https://www.marketingdive.com/ex/mobilemarketer/cms/news/advertising/3305.html.
"Analytics", Twitter, Mar. 7, 2013, retrieved from https://web.archive.org/web/20130307212005/https://business.twitter.com/products/analytics-self-service.
"Announcing the Twitter Ads API", Twitter, Feb. 23, 2013, retrieved from https://web.archive.org/web/20130223180647/http:/advertising.twitter.com/2013/02/announcing-twitter-ads-api_20.html.
"Doubleclick Inc.", Encyclopedia.com, retrieved from https://www.encyclopedia.com/economics/encyclopedias-almanacs-transcripts-and-maps/doubleclick-inc.
"Form 10-K", 2007, http:/media.corporate-ir.net/media_files/NSD/DCLK/reports/10k99.pdf.
"Frequently Asked Questions", Oct. 11, 2007, retrieved from https://web.archive.org/web/ 20071011034339/http://robbiehanson.com/alarmclock/faq.html.
"Gender targeting for Promoted Products now available", Twitter, Oct. 28, 2012, retrieved from https://web.archive.org/web/20121028010012/http:/advertising.twitter.com/2012/10/gender-targeting-for-promoted-products.html.
"How Do You Advertise on Facebook?", Facebook, Nov. 11, 2011, retrieved from https://web.archive.org/web/20111111023735/http:/www.advertisementinfacebook.com/how-do-you-advertise-on-facebook.html.
"Measure your impact", Twitter, Mar. 7, 2013, retrieved from https://web.archive.org/web/20130307211901/https:/business.twitter.com/measure-your-impact.
"Measurement", 2012, retrieved from https://www.placeiq.com/measurement/.
"More powerful tools for small business and self-service advertisers", Twitter, Mar. 21, 2013, retrieved from https://web.archive.org/web/20130321053415/http:/advertising.twitter.com/2013/03/More-powerful-tools-for-small-business-and-self-service-advertisers.html.
"MPOS AdSpace", Aug. 8, 2008, retrieved from https://web.archive.org/web/ 20080808140616/http://www.xiam.com/xiam.products.adspace.shtml.
"PIQ Conquest", 2013, retrieved from https://web.archive.org/web/20130405064340/http://www.placeiq.com/products/piq-conquestpiq-conquest/.
"Pricing", Twitter, Mar. 7, 2013, retrieved from https://web.archive.org/web/20130307212012/https:/business.twitter.com/products/pricing.
"Project Ringing in the Rain—Overview", MIT Media Lab, Jan. 2007, retrieved from https://www.media.mit.edu/projects/ringing-in-the-rain/overview.
"Proximity Overview", Gimbal Inc., 2013, retrieved from https://docs.gimbal.com/proximity_overview.html.
"PVR Capture Apr. 2013", 2013, retrieved from https://web.archive.org/web/20130411042334/http://www.placeiq.com/products/pvr.
"Quick Reference Guide", 2009, retrieved from https://silo.tips/download/quick-reference-guide-21.
"Rest API v. 1.1 Resources", Twitter, Mar. 25, 2013, retrieved from https://web.archive.org/web/20130325202324/https://dev.twitter.com/docs/api/1.1.
"Rest API v1.1 Resources", Twitter, Dec. 14, 2012, retrieved from https://web.archive.org/web/20121214124240/https://dev.twitter.com/docs/api/1.1.
"Screen Shots", Oct. 11, 2007, retrieved from https://web.archive.org/web/20071011044752/http://robbiehanson.com/alarmclock/screenShots.html.
"Smarter Security Systems for Indian Banks", Business Wire India, Aug. 29, 2012, retrieved from https://www.businesswireindia.com/smarter-security-systems-for-indian-banks-32474.html.
"Sponsor Breakfast Presentation PlaceIQ", 2012, retrieved from https://www.slideshare.net/mediapostlive/place-iq-25647368.
"ss1.jpg", Oct. 11, 2007, retrieved from https://web.archive.org/web/20071011044752im_/http://robbiehanson.com/alarmclock/images/ss1.jpg.
"ss3.jpg", Oct. 11, 2007, retrieved from https://web.archive.org/web/ 20071011044752im_/http://robbiehanson.com/alarmclock/images/ss3.jpg.
"ss7.jpg", Oct. 11, 2007, retrieved from https://web.archive.org/web/ 20071011044752im_/http://robbiehanson.com/alarmclock/images/ss7.jpg.
"ss8.jpg", Oct. 11, 2007, retrieved from https://web.archive.org/web/ 20071011044752im_/http://robbiehanson.com/alarmclock/images/ss8.jpg.
"ss9.jpg", Oct. 11, 2007, retrieved from https://web.archive.org/web/ 20071011044752im_/http://robbiehanson.com/alarmclock/images/ss9.jpg.
"ss10.jpg", Oct. 11, 2007, retrieved from https://web.archive.org/web/ 20071011044752im_/http://robbiehanson.com/alarmclock/images/ss10.jpg.

(56) References Cited

OTHER PUBLICATIONS

"ss11.jpg", Oct. 11, 2007, retrieved from https://web.archive.org/web/20071011044752im_/http://robbiehanson.com/alarmclock/images/ss11.jpg.
"ss12.jpg", Oct. 11, 2007, retrieved from https://web.archive.org/web/20071011044752im_/http://robbiehanson.com/alarmclock/images/ss12.jpg.
"ss13.jpg", Oct. 11, 2007, retrieved from https://web.archive.org/web/20071011044752im_/http://robbiehanson.com/alarmclock/images/ss13.jpg.
"ss14.jpg", Oct. 11, 2007, retrieved from https://web.archive.org/web/20071011044752im_/http://robbiehanson.com/alarmclock/images/ss14.jpg.
"Twitter Ads self service", Twitter, Mar. 7, 2013, retrieved from https://web.archive.org/web/20130307211550/https:/business.twitter.com/products/twitter-ads-self-service.
"Twitter Advertising: New enhanced geo-targeting for marketers", Twitter, Sep. 14, 2012, retrieved at https://web.archive.org/web/20120914024230/http:/advertising.twitter.com/2012/09/new-enhanced-geo-targeting-for-marketers.html.
"What are Promoted Trends?", Twitter, Mar. 26, 2013, retrieved from https://web.archive.org/web/20130326131656/https:/support.twitter.com/articles/282142.
LiveJournal Source Code, Live Journal, 1999.
"New Jersey Division of Criminal Justice's "Handling a Domestic Violence Call:In-Service Training for Police Dispatchers", May 8, 2003, New Jersey Division of Criminal Justice."
E! Science News, 2010, available at www.esciencenews.com.
We Smirch, 2010, available at www.wesmirch.com.
Bausch et al., "Flickr Hacks", O'Reilly, 2006.
Belqasmi et al., "RESTful Web Services for Service Provisioning in NextGeneration Networks: A Survey", IEEE Communications Magazine, 2011, pp. 66-73, vol. 49, Issue 12.
Bogers, "Movie Recommendation using Random Walks over the Contextual Graph", Information Systems & Interactive Design; Royal School of Library and Information Science, 2010.
Collins, "The Little Book of Twitter", Michael O'Mara Books, 2009.
El-Bishouty et al., "PERKAM: Personalized Knowledge Awareness Map for Computer Supported Ubiquitous Learning", Educational Technology & Society, 2007, pp. 122-134, vol. 10, No. 3.
Fitton et al., "Twitter for Dummies", Wiley Publishing, Inc., 2009.
Giles, "How to Use Flickr: The Digital Photography Revolution", Thomson Course Technology PTR, 2006.
Guinard et al., "Towards the Web of Things: Web Mashups for Embedded Devices", WWW 2009, Apr. 20-24, 2009.
Lerman et al., "Social Browsing on Flickr", International Conference on Weblogs and Social Media, 2006.
Maia et al., "LOCCAM—Loosely Coupled Context Acquisition Middleware", 28th Annual ACM Symposium on Applied Computing (SAC '13) (Mar. 18-22, 2013), 2013.
Mcfedries et al., "MySpace Visual Quick Tips", Wiley Publishing, Inc., 2006.
Pokraev et al., "Service Platform for Rapid Development and Deployment of Context-Aware, Mobile Applications", Jul. 11-15, 2005, IEEE International Conference on Web Services (ICWS'05), vol. 646.
Ricci, "Mobile Recommender Systems", Information & Technology Tourism, 2010.
Riggsby et al., "Mastering Lotus Notes and Domino 6", Sybex, 2003.
Schwinger et al., "Context awareness in Mobile Tourism Guides—A Comprehensive Survey", 2005, Johannes Kepler Universität Linz, Technische Universität Wien.
Van Setten et al., "Context-Aware Recommendations in the Mobile Tourist Application Compass", Proceedings of The Adaptive Hypermedia and Adaptive Web-Based Systems, Third International Conference, and Lecture Notes in Computer Science, 2004, pp. 235-244, vol. 3137, Springer-Verlag Berlin Heidelberg.
Verbert et al., "Context-Aware Recommender Systems for Learning: A Survey and Future Challenges", IEEE Transactions on Learning Technologies, 2012.
Vo et al., "A Survey of Context-Aware Recommendation Systems", Semantic Scholar, 2013.
Wancho, "Digest Message Format", 1990.
Wilkinson, "Flickr Mashups", Wiley Publishing, Inc., 2007.
Xiang et al., "Temporal Recommendation on Graphs via Long- and Shor t-term Preference Fusion", ACM KDD '10, Jul. 25-28, 2010.
Yao et al., "Personalized Recommendation on Multi-Layer Context Graph", 2013, Springer-Vering Berlin Heidelberg.
Zeff et al., "Advertising on the Internet", Robert Ipsen, 1999.
Zheng et al., "Collaborative Location and Activity Recommendations with GPS History Data", ACM International Conference on World Wide Web, 2010, pp. 1029-1038.
"API Integration", Twitter, Feb. 9, 2012, retrieved from https://web.archive.org/web/20120209174437/https:/business.twitter.com/en/optimize/api/.
Collection of Flickr web pages publicly available on archive.org.
Collection of LiveJournal web pages publicly available on archive.org.
Collection of MySpace web pages publicly available on archive.org.
"Murder: Fast datacenter code deploys using BitTorrent", Twitter, Jul. 1, 2010, retrieved from https://blog.twitter.com/engineering/en_us/a/2010/murder-fast-datacenter-code-deploys-using-bittorrent.html.
"Documentation", Twitter, Jul. 13, 2011, retrieved from https://web.archive.org/web/20110713041412/https://dev.twitter.com/docs/.
"Geo Developer Guidelines", Twitter, Jul. 13, 2011, retrieved from https://web.archive.org/web/201 10713045612/https://dev.twitter.com/terms/geo-developer-guidelines.
"Get geo/search", Twitter, Jul. 13, 2011, retrieved from https://web.archive.org/web/20110713042853/https:/dev.twitter.com/docs/api/1/get/geo/search.
"Get Search", Twitter, Dec. 23, 2011, retrieved from https://web.archive.org/web/20111223105655/https:/dev.twitter.com/docs/api/1/get/search.
"History of the Rest & Search API", Twitter, Dec. 2, 2011, retrieved from https://web.archive.org/web/20111202041642/https:/dev.twitter.com/docs/history-rest-search-api.
"Improving performance on twitter.com", Twitter, May 29, 2012, retrieved from https://blog.twitter.com/engineer ing/en_us/a/2012/improving-performance-on-twittercom.html.
"Interest targeting: Broaden your reach, reach the right audience", Twitter, Aug. 30, 2012, retrieved from https://web.archive.org/web/20120831222534/http:/advertising.twitter.com/2012/08/interest-targeting-broaden-your-reach.html.
"Promoted Accounts", Twitter, Sep. 9, 2010, retrieved from https://web.archive.org/web/20101009232719/http:/support.twitter.com/articles/282154.
"Promoted Products: now more mobile", Twitter, Feb. 29, 2012, retrieved from https://web.archive.org/web/20120229030349/http:/blog.twitter.com/2012/02/promoted-products-now-more-mobile.html.
"Promoted Trends", Twitter, Oct. 10, 2010, retrieved from https://web.archive.org/web/20101010145232/https:/support.twitter.com/articles/282142.
"Promoted Tweets on mobile: more options, starting today", Twitter, Mar. 20, 2012, retrieved from https://web.archive.org/web/20120320192505/http:/advertising.twitter.com/2012/03/promoted-tweets-on-mobile-more-options.html.
"Start Advertising", Twitter, Feb. 6, 2012, retrieved from https://web.archive.org/web/20120206021953/https:/business.twitter.com/en/advertise/start/.
"Streaming API", Twitter, Dec. 2, 2011, retrieved from https://web.archive.org/web/20111202024242/https:/dev.twitter.com/docs/streaming-api.
"Streaming API Concepts", Twitter, Dec. 2, 2011, retrieved from https://web.archive.org/web/20111202024252/https://dev.twitter.com/docs/streaming-api/concepts.
"Things Every Developer Should Know", Twitter, Dec. 2, 2011, retrieved from https://web.archive.org/web/20111202041631/https://dev.twitter.com/docs/things-every-developer-should-know.

(56) References Cited

OTHER PUBLICATIONS

"Twitter Advertising: New targeting adds greater relevant to your Promoted Tweets", Twitter, Jul. 22, 2012, retrieved from https://web.archive.org/web/20120722044622/http:/advertising.twitter.com/2012/07/new-targeting-adds-greater-relevance-to.html.
"Getting Started", Twitter, Jul. 13, 2011, retrieved from https://web.archive.org/web/20110713043554/https://dev.twitter.com/start.
"Twitter Blog: Hello World", Twitter, Apr. 16, 2010, retrieved from https://web.archive.org/web/20100416111723/http://blog.twitter.com/2010/04/hello-world.html.
"User Streams", Twitter, Dec. 2, 2011, retrieved from https://web.archive.org/web/20111202041744/https:/dev.twitter.com/docs/streaming-api/user-streams.
"User Streams", Twitter, Jul. 12, 2012, retrieved from https://web.archive.org/web/20120712073356/https://dev.twitter.com/docs/streaming-apis/streams/user.
Petition for Inter Partes Review of U.S. Pat. No. 7,043,475 B2 (2021-01264) including exhibits; 1,404 pages.
Petition for Inter Partes Review of U.S. Pat. No. 8,489,599 B2 (2021-01294), including exhibits; 1,745 pages.
Petition for Inter Partes Review of U.S. Pat. No. 7,043,475 (IPR2021-01398('475) including exhibits (1134 pages).
Petition for Inter Partes Review of U.S. Pat. No. 9,208,439 (IPR2021-01430) including exhibits (605 pages).
"CCNx," http://ccnx.org/; downloaded Mar. 11, 2015.
"Content Delivery Network," Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/; downloaded Mar. 11, 2015.
"Microsoft PlayReady," http://www.microsoft.com/playready/; downloaded Mar. 11, 2015.
"PBC Library-Pairing-Based Cryptography—About," http://crypto.stanford.edu/pbc. downloaded Apr. 27, 2015.
"Pursuing a pub/sub internet (Pursuit)," http://www.fp7-pursuit.ew/PursuitWeb/; downloaded Mar. 11, 2015.
"The FP7 4WARD project," http://www.4ward-project.eu/; downloaded Mar. 11, 2015.
Adhikari et al., "Unreeling Netflix: Understanding and Improving Multi-CON Movie Delivery," Proceedings of IEEE INFOCOM 2012, 9 pgs. (2012).
Adhikari et al., "Vivisecting Youtube: An Active Measurement Study 2012," Proceedings IEEE INFOCOM, Orlando, FL, USA, 2012, pp. 2521-2525, DOI: 10.1109/INFCOM.2012.6195644. (2012).
Afanasyev et al., "Interest flooding attack and countermeasures in Named Data Networking," 2013 IFIP Networking Conference, Brooklyn, NY, USA, pp. 1-9 (2013).
Ahlgren et al., "A Survey of Information-centric Networking," IEEE Communications Magazine, vol. 50, iss. 7, pp. 26-36, Jul. 2012, DOI: 10.1109/MCOM.2012.6231276.
Amadeo et al., "Design and Analysis of a Transport-Level Solution for Content-Centric VANETs," 2013 IEEE International Conference on Communications Workshops (ICC), Budapest, Hungary, pp. 532-537, DOI: 10.1109/ICCW.2013.6649291 (2013).
Anteniese et al., "Improved Proxy Re-Encryption Schemes with Applications to Secure Distributed Storage," ACM Transactions on Information and System Security, vol. 9, iss. 1, pp. 1-30 (Feb. 2006).
Ao-Jan et al., "Drafting Behind Akamai: Inferring Network Conditions Based on CDN Redirections," IEEE/ACM Transactions on Networking, vol. 17, iss. 6, pp. 1752-1765 (Dec. 2009).
Aumasson et al., "SipHash: a fast short-input PRF," INDOCRYPT 2012, Lecture Notes in Computer Science, vol. 7668, 20 pgs., Springer, Berlin, Heidelberg, DOI: 10.1007/978-3-642-34931-7_28 (2012).
Ballardie et al., "Core Based Trees (CBT)," Proc. ACM SIGCOMM '88, Aug. 1988.

Bari et al., "A survey of naming and routing in information-centric networks," IEEE Communications Magazine, vol. 50, iss. 12, pp. 44-53, Dec. 2012, Doi: 10.1109/MCOM.2012.6384450.
Baugher et al., "Self-Verifying Names for Read-Only Named Data," 2012 IEEE Conference on Computer Communications Workshops (INFOCOM Wkshps), Mar. 2012, pp. 274-279.
Beben et al., "Content Aware Network based on Virtual Infrastructure," 2012 13th ACIS International Conference on Software Engineering, Artificial Intelligence, Networking and Parallel/Distributed Computing, Kyoto, Japan, pp. 643-648, DOI: 10.1109/SNPD.2012.68 (2012).
Bethencourt et al., "Ciphertext-policy attribute-based encryption," 2007 IEEE Symposium on Security and Privacy (SP '07), Berkeley, CA, USA, 2007, pp. 321-334, Doi: 10.1109/SP.2007.11 (2007).
Biradar et al., "Review of multicast routing mechanisms in mobile ad hoc networks," Journal of Network and Computer Applications, vol. 35, iss. 1, pp. 221-239, DOI: 10.1016/j.jnca.2011.08.003 (Jan. 2012).
Boneh et al., "Collusion Resistant Broadcast Encryption with Short Ciphertexts and Private Keys," In: Shoup, V. (eds) Advances in Cryptology—CRYPTO 2005, Lecture Notes in Computer Science, vol. 3621, Springer, Berlin, Heidelberg. DOI:10.1007/11535218_16.
Boneh et al., "Identity-Based Encryption from the Weil Pairing," In: Kilian, J. (eds) Advances in Cryptology—CRYPTO 2001, Lecture Notes in Computer Science, vol. 2139, Springer, Berlin, Heidelberg. DOI:10.1007/3-540-44647-8_13.
Brambley, M., "A novel, low-cost, reduced-sensor approach for providing smart remote monitoring and diagnostics for packaged air conditioners and heat pumps," Pacific Northwest National Laboratory, PNNL-18891, Sep. 2009 (19 pgs.).
Broder et al., "Multilevel Adaptive Hashing," SODA '90: Proceedings of the first annual ACM-SIAM symposium on Discrete algorithms, Jan. 1990, pp. 43-53.
Carzaniga et al., "A routing scheme for content-based networking," IEEE INFOCOM 2004, Hong Kong, China, 2004, pp. 918-928 vol. 2, DOI: 10.1109/INFCOM.2004.1356979.
Cho et al., "A survey on trust management for mobile ad hoc networks," IEEE Communications Surveys & Tutorials, vol. 13, No. 4, pp. 562-583, Fourth Quarter 2011, DOI: 10.1109/SURV.2011.092110.00088.
Chow et al., "Efficient Unidirectional Proxy Re-Encryption. Progress in Cryptology,"—AFRICACRYPT 2010, Lecture Notes in Computer Science, vol. 6055, Springer, Berlin, Heidelberg, DOI: 10.1007/978-3-642-12678-9_19 (2010).
Compagno et al., "Poseidon: Mitigating interest flooding DDoS attacks in named data networking," 38th Annual IEEE Conference on Local Computer Networks, Sydney, NSW, Australia, 2013, pp. 630-638, DOI: 10.1109/LCN.2013.6761300.
Conner et al., "A trust management framework for service-oriented environments," WWW'09: Proceedings of the 18th International Conference on World Wide Web, pp. 891-900 (Apr. 2009).
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Dabirmoghaddam et al., "Understanding optimal caching and opportunistic caching at 'the edge' of information-centric networks," ACM-ICN'14: Proceedings of the 1st ACM Conference on Information-Centric Networking, pp. 47-56, DOI: 10.1145/2660129.2660143 (Sep. 2014).
Deering et al., "The PIM architecture for wide-area multicast routing," IEEE/ ACM Transactions on Networking, vol. 4, No. 2, DOI: 10.1109/90.490743 (Apr. 1996).
Deering, S., "Multicast Routing in Internet Works and Extended LANs," SIGCOMM '88: Symposium proceedings on Communications Architectures and Protocols, pp. 55-64, DOI: 10.1145/52324.52331 (Aug. 1988).
Dely et al., "OpenFlow for Wireless Mesh Networks" Proceedings of 20th International Conference on Computer Communications and Networks (ICCCN), Lahaina, HI, USA, 2011, pp. 1-6, DOI: 10.1109/ICCCN.2011.6006100 (2011).

(56) References Cited

OTHER PUBLICATIONS

Deng et al., "Chosen-Ciphertext Secure Proxy Re-Encryption without Pairings," CANS 2008, Spring Lecture Notes in Computer Science, vol. 5339 of LNCS, 17 pgs. Springer-Verlag (2008).
Detti et al. "CONET: a content centric inter-networking architecture," ICN'11: Proceedings of the ACM SIGCOMM workshop on Information-centric networking, ACM, pp. 50-55 (Aug. 2011).
Detti et al., "Supporting the Web with an information centric network that routes by name," Computer Networks, vol. 56, iss. 17, pp. 3705-3722, DOI: 10.1016/j.comnet.2012.08.006 (2012).
Dierts et al., "The transport layer security (TLS) protocol version 1.2," IETF RFC 5246 (2008).
Dijkstra et al., "Derivation of a Termination Detection Algorithm for Distributed Computations," In: Broy, M. (eds) Control Flow and Data Flow: Concepts of Distributed Programming. Springer Study Edition, vol. 14, Springer, Berlin, Heidelberg, DOI: 10.1007/978-3-642-82921-5_13 (1986).
Dijkstra et al., "Termination detection for diffusing computations," Information Processing Letters, vol. 11, iss. 1, pp. 1-4 (Aug. 29, 1980).
Dijkstra, W. Feijen, and A.J.M. Van Gasteren, "Derivation of a Termination Detection Algorithm for Distributed Computations," Information Processing Letter, vol. 16, No. 5, 3 pgs. (1983).
Estrin et al., "Directed diffusion: a scalable and robust communication paradigm for sensor networks," MobiCom '00: Proceedings of the 6th annual international conference on Mobile computing and networking, pp. 56-67, DOI: 10.1145/345910.345920 (Aug. 2000).
Fall et al., "DTN: An Architectural Retrospective," IEEE Journal on Selected Areas in Communications, vol. 26, No. 5, Jun. 1, 2008, pp. 828-836.
Fayazbakhsh et al., "Less pain, most of the gain: Incrementally deployable ICN," ACM SIGCOMM Computer Communication Review, vol. 43, No. 4, pp. 147-158 (2013).
Garcia et al., "A resilient condition assessment monitoring system," 5th International Symposium on Resilient Control Systems, Salt Lake City, UT, USA, pp. 98-105, DOI: 10.1109/ISRCS.2012.6309301 (2012).
Garcia-Luna-Aceves, J., "A unified approach to loop-free routing using distance vectors or link states," ACM SIGCOMM Computer Communication Review, vol. 19, iss. 4, pp. 212-223, DOI: 10.1145/75247.75268 (1989).
Garcia-Luna-Aceves, J., "Name-Based Content Routing in Information Centric Networks Using Distance Information," ACM-ICN '14: Proceedings of the 1st ACM Conference on Information-Centric Networking, pp. 7-16, DOI: 10.1145/2660129.2660141 (Sep. 2014).
Garnepudi et al., "Proactive, reactive and hybrid multicast routing protocols for Wireless Mesh Networks", 2013 IEEE International Conference on Computational Intelligence and Computing Research, Enathi, India, pp. 1-7, DOI: 10.1109/ICCIC.2013.6724255 (2013).
Gasti et al., "DoS & DDoS in Named Data Networking," 2013 22nd International Conference on Computer Communication and Networks (ICCCN), Nassau, Bahamas, pp. 1-7, DOI: 10.1109/ICCCN.2013.6614127 (2013).
Gentry et al., "Hierarchical ID-Based Cryptography," Advances in Cryptology—ASIACRYPT 2002, LNCS 2501, pp. 548-566 (2002).
Ghali et al., "Needle in a Haystack: Mitigating Content Poisoning in Named-Data Networking," NDSS'14: Proceedings of NDSS Workshop on Security of Emerging Networking Technologies (SENT), pp. 1-10 (2014).
Ghodsi et al., "Information-centric networking: seeing the forest for the trees," HotNets-X: Proceedings of the 10th ACM Workshop on Hot Topics in Networks, Article No. 1, pp. 1-6, DOI: 10.1145/2070562.2070563 (Nov. 2011).
Ghodsi et al., "Naming in content-oriented architectures," SIGCOMM ICN'11: Proceedings of the ACM SIGCOMM workshop on Information-centric networking, Toronto, Ontario, CA, pp. 1-6 (Aug. 19, 2011).
Ghosh et al., "Automatic Routing Using Multiple Prefix Labels", IEEE Ad Hoc and Sensor Networking Symposium, 5 pgs. (2012).
Gopal et al., "Integrating content-based Mechanisms with hierarchical File systems," OSDI '99: Proceedings of the third symposium on Operating systems design and implementation, pp. 265-278, (Feb. 1999).
Goyal et al., "Attribute-based encryption for fine-grained access control of encrypted data," CCS '06: Proceedings of the 13th ACM conference on Computer and communications security, pp. 89-98, DOI: 10.1145/1180405.1180418 (Oct. 2006).
Green et al., "Identity-based proxy re-encryption," in Proc. ACNS 2007, LNCS 4521, pp. 288-306, Zhuhai, China (Jun. 2007).
Gritter et al., "An Architecture for content routing support in the Internet," Proceedings of 3rd Usenix Symposium on Internet Technologies and Systems, pp. 37-48 (2001).
Guo et al., "Collaborative Forwarding and Caching in Content Centric Networks," Networking 2012, Lecture Notes in Computer Science, vol. 7289, Springer, Berlin, Heidelberg, DOI: 10.1007/978-3-642-30045-5_4 (14 pgs.).
Gupta et al., "Efficient Routing for Peer-to-Peer Overlays," NSDI'04: Proceedings of the 1st conference on Symposium on Networked Systems Design and Implementation, vol. 1, 9 pgs. (Mar. 2004).
Heckerman et al., "Decision-Theoretic Troubleshooting," Communications of the ACM, vol. 38, No. 3, 9 pgs. (Mar. 1995).
Heinemeier et al., "Uncertainties in Achieving Energy Savings from HVAC Maintenance Measures in the Field," ASHRAE Transactions, vol. 118, pt. 2, 8 pgs. (Jun. 2012).
Herlich et al., "Optimizing Energy Efficiency for Bulk Transfer Networks," Apr. 13, 2010, pp. 1-3, retrieved for the Internet: URL: http://www.cs.uni-paderborn.de/fileadmin/informationik/ag-karl/publications/miscellaneous/optimizing.pdf (retrieved on Mar. 9, 2012).
Hoque et al., "NLSR: Named-data Link State Routing Protocol," ICN '13: Proceedings of the 3rd ACM SIGCOMM workshop on Information-centric networking, Hong Kong, CN, pp. 15-20 (Aug. 2013).
Hoque et al., "NLSR: Named-data Link State Routing Protocol," ICN'13, Aug. 12, 2013, Hong Kong, CN (6 pgs.).
Hur et al., "Attribute-based access control with efficient revocation in data outsourcing systems," IEEE Transactions on Parallel and Distributed Systems, vol. 22, No. 7, pp. 1214-1221, DOI: 10.1109/TPDS.2010.203 (Jul. 2011).
Hur, J., "Improving security and efficiency in attribute-based data sharing," IEEE Transactions on Knowledge and Data Engineering, vol. 25, No. 10, pp. 2271-2282, DOI: 10.1109/TKDE.2011.78 (Oct. 2013).
Ion et al., "Toward content-centric privacy in ICN: Attribute-based encryption and routing," SIGCOMM '13: Proceedings of the ACM SIGCOMM 2013 conference on SIGCOMM, pp. 513-514, DOI: 10.1145/2486001.2491717 (Aug. 2013).
Jacobson et al. "VoCCN: Voice Over Content-Centric Networks," Dec. 1, 2009, ReArch'09, Rome, Italy, ACM.
Jacobson et al., "Custodian-Based Information Sharing," IEEE Communications Magazine, vol. 50, No. 7, pp. 38-43, DOI: 10.1109/MCOM.2012.6231277 (Jul. 2012).
Jacobson et al., "Networking Named Content," CoNEXT '09: Proceedings of the 5th international conference on Emerging networking experiments and technologies, pp. 1-12, DOI: 10.1145/1658939.1658941 (Dec. 2009).
Jacobson, Van et al., "Content-Centric Networking, Whitepaper Describing Future Assurable Global Networks," Palo Alto Research Center, Inc., pp. 1-9 (Jan. 30, 2007).
Jahid et al., "EASiER: Encryption-based access control in social network with efficient revocation," ASIACCS '11: Proceedings of the 6th ACM Symposium on Information, Computer and Communications Security, pp. 411-415, DOI: 10.1145/1966913.1966970 (Mar. 2011).
Ji et al., "Prognostics enabled resilient control for model-based building automation systems," Proceedings of Building Simulation 2011: Proceedings of the 12th Conference of International Building Performance Simulation Association, Sydney, AU, pp. 286-293 (Nov. 2011).
Kamara et al., "Cryptographic cloud storage," Financial Cryptography and Data Security, FC 2010, Lecture Notes in Computer Science, vol. 6054, pp. 136-149, Springer, Berlin, Heidelberg, DOI: 10.1007/978-3-642-14992-4_13 (2010).

(56) References Cited

OTHER PUBLICATIONS

Katipamula et al., "Review Article: Methods for Fault Detection, Diagnostics, and Prognostics for Building Systems—A Review, Part II," HVAC&R Research 11:2, pp. 169-187 (2005).

Katipamula et al., "Review article: methods for fault detection, diagnostics, and prognostics for building systems a review, Part I." Review Article: Methods for Fault Detection, Diagnostics, and Prognostics for Building Systems—A Review, Part I, HVAC&R Research, 11:1, pp. 3-25, DOI: 10.1080/10789669.2005.10391123 (2005).

Kaya et al., "A Low Power Lookup Technique for Multi-Hashing Network Applications," IEEE Computer Society Annual Symposium on Emerging VLSI Technologies and Architectures (ISVLSI'06), Karlsruhe, Germany, 6 pgs., DOI: 10.1109/ISVLSI.2006.3 (2006).

Koponen et al., "A Data-Oriented (and Beyond) Network Architecture," SIGCOMM '07: Proceedings of the 2007 Conference on Applications, Technologies, Architectures, and Protocols for Computer Communications, Aug. 27-31, 2007, Kyoto, Japan, ACM, p. 181-192, DOI:10.1145/1282380.1282402.

Kulkarni et al., "Implementation of a prototype active network," 1998 IEEE Open Architectures and Network Programming, San Francisco, CA, USA, pp. 130-142, DOI: 10.1109/OPNARC.1998.662049 (1998).

Kumar et al., "Peacock Hashing: Deterministic and Updatable Hashing for High Performance Networking," IEEE INFOCOM 2008—The 27th Conference on Computer Communications, Phoenix, AZ, USA, pp. 101-105, DOI: 10.1109/INFOCOM.2008.29 (2008).

Lee et al., "On-demand Multicast Routing Protocol in Multihop Wireless Mobile Networks," Mobile Networks and Applications, vol. 7, No. 6, pp. 441-453 (2002).

Li et al., "Coping with node misbehaviors in ad hoc networks: A multi-dimensional trust management approach," 2010 Eleventh International Conference on Mobile Data Management, Kansas City, MO, USA, pp. 85-94, DOI: 10.1109/MDM.2010.57 (2010).

Liang et al., "A Ciphertext-policy attribute-based proxy re-encryption with chosen-ciphertext security," 2013 5th International Conference on Intelligent Networking and Collaborative Systems, Xi'an, CN, pp. 552-559, DOI: 10.1109/INCoS.2013.103 (2013).

Liu et al., "A TLV-Structured Data Naming Scheme for Content-Oriented Networking," IEEE International Conference on Communications (ICC), Ottawa, ON, Canada, 2012, pp. 5822-5827, DOI: 10.1109/ICC.2012.6364710 (2012).

Lopez et al., "Trust management systems for wireless sensor networks: Best practices," Computer Communications, vol. 33(9), pp. 1086-1093, DOI: 10.1016.j.comcom.2010.02.006 (Jun. 2010).

Lotspeich et al., "Anonymous trust: Digital rights management using broadcast encryption," Proceedings of the IEEE, vol. 92, No. 6, pp. 898-909< DOI: 10.1109/JPROC.2004.827353 (Jun. 2004).

Ishiyama et al., "On the Effectiveness of Diffusive Content Caching in Content-Centric Networking", 2012 9th Asia-Pacific Symposium on Information and Telecommunication Technologies (APSITT), Santiago and Valparaiso, Chile, pp. 1-5 (2012).

Mahadevan et al., "CCN-krs: A key resolution service for ccn," ACM-ICN '14: Proceedings of the 1st ACM Conference on Information-Centric Networking, pp. 97-106, DOI: 10.1145/2660129.2660154 (Sep. 2014).

Mahadevan et al., "Orbis: rescaling degree correlations to generate annotated internet topologies," ACM SIGCOMM Computer Communication Review, vol. 37, iss. 4, pp. 325-336, DOI: 10.1145/1282427.1282417 (Oct. 2007).

Mahadevan et al., "Systematic topology analysis and generation using degree correlations," ACM SIGCOMM Computer Communication Review, vol. 36, iss. 4, pp. 135-146, DOI: 10.1145/1151659.1159930 (Oct. 2006).

Matocha et al., "A taxonomy of distributed termination detection algorithms," Journal of Systems and Software 43(3): 207-221 (1998).

Mcwilliams et al., "Home Energy Article: A Systems Approach to Retrofitting Residential HVAC Systems," Technical Report, Lawrence Berkeley National Laboratory, LBNL-57406, DOI: 10.2172/887199 (2005).

Merindol et al., "An efficient algorithm to enable path diversity in link state routing networks," Computer Networks, vol. 55, iss. 5, pp. 1132-1140 (Apr. 2011).

Misra et al., "Secure content delivery in information-centric networks: Design, implementation, and analyses," in Proc. ACM SIGCOMM ICN 2013, Hong Kong, China, pp. 73-78 (Aug. 2013). Mobility First Project [online], URL: http://mobilityfirst.winlab.rutgers.edu/, Downloaded Mar. 9, 2015.

Moldovan, "Streaming Rows of SQL Server Data to a Table Valued Parameter Using a SQLDataReader," MSSQLTips.com, (Mar. 2011) URL: https://www.mssqltips.com/sqlservertip/2338/streaming-rows-of-sql-server-data-to-a-table-valued-parameter-using-a-sqldatareader/; (Year:2011).

Nadeem, J., "Analysis and design of quality link metrics for routing protocols in Wireless Networks," PhD Thesis Defense, Universite Paris-Est (Dec. 15, 2010).

Naor et al., "Efficient trace and revoke schemes," In: Frankel, Y. (eds) Financial Cryptography, FC 2000, Lecture Notes in Computer Science, vol. 1962, Springer, Berlin, Heidelberg, 20 pgs., DOI: 10.1007/3-540-45472-1_1 (2001).

Narasimhan et al., "HyDE—A General Framework for Stochastic and Hybrid Model-based Diagnosis," Proc. DX 7, pp. 162-169 (2007).

NDN Project [online], URL: http://www.named-data.net/, Downloaded Mar. 9, 2015.

Nystrom et al., "PKCS#12: Personal information exchange syntax v. 1.1," IETF RFC 7292, K. Moriarty, Ed., DOI: 10.17487/RFC7292 (Jul. 2014).

Omar et al., "Certification-based trust models in mobile ad hoc networks: A survey and taxonomy," Journal of Network and Computer Applications 35(1): 268-286 (Jan. 2012).

Parsa et al., "A Protocol for Scalable Loop-free Multicast Routing," IEEE Journal on Selected Areas in Communications, vol. 15, No. 3, pp. 316-331, DOI: 10.1109/49.564131 (Apr. 1997).

Psaras et al., "Modelling and evaluation of CCN-caching trees," Networking 2011, Lecture Notes in Computer Science, vol. 6640, Springer, Berlin, Heidelberg, DOI: 10.1007/978-3-642-20757-0_7 pp. 78-91 (May 2011).

Rescorla et al., "Datagram transport layer security," IETF RFC 4347, (Apr. 2006).

Rodriguez et al., "The Graph Traversal Pattern," Graph Data Management, pp. 29-46, DOI:10.4018/978-1-61350-053-8.ch002 (Year: 2010).

Rosenberg, J. "Interactive Connectivity Establishment (ICE): A Protocol for Network Address Translator (NAT) Traversal for Offer/Answer Protocols," Internet Engineering Task Force (IETF), RFC: 5245, URL: https://www.rfc-editor.org/rfc/rfc5245, Apr. 2010, pp. 1-117.

RTMP (2009). Available online at http://wwwimages.adobe.com/www.adobe.com/content/dam/Adobe/en/devnet/rtmp/pdf/rtmp specification 1.0.pdf.

Sail Project, "Scalable and Adaptive Internet Solutions (SAIL) Project," [online], URL: http://sail-project.eu/, Downloaded Mar. 9, 2015.

Sandvine, "Global Internet Phenomena Report—Spring 2012," [online] URL: https://www.sandvine.com/hubfs/Sandvine_Redesign_2019/Downloads/Internet%20Phenomena/2012-1h-global-internet-phenomena-report.pdf (2012).

Schein et al., "A Simulation Study of a Hierarchical, Rule-Based Method for System-Level Fault Detection and Diagnostics in HVAC Systems," NIST Interagency/Internal Report (NISTIR), National Institute of Standards and Technology, Gaithersburg, MD, [online], (NISTIR-7216), 23 pgs., URL: https://tsapps.nist.gov/publication/get_pdf.cfm?pub_id=860972 (Apr. 2005).

Screen Capture: https://code.google.com/p/ccnx-trace/ (Project Created 2012).

Shani et al., "A survey of point-based POMDP solvers," Autonomous Agents and Multi-Agent Systems, vol. 27, pp. 1-51 (2013).

(56) References Cited

OTHER PUBLICATIONS

Shao et al., "CCA-Secure Proxy Re-Encryption without Pairings," Public Key Cryptography—PKC 2009, Lecture Notes in Computer Science, vol. 5443, 20 pgs., Springer, Berlin, Heidelberg, DOI: 10.1007/978-3-642-00468-1_20 (2009).
Sheppard et al., "A formal analysis of fault diagnosis with d-matrices," Journal of Electronic Testing 23(4): 309-322 (2007).
Shih et al., "Wake on Wireless: An Event Driven Energy Saving Strategy for Battery Operated Devices," MobiCom '02: Proceedings of the 8th Annual International Conference on Mobile Computing and Networking, Sep. 23, 2002, pp. 160-171.
Shneyderman et al., "Mobile VPN: Delivering Advanced Services in Next Generation Wireless Systems," pp. 3-29 (Jan. 2003).
Smetters et al., "CCNx Access Control Specifications," PARC, Tech. Rep., Jul. 30, 2010.
Soh et al., "Efficient Prefix Updates for IP Router Using Lexicographic Ordering and Updateable Address Set," IEEE Transactions on Computers, vol. 57, No. 1, pp. 110-125, DOI: 10.1109/TC.2007.70776 (Jan. 2008).
Solis et al., "Robust content dissemination in disrupted environments," CHANTS '08: Proceedings of the third ACM workshop on Challenged networks, pp. 3-10, DOI: 10.1145/1409985.1409988 (Sep. 2008).
Sun et al., "A framework for model-based repair," AAAI'93: Proceedings of the eleventh national conference on Artificial intelligence, pp. 182-187 (Jul. 1993).
Techopedia, "Database Management Systems (DBMS)," (Jul. 23, 2011) URL: https://web.archive.org/web/20110723213424/https://www.techopedia.com/definition/24361/database-management-systems-dbms (Year: 2011).
The Despotify Project (2012). Available online at http://despotify.sourceforge.net/.
Trossen et al., "Designing and realizing and information-centric internet," IEEE Communications Magazine, vol. 50, No. 7, pp. 60-67, DOI: 10.1109/MCOM.2012.6231280 (Jul. 2012).
Tyson et al., "A trace-driven analysis of caching in content-centric networks," 2012 21st International Conference on Computer Communications and Networks (ICCCN), Munich, Germany, pp. 1-7, DOI: 10.1109/ICCCN.2012.6289181 (2012).
Tzeng et al., "A public-key traitor tracing scheme with revocation using dynamic shares," In: Kim, K. (eds) Public Key Cryptography, PKC 2001, Lecture Notes in Computer Science, vol. 1992, pp. 207-224, Springer, Berlin, Heidelberg, DOI:10.1007/3-540-44586-2_16 (2001).
Varvello et al., "Caesar: A Content Router for High-Speed Forwarding," ICN'12, Second Edition on Information-Centric Networking, New York, 6 pgs. (Aug. 2012).
Verma et al., "Probabilistic models for monitoring and fault diagnosis," The Second IARP and IEEE/RAS Joint Workshop on Technical Challenges for Dependable Robots in Human Environments, Raja Chatila (ed.) (Oct. 2002).
Vutukury et al., "A simple approximation to minimum-delay routing," ACM SIGCOMM Computer Communication Review, vol. 29, iss. 4, pp. 227-238, DOI:10.1145/316194.316227 (Oct. 1999).
Waldvogel, M., "Fast Longest Prefix Matching: Algorithms, Analysis, and Applications," A dissertation submitted to the Swiss Federal Institute of Technology Zurich (2002).
Walfish et al., "Untangling the web from DNS," Conference: 1st Symposium on Networked Systems Design and Implementation (NSDI 2004), Mar. 29-31, 2004, San Francisco, California, USA (14 pgs.).
Walker, I., "Best practices guide for residential HVAC Retrofits," Lawrence Berkeley National Lab. (LBNL), No. LBNL-53592, 31 pgs., Berkeley, CA (US) (Aug. 2003).
Wang et al., "Hierarchical attribute-based encryption for fine-grained access control in cloud storage services," CCS'10: Proc. Of the 17th ACM Conference on Computer and Communications Security, pp. 735-737, DOI: 10.1145/1866307.1866414 (Oct. 2010).

Wang et al., "OSPFN: An OSPF Based Routing Protocol for Named Data Networking," NDN Technical Report NDN-0003, 15 pgs. (2012).
Wang, J. et al., "DMND: Collecting Data from Mobiles Using Named Data," 2010 IEEE Vehicular Networking Conference, Jersey City, NJ, USA, pp. 49-56, DOI: 10.1109/VNC.2010.5698270 (2010).
Wetherall, D., "Active Network vision and reality: Lessons form a capsule-based system," 17th Symposium on Operating Systems Principles, pp. 64-79 (Dec. 1999).
Wolman et al., "On the scale and performance of cooperative web proxy caching," ACM SIGHOPS Operating Systems Review, vol. 33, No. 5, pp. 16-31, Dec. 1999.
Wood et al., "Flexible end-to-end content security in CCN," 2014 IEEE 11th Consumer Communications and Networking Conference (CCNC), Las Vegas, NV, USA, 2014, pp. 858-865, DOI: 10.1109/CCNC.2014.6940528.
Xiong et al., "CloudSeal: End-to-End Content Protection in Cloud-based Storage and Delivery Services," In: Rajarajan et al. (eds) Security and Privacy in Communication Networks, SecureComm 2011, Lecture Notes of the Institute for Computer Sciences, Social Informatics and Telecommunications Engineering, vol. 96, Springer, Berlin, Heidelberg, DOI: 10.1007/978-3-642-31909-9_30 (2012).
Xylomenos et al., "A survey of information-centric networking research," IEEE Communications Surveys & Tutorials, vol. 16, No. 2, pp. 1024-1049, Second Quarter 2014, DOI: 10.1109/SURV.2013.070813.00063 (Jul. 2013).
Yi et al., "A case for stateful forwarding plane," Computer Communications, vol. 36, iss. 7, pp. 779-791 (2013).
Yi et al., "Adaptive forwarding in named data networking," ACM SIGCOMM Computer Communication Review, vol. 42, iss. 3, pp. 62-67 (2012).
Yu et al., "Achieving secure, scalable, and fine-grained data access control in cloud computing," 2010 Proceedings IEEE INFOCOM, San Diego, CA, USA, pp. 1-9 (2010).
Zahariadis et al., "Trust management in wireless sensor networks," European Transactions on Telecommunications, 21(4), pp. 386-395, DOI: 10.1002/ett.1413 (2010).
Zhang et al., "Named data networking," ACM SIGCOMM Computer Communication Review, vol. 44, iss. 3, pp. 66-73 (2014).
Zhang, et al., "Named Data Networking (NON) Project", http://www.parc.com/publication/2709/named-data-networking-ndn-project.html, NDN-0001, PARC Tech Report (Oct. 2010).
Zhou et al., "Achieving secure role-based access control on encrypted data in cloud storage," IEEE Transactions on Information Forensics and Security, vol. 8, No. 12, pp. 1947-1960 (Dec. 2013).
Zhuang et al., "Managing Ad Hoc Networks of Smartphones," International Journal of Information and Education Technology, vol. 3, No. 5, 7 pgs. (Oct. 2013).
Asatiani et al., "Turning Robotic Process Automation into Commercial Success—Case Opuscapita," Teaching Case, pp. 1-18, 2016.
Gephi 0.9.1 Release (Feb. 14, 2016), Github, URL:https://github.com/gephi/gephi/releases/tag/v0.9.1 (Year: 2016), 4 pages.
Gephi requirements, Dec. 8, 2015, Gephi.org, URL: https://web.archive.org/web/20151208052328/http://gephi.org:80/users/requirements/ (Year: 2015), 1 page.
Screenshots from Gephi 0.9.1 (May 9, 2023), 5 pages.
Heymann, S., "Gephi blog: GSoC mid-term: new visualization in API," Wordpress.com, URL: https://gephi.wordpress.com/2011/08/12gsoc-mid-term-new-visualization-api/ (Year: 2011), 6 pages.
"Advisory Opinion re: Petition No. S050314A", New York State Department of Taxation and Finance, Office of Tax Policy Analysis Taxpayer Guidance Division, 2008, retrieved from https://www.tax.ny.gov/pdf/advisory_opinions/sales/a08_28s.pdf.
Dickinson, "Why Gay Guys Love Using Grindr To Hook Up And Make Friends", Insider, Feb. 14, 2012, retrieved from https://www.businessinsider.com/why-gay-guys-love-using-grindr-to-hook-up-and-make-friends-2012-1.
"Facebook Unveils Facebook Ads", Facebook, Nov. 6, 2007, retrieved from www.about.fb.com/news/2007/11/facebook-unveils-facebook-ads/.
"Foursquare's 1st Pitch Deck", 2009, retrieved from https://www.slideshare.net/alkarmi/foursquare-1 stpitch2009.

(56) References Cited

OTHER PUBLICATIONS

"Gimbal Rest API", Gimbal Inc., 2013, available at https://docs.gimbal.com/rest.html.
"Gowalla", Wikipedia, https://en.wikipedia.org/wiki/Gowalla.
"In Pictures: All about Foursquare", Forbes, Apr. 7, 2010, retrieved from https://www.forbes.com/2010/04/07/iphone-mobile-android-technology-data-companies-10-foursquare_slide.html?sh=6a70a35328a2.
"Magitti on the move", The Economic Times, English Ed., retrieved from https://economictimes.indiatimes.com/as-you-like-it/magitti-on-the-move/printarticle/2568170.cms.
Miami Staff, "Grindr Anyone?", Miami Herald, Mar. 26, 2010, retrieved from https://www.miamiherald.com/miami-com/things-to-do/article225856080.html.
Miller, "Take a Step Closer for an Invitation to Shop", New York Times, Feb. 22, 2010, retrieved from https://www.nytimes.com/2010/02/23/business/media/23adco.html.
"Nike+ SportBand User's Guide", 2008, retrieved from https://www.manualslib.com/manual/259083/Nike-NikePlus-Sportband.html.
"UK Carrier O2 Teams with Placecast for LBS Opt-In Marketing to a Million Consumers", Internet 2 Go, Oct. 14, 2010, retrieved from http://internet2go.net/news/carriers/uk-carrier-o2-teams-placecast-lbs-marketing-million-consumers.
"Visa enhances fraud detection service for VisaNet processing platform", The PayPers, Jan. 20, 2011, retrieved from https://thepaypers.com/cards/visa-enhances-fraud-detection-service-for-visanet-processing-platform--742952.
"Visa Strategy Manager Boosts Issuer Fraud Detection", Visa, Apr. 11, 2012, retrieved from https://usa.visa.com/about-visa/newsroom/press-releases.releaseId.9101.html.
"Visa Transaction Alerts make North American debut", Nov. 17, 2009, retrieved from https://www.finextra.com/pressarticle/31025/visa-transaction-alerts-make-north-american-debut.
Wattanajantra, "Nike+ GPS app for iPhone: Track runs without a sensor in your shoe", CNET, Sep. 8, 2010, retreieved from https://www.cnet.com/news/nike-gps-app-for-iphone-track-runs-without-a-sensor-in-your-shoe/.
"We've just made the "Places" screen smarter!", retrieved from https://web.archive.org/web/20100531082001/http://blog.foursquare.com:80/post/589698188/weve-just-made-the-places-screen-smarter.
"Why Should You Advertise on Facebook?", Facebook, Nov. 11, 2011, retrieved from https://web.archive.org/web/20111111002041/http:/www.advertisementinfacebook.com/why-advertise-on-facebook.html.
Williams, et al., "Role of a Personal Assistant in Delivering Personalised Context-Aware Services to Young People", 2002, retrieved from https://citeseerx.ist.psu.edu/viewdoc/download?doi=10.1.1.11.8614&rep=rep1&type=pdg.
Young, "Getting the Message: How the Internet is Changing Advertising," Harvard Business School, retrieved at https://hbswk.hbs.edu/item/ getting-the-message-how- the-internet-is-changing- advertising.
Zee, "Foursquare who? 'Gowalla' might just be where it's at.", Gowalla, Sep. 22, 2009, retrieved from https://thenextweb.com/2009/09/22/square-gowalla/.
Balabanovic et al., "FAB: Content-Based, Collaborative Recommendation", 1997, retrieved from https://web.archive.org/web/19971021223905/http://fab.stanford.edu:80/.
Chakrabarti et al., "Focused crawling: a new approach to topic-specific Web resource discovery", WWW '99 Proceedings of the Eighth International Conference on World Wide Web, 1999.
Forrest, "Citysense: Lets You Know What Everybody's Doing", Sense Networks, retrieved from https://web.archive.org/web/20080701034213/http://radar.oreilly.com/archives/2008/ 06/citysense-reality-mining- iphone.html.
Lieberman, "Letizia: An Agent That Assists Web Browsing,", The Lieberary: Henry Lieberman's On-Line Library. etrieved from https://web.archive.org/web/20040426134417/http://web.media.mit.edu~lieber/Lieberary/Lieberary.html.
Mladenic, "Machine Learning Used by Personal Personal WebWatcher," Proceedings of ACAI-99 Workshop on Machine Learning and Intelligent Agents, 1999.
WebMate website, retrieved from https://web.archive.org/ web/20010210064517/http://www.cs.cmu.edu/~softagents/webmate/Introduction.html.
"BINGO!: Bookmark—Induced Gathering of Information", PowerPoint, Dec. 14, 2002.
"DAFFODIL (Distributed Agents for User-Friendly Access of Digital Libraries): The Underlying Concepts", PowerPoint, Feb. 27, 2004.
"ScreenTonic—At a glance", ScreenTonic SA, Feb. 9, 2008, retrieved from https://web.archive.org/web/20080209135205/http://www.screentonic.com/at-a-glance1.htm.
"ss2.jpg", Oct. 11, 2007, retrieved from https://web.archive.org/web/20071011044752im_/http://robbiehanson.com/alarmclock/images/ss2.jpg.
"ss4.jpg", Oct. 11, 2007, retrieved from https://web.archive.org/web/ 20071011044752im_/http://robbiehanson.com/alarmclock/images/ss4.jpg.
"ss5.jpg", Oct. 11, 2007, retrieved from https://web.archive.org/web/ 20071011044752im_/http:/robbiehanson.com/alarmclock/images/ss5.jpg.
"ss6.jpg", Oct. 11, 2007, retrieved from https://web.archive.org/web/ 20071011044752im_/http://robbiehanson.com/alarmclock/images/ss6.jpg.
"Stamp-Technology", ScreenTonic SA, Feb. 13, 2008, retrieved from https://web.archive.org/web/20080213054711/http://www.screentonic.com/stamp- technology.htm.
"Targeted Mobile Advertising", Nov. 21, 2008, retrieved from https://web.archive.org/web/ 20081121201849/http://www.xiam.com/xiam.solutions.targeted.advertising.shtml.
"What's New", Oct. 11, 2007, retrieved from https://web.archive.org/web/ 20071011034402/http://robbiehanson.com/alarmclock/whatsNew.html.
"Xerox Extensible Interface Platform (EIP)" Xerox Corporation, 2006, retrieved from https://www.comdat.ch/download/pictures/0e/rv3wgtpblgfwvuit5x53eaztpe9at5/eip_your_work_just_got_easier.pdf.
Facebook Website as it existed and was publicly available prior to the effective filing date of the '190 patent, Facebook, Inc., retrieved from www.facebook.com, 2004.
MyExperience, Jun. 1, 2007, retrieved from www.myexperience.sourceforge.net.
WebGlimpse Website, retrieved from https://web.archive.org/web/20000815205534/http://webglimpse.org:80/.
Callihan, "Learn HTML In a Weekend", Prima Publishing, 1998, available at: https://archive.org/deta ils/learnhtmlinweeke00call.
Kamba et al., "An interactive, personalized, newspaper on the WWW", Multimedia Computing and Networking, 1996.
Kamba et al., "Anatagonomy: a personalized newspaper on the World Wide Web", Int'l J. Human Computer Studies, 1997, p. 789-803, vol. 46.
Bharat et al., "Personalized, interactive news on the Web", Multimedia Systems 6, 1997, 22 pages.
"Mapping a City's Rhythm—MIT Technology Review", MIT, retrieved from https://www.technologyreview.com/s/412529/mapping-a-citys-rhythm.
"ESRI's Geospatial Computer-Aided Dispatch", Dec. 2007, ESRI.
"Personalization & Discovery", Qualcomm.com, Sep. 15, 2008, retrieved from https://web.archive.org/web/20080915111528/http://www.qualcomm.com/products_services/mobile_content_services/personalization_discovery.html.
"Qualcomm Acquires Xiam Technologies Limited, Leading Provider of Wireless Content Discovery and Recommendations Technology", Xiam Technologies, Mar. 11, 2008, retrieved from https://web.archive.org/web/20080808140641/http://www.xiam.com/press/2008-03-11-QualcommXiam.shtml.
Abraham, "Business Intelligence from Web Usage Mining", PARC, 2003.
BallBug, 2010, available at www.ballbug.com.
Joachims et al., "WebWatcher: Machine Learning and Hypertext", Carnegie Mellon University, 1995, 5 pages.

(56) References Cited

OTHER PUBLICATIONS

Berendt et al., "Towards Semantic Web Mining", The Semantic Web—ISWC, ISWC 2002 Lecture Notes in Computer Science, 2002.
Blogniscient, 2010, available at www.blogniscient.com.
BlogRunner, 2010, available at www.blogrunner.com.
Chirita et al., "PROS: A Personalized Ranking Platform for Web Search", AH 2004: Adaptive Hypermedia and Adaptive Web-Based Systems, 2004.
Cloudee, 2010, available at www.cloudrunner.com.
Daylife, 2010, available at www.daylife.com.
Loreto et al., "Known Issues and Best Practices for the Use of Long Polling and Streaming in Bidrectional HTTP", Internet Engineering Task Force, 2011.
Malik, "Using the iPhone to Mine for Gold & Sense", Gigaom.com, Jun. 9, 2008, retrieved from https://gigaom.com/2008/06/09/sense-networks-citysense.
Marmasse et al., "Safe & Sound: A Wireless Leash", Short Talk: Trust, Security & Safety, Apr. 5-10, 2003, pp. 726-727, CHI 2003: New Horizons, Ft. Lauderdale, USA.
Memeorandum, 2010, available at www.memeorandum.com.
Meyers et al., "The Downloader's Companion for Windows", Prentice Hall PTR, 1995.
Mladenic, "Using Text Learning to Help Web Browsing", Proceedings of the Ninth Int'l Conf. on Human-Computer Interaction, 2001.
Newcomb, "Yahoo SmartAds: Super-Targeted Display Ads", Search Engine Watch, Jul. 2, 2007, retrieved from https://www.searchenginewatch.com/2007/07/02/yahoo-smartads-super-targeted-display-ads/.
Paliouras et al., "PNS: A personalized news aggregator on the web", Intelligent Interactive Systems in Knowledge-based Environments, 2008.
Paliouras et al., "PNS: Personalized multi-source news delivery", International Conference on Knowledge-Based and Intelligent Information and Engineering Systems, 2006.
Pant et al., "Crawling the Web", Web Dynamics, 2004, Springer, Berlin, Germany.
Petersen et al., "PALLAS: Personalised Language Learning on Mobile Devices", Fifth IEEE International Conference on Wireless, Mobile, and Ubiquitous Technology in Education, 2006.
Pirolli et al., "Silk from a Sow's Ear: Extracting Usable Structures from the Web", Conference on Human Factors in Computing Systems (CHI '96), Apr. 13-18, 1996.
Pitkow et al., "Mining Longest Repeating Subsequences to Predict World Wide Web Surfing", Proceedings of USITS'99: The 2nd USENIX Symposium on Internet Technologies & Systems, 1999.
Ramakrishnan, "The PointCast Network", PointCast Inc., retrieved from https://dl.acm.org/doi/abs/10.1145/276304.276361.
Rao, "Placecast Brings Location-Based Shopping Alerts To Retailer Smartphone Apps", TechCrunch, Aug. 22, 2011, retrieved from https://techcrunch.com/2011/08/22/placecast-brings-location-based-shopping-alerts-to-smartphone-apps/.
Rodriguez, "RESTful Web Services: The Basics", IBM DeveloperWorks, 2008.
Seo et al., "Learning User's Preferences by Analyzing Web-Browsing Behaviors", Proceedings of the Fourth International Conference on Autonomous Agents, 2000.
Sharp et al., "Establishing Requirements for a Mobile Learning System", Mobilearn Case Study 10.2, 2007.
Sharples et al., "Big Issues in Mobile Learning", Report of a Workshop by Kaleidoscope Network of Excellence Mobile Learning Initiative, 2006.
Sharples et al., "Towards a Theory of Mobile Learning", MLEARN, 2005.
TechMeme, 2010, available at www.techmeme.com.
Technorati, 2010, available at www.technorati.com.
Theobald et al., "BINGO! And DAFFODIL: Personalized Exporation of Digital Libraries and Web Sources", 2004.
Wortham, "How Grindr is Changing the Way We Connect", The New York Times Mar. 10, 2013, retrieved from https://bits.blogs.nytimes.com/2013/03/10/how-grindr-is-changing-the-way-we-all-connect/.
Yao et al., "PagePrompter: An Intelligent Web Agent Created Using Data Mining Techniques, Rough Sets and Current Trends in Computing," Third International Conference RSTC, 2002, pp. 506-513.
Yau et al., "A context-aware and adaptive learning schedule framework for supporting learners' daily routines", Second International Conference on Systems, 2007.
Yeung et al., "A proactive personalised mobile recommendation system using analytic hierarchy process and Bayesian network", J. Internet Serv. Appl. 2012, p. 195-214, retrieved from https://link.springer.com/article/10.1007/s13174-012-0061-3.
Zafra, "Yahoo! Steps Up Online Advertising with SmartAds", Search Engine Journal, Jul. 2, 2007, retrieved from https://www.searchenginejournal.com/yahoo-steps-up-online-advertising-with-smartads/5245/#close.
Zuckerman, "Convention Highlights 'Push' Software for Web Browsers," Technology Cybertimes, New York Times, Feb. 16, 1996, retrieved from https://archive.nytimes.com/www.nytimes.com/library/cyber/week/1209software.html.
Banerjee et al., "Clickstream Clustering using Weighted Longest Common Subsequences", Proceedings of the Web Mining Workshop at the 1st SIAM Conference on Data Mining, Apr. 5-7, 2001.
Chi et al., "LumberJack: Intelligent Discovery and Analysis of Web User Traffic Composition", WEBKDD 2002—Mining Web Data for Discovering Usage Patterns and Profiles Conference, 2002.
Chi et al., "Using Information Scent to Model User Information Needs and Actions on the Web", ACM SIGCHI Conference on Human Factors in Computing Systems, 2001.
Cooley, "Data Preparation for Mining World Wide Web Browsing Patterns", WebMiner, 1999.
Cooley, "Discovery of Interesting Usage Patterns from Web Data", WebSIFT, 1999.
Cooley, "Web Mining: Information and Pattern Discovery on the World Wide Web", WebMiner, 1997.
Heer et al., "Identification of Web User Traffic Composition using Multi-Modal Clustering and Information Scent", Proceedings of the Workshop on Web Mining, SIAM Conference on Data Mining, 2001.
Hsu et al., "Ranking Comments on the Social Web", 2009 Int'l Conf. Computational Sci. & Engineering, 2009, vol. 4.
Kamba et al., "The Krakatoa Chronicle—An Interactive, Personalized, Newspaper on the Web", GVU Center Technical Reports, 1995.
Kosala et al., "Web Mining Research: A Survey", ACM SIGKDD Explorations Newsletter, 2000, vol. 2.
Maarek et al., "WebCutter: A System for Dynamic and Tailorable Site Mapping", 1998.
Mobasher et al., "Integrating Web Usage and Content Mining for More Effective Personalization", EC-Web 2000: Proceedings of the First International Conference on Electronic Commerce and Web Technologies, 2000.
Perkowitz, "Adaptive Web Sites: Automatically Synthesizing Web Pages", 1998.
Perkowitz, "Adaptive Web Sites: Conceptual Cluster Mining", 1999.
Perkowitz, "Towards Adaptive Web Sites: Conceptual Framework and Case Study", 2000.
Shahabi et al., "A Framework for Efficient and Anonymous Web Usage Mining Based on Client-Side Tracking". WebKDD 2001—International Workshop of Mining Web Log Data Across All Customer Touch Points, 2002.
Shahabi et al., "Knowledge Discovery from Users Web-Page Navigation", Proceedings of the Seventh International Workshop of Research Issues in Data Engineering. High Performance Database Management for Large-Scale Applications, 1997.
Shapira et al., "ePaper—the Personalized Mobile Newspaper", J. Am. Soc. Info. Sci. & Tech., 2009, vol. 60.
Sizov et al., "BINGO!: Bookmark-Induced Gathering of Information", Dec. 14, 2002.

(56) References Cited

OTHER PUBLICATIONS

Srivastava et al., "Web Usage Mining: Discovery and Applications of Usage Patterns from Web Dage", ACM SIGKDD, Jan. 2000.
Wang et al., "Unified relevance models for rating prediction in collaborative filtering", ACM Transactions on Information Systems, 2008.
Wang et al., "Unifying user-based and item-based collaborative filtering approaches by similarity fusion", Proceedings of the 29th annual International ACM SIGIR Conference on Research and Development in Information Retrieval, 2006.
Wasfi et al., "Collecting User Access Patterns for Building User Profiles and Collaborative Filtering", IUI '99: Proceedings of the 4th International Conference on Intelligent User Interfaces, Dec. 1998, ACM 1999.
Weiss, "A Hierarchical Netwrok Search Engine that Exploits Content-Link Hypertext Clustering", 1996.
Wu, "SpeedTracer: A Web Usage Mining and Analysis Tool", 1998.
Yan et al., "From User Access Patterns to Dynamic Hypertest Linking", Computer Networks and ISDN Systems, 1996.
Zabala et al., "Calvin: A Personalized Web-Search Agent based on Monitoring User Actions", GI Jahrestagung, 2001.
Zaiane et al., "Discovering Web Access Patterns and Trends by Applying OLAP and Data Mining Technology on Web Logs", Proceedings IEEE International Forum on Research and Technology Advances in Digital Libraries—ADL '98, 1998.
Armstrong et al., "WebWatcher: A Learning Apprentice for the World Wide Web", 1995 AAAI Spring Symposium on Information Gathering from Heterogenous, Distributed Environments. 1995.
Ben-Shaul et al., "Adding support for dynamic and focused search with Fetuccino", 1999.
Chen et al., "WebMate: A Personal Agent for Browsing and Searching". The Robotics Institute Carnegie Mellon University, 1997.
Diligenti et al., "Focused Crawling Using Context Graphs", Proceedings of the 26th VLDB Conference, 2000, 8 pages, Cairo, Egypt.
Freitag et al., "WebWatcher: Knowledge Navigation in the World Wide Web", AAAI Technical Report FS-95-03, 1995.
Hersovici et al., "The shark-search algorithm—An application: tailored Web site mapping", Computer Networks and ISDN Systems, 1998, vol. 30, Issues 1-7.
Joachims et al., "WebWatcher: A Tour Guide for the World Wide Web", CMU-CS-96, 1996.
Keenoy et al., "Personalisation of Web Search", Intelligent Techniques for Web Personalization IJCAI 2003 Workshop, 2003.
Kirk, "Microsoft buys mobile advertising company ScreenTonic", Computerworld, May 3, 2007, retrieved from https://www.computerworld.com/article/2544849/microsoft-buys-mobile-advertising-company-screentonic.html.
Lieberman et al., "Exploring the Web with Reconnaissance Agents", Communications of the ACM, 2001, vol. 44, No. 8.
Lieberman et al., "Let's Browse: A Collaborative Web Browsing Agent", IUI '99: Proceedings of the 4th International Conference on Intelligent User Interfaces, 1998, pp. 65-68.
Lieberman, "Autonomous Interface Agents", CHI 97, Mar. 22-27, 1997.
Lieberman, "Letizia: An Agent That Assists Web Browsing", IJCAI '95: Proceedings of the 14th Int'l Joint Conf. on Artificial Intelligence, 1995, vol. 1.
Manber et al., "WebGlimpse—Combining Browsing and Searching", Usenix Technical Conference, 1997.
Mladenic, "Personal WebWatcher: Design and Implementation", Technical Report IJS-DP-7472, 1996.
Mladenic, "Text Learning and Related Intelligent Agents: A Survey", IEEE Intelligent Systems and Their Applications, 1999, pp. 44-54, vol. 14, issue 4.
Mladenic, "Machine Learning for Better Web Browsing", AAAI Technical Report SS-00-01, 2000.
Olston et al., "ScentTrails: Integrating Browsing and Searching on the Web", ACM Transactions on Computer-Human Interactions, 2003, pp. 1-21, vol. 10, No. 3.

Pazzani et al., "Adaptive Web Site Agents", Autonomous Agents and Multi-Agent Systems, 2002, Kluwer Academic.
Pazzani et al., "Identifying Interesting Websites", AAAI-96 Proceedings, 1996, pp. 54-61.
Pazzani et al., "Learning and Revising User Profiles: The Identification of Interesting Web Sites", Machine Learning, 1997, pp. 313-331, vol. 27.
Pazzani et al., "Machine Learning for User Modeling", User Modeling and User-Adapted Interaction, 2001, pp. 19-29, vol. 11.
Schwab et al., "Adaptivity through Unobtrusive Learning", Special Issue on Adaptivity and User Modeling, 2002.
Sugiyama et al., "Adaptive Web Search Based on User Profiles Constructed without Any Effort from Users", WWW 2004, 2004.
Wolber et al., "Exposing Document Context in the Personal Web", IUI '02: 7th International Conference on Intelligent User Interfaces, Jan. 13-16, 2002.
Wolber, "Navigating to Personal Web", JCDL Conference '04, 2004.
Yao et al., "PagePrompter: An Intelligent Agent for Web Navigation Created Using Data Mining Techniques", 2002.
"About Alarm Clock", Feb. 8, 2006, retrieved from https://web.archive.org/web/20060208031527/http://www.robbiehanson.com/alarmclock/index.html.
"About", Ad Revolver, Feb. 4, 2002, retrieved from https://web.archive.org/web/ 20020204042004/http://www.adrevolver.com:80/banner_manager/about.htm.
Advertiser Analytics, Twitter, Sep. 30, 2012, retrieved from https://web.archive.org/web/20120930215459/https:/business.twitter.com/en/advertise/analytics/.
Aun, "DoubleClick Aims to Give Deeper Insight into Rich Media Effecitveness", Click Z, Jan. 7, 2008, retrieved from https://www.clickz.com/doubleclick-aims-to-give-deeper-insight-into-rich-media-effectivness/58863/.
Beale et al., "Mobile Context Aware Systems: The Intelligence to Support Tasks and Effectively Utilise Resources", International Conference on Mobile Human-Computer Interaction, 2004, p. 240.
"CC/WC/WCP Detailed Specifications", Xerox Corporation, 2006, retrieved from https://www.office.xerox.com/latest/W55SS-01.PDF.
"Certified Products", Twitter, Mar. 7, 2013. retrieved from https://web.archive.org/web/20130307212611/https:/dev.twitter.com/programs/twitter-certified-products/products.
"Citysense", Sense Networks, Sep. 22, 2008, retrieved from https://web.archive.org/web/ 20080922000635/http://www.sensenetworks.com:80/citysense.php.
"Document Security Xerox CopyCentre/WorkCentre/WorkCentre Pro 232/238/245/255/265/275", Xerox Corporation, 2006, retrieved from https://www.office.xerox.com/latest/W7XFS-03U.PDF.
"Doubleclick Inc.", Encyclopedia.com entry, retrieved from https://www.encyclopedia.com/economics/encyclopedias-almanacs-transcripts-and- maps/doubleclick-Inc.
"FAQ", Ad Revolver, Feb. 4, 2002, retrieved from https://web.archive.org/web/20020204042401/http://www.adrevolver.com/banner_managerfaq.htm.
Froelich et al., "MyExperience: A System for In situ Tracing and Capturing of User Feedback on Mobile Phones", MobiSys '07, 2007, vol. 57.
"GNIP", Twitter, Dec. 14, 2012, retrieved from https://web.archive.org/web/20121214215529/https:/dev.twitter.com/programs/twitter-certified-products/gnip.
Hristova et al., "Ad-me: Wireless Advertising Adapted to the User Location, Device and Emotions," Proc. Of the 37th HI Int'l Conf. On System Sciences, 2004, retrieved from http://citeseerx.ist.psu.edu/viewdoc/download;jsessionid=2CD78FA3E058EB3BD48812F5EA10553B?doi=10.1.1.129.2870&rep=rep1&type=pdf.
Loecher et al., "CitySense: multiscale space time clustering of GPS points and trajectories", Joint Statistical Meeting (JSM), 2009, retrieved from http://www1.cs.columbia.edu~jebara/papers/CitySense. JSM2009.pdf.
"New York State Department of Taxation and Finance, Office of Tax Policy Analysis Taxpayer Guidance Division, Advisory Opinion re: Petition No. S050314A", Jun. 17, 2008, retrieved from https://www.tax.ny.gov/pdf/advisory_opinions/sales/a08_28s.pdf.

(56) References Cited

OTHER PUBLICATIONS

"PIQ Customer", 2013, retrieved from https://web.archive.org/web/20130405063947/http://www.placeiq.com/products/piq-customer-piq-customer/.
"PIQ Segments", 2013, retrieved from https://web.archive.org/web/20130404211709/http://www.placeiq.com/products/piq-segments-piq-segments/.
"PlaceIQ—Shyenne Horras", 2012, retrieved from https://shyennehorras.com/tag/placeiq/.
"PlaceIQ Blog", 2013, retrieved from https://web.archive.org/web/20130413102103/https://www.placeiq.com/blog/.
"Privacy", 2012, retrieved from https://www.placeiq.com/privacy/.
"Two new features for self-service advertisers" Twitter, Sep. 11, 2012, retrieved from https://web.archive.org/web/20120911135519/http:/advertising.twitter.com/2012/09/two-new-features-for-self-service.html.
"Targeting", Twitter, Mar. 7, 2013, retrieved from https://web.archive.org/web/20130307212103/https://business.twitter.com/targeting.
"The new Twitter Ads center", Twitter, Mar. 16, 2013, retrieved from https://web.archive.org/web/20130316005334/http:/advertising.twitter.com/2013/03/The-new-Twitter-Ads-center.html.
"The Streaming APIs", Twitter, Jan. 19, 2013, retrieved from https://web.archive.org/web/20130119212721/https://dev.twitter.com/docs/streaming-apis.
"Twitter Ads Full Service Analytics", Twitter, on Mar. 7, 2013, retrieved from https://web.archive.org/web/20130307212052/https:/business.twitter.com/products/analytics-full-service.
"Twitter Advertising: Introducing Keyword Targeting in Timelines", Twitter, Apr. 18, 2013, retrieved from https://web.archive.org/web/20130418114422/http://advertising.twitter.com/2013/04/Introducing-Keyword-Targeting-in-Timeline.html.
"Final Written Decision," *Snap Inc. v. Palo Alto Research Center LLC*, IPR2021-00986 of U.S. Pat. No. 9,208,439, Paper: 54, 68 pages. (2023).
"Final Written Decision," *Snap Inc. v. Palo Alto Research Center LLC*, IPR2021-00987 of U.S. Pat. No. 8,489,599; *Facebook Inc. v. Palo Alto Research Center LLC*, IPR2021-01294 of U.S. Pat. No. 8,489,599; and *Twitter Inc. v. Palo Alto Research Center LLC*, IPR2021-01458 of U.S. Pat. No. 8,489,599, Paper: 54, 165 pages. (2023).
"Final Written Decision," *Facebook Inc. v. Palo Alto Research Center LLC*, IPR2021-01264 of U.S. Pat. No. 7,043,475, Paper: 37, 60 pages. (2023).
"Final Written Decision," *Snap Inc. v. Palo Alto Research Center LLC*, IPR2021-00987 of U.S. Pat. No. 8,489,599; *Facebook Inc. v. Palo Alto Research Center LLC*, IPR2021-01294 of U.S. Pat. No. 8,489,599; and *Twitter Inc. v. Palo Alto Research Center LLC*, IPR2021-01458 of U.S. Pat. No. 8,489,599, Paper: 48, 165 pages. (2023).
"Final Written Decision," *Twitter Inc. v. Palo Alto Research Center LLC*, IPR2021-01398 of U.S. Pat. No. 7,043,475, Paper: 47, 93 pages. (2023).
"Final Written Decision," *Twitter Inc. v. Palo Alto Research Center LLC*, IPR2021-01430 of U.S. Pat. No. 9,208,439, Paper: 53, 62 pages. (2023).
"Final Written Decision," *Facebook Inc. v. Palo Alto Research Center LLC*, IPR2021-01434 of U.S. Pat. No. 8,732,584, Paper: 37, 38 pages. (2023).
"Final Written Decision," *Facebook Inc. v. Palo Alto Research Center LLC*, IPR2021-01461 of U.S. Pat. No. 9,208,439, Paper: 41, 65 pages. (2023).
"Final Written Decision," *Facebook Inc. v. Palo Alto Research Center LLC*, IPR2021-01467 of U.S. Pat. No. 8,606,781, Paper: 37, 46 pages. (2023).
"Final Written Decision," *Facebook Inc. v. Palo Alto Research Center LLC*, IPR2021-01472 of U.S. Pat. No. 9,137,190, Paper: 33, 52 pages. (2023).
Petition for Inter Partes Review of U.S. Pat. No. 9,137,190 (IPR2021-01472) including exhibits (1018 pages).
Petition for Inter Partes Review of U.S. Pat. No. 8,489,599 (IPR2021-01536) including exhibits (472 pages).
Petition for Inter Partes Review of U.S. Pat. No. 8,489,599 (IPR2021-01459) including exhibits, 1,578pages.
Petition for Inter Partes Review of U.S. Pat. No. 9,208,439 (IPR2021-00986) including exhibits, 773 pages.
Petition for Inter Partes Review of U.S. Pat. No. 9,208,439 (IPR2021-01461) including exhibits, 723 pages.
Petition for Inter Parles Review of U.S. Pat. No. 8,489,599 (IPR2021-00987) including exhibits, 600 pages.
Petition for Inter Partes Review of U.S. Pat. No. 8,732,584 (IPR2021-01434) including exhibits, 432 pages.
Petition for Inter Partes Review of U.S. Pat. No. 8,489,599 (IPR2021-01458) including exhibits, 1,517 pages.
Petition for Inter Partes Review of U.S. Pat. No. 8,606,781 (IPR2021-01467 ('781) including exhibits (1209 pages).
Excerpts from Microsoft Computer Dictionary, 5th ed., pp. 1-15, 2002.
Excerpts from The New Penguin Dictionary of Computing, pp. 1-9, 2001.
Wang, excerpts from "Beginning Programming for Dummies," IDG Books Worldwide, Inc. (pub.), pp. 1-40, 1999.
Wolfe, U.S. Appl. No. 60/819,576, filed Jul. 10, 2006, pp. 1-27.
Affidavit of Duncan Hall, pp. 1-18, 2021.
Affidavit of Duncan Hall, pp. 1-21, 2021.
Affidavit of Duncan Hall, pp. 1-23, 2021.
Affidavit of Duncan Hall, pp. 1-7, 2021.
Affidavit of Duncan Hall, pp. 1-14, 2021.
Affidavit of Duncan Hall, pp. 1-60 (part 1 of 2).
Affidavit of Duncan Hall, pp. 1-79 (part 2 of 2).
Declaration of Bamshad Mobasher for U.S. Pat. No. 7,043,475, pp. 1-53, 2021.
Declaration of Christopher M. Schmandt for U.S. Pat. No. 8,489,599 pp. 1-154, 2021.
Declaration of Christopher M. Schmandt for U.S. Pat. No. 8,732,584, pp. 1-105, 2021.
Declaration of Christopher M. Schmandt for U.S. Pat. No. 9,137,190 pp. 1-173, 2021.
Declaration of Christopher M. Schmandt for U.S. Pat. No. 9,208,439, pp. 1-119, 2021.
Declaration of Duncan Hall for U.S. Pat. No. 7,043,475, pp. 1-13, 2021.
Declaration of Edward A. Fox for U.S. Pat. No. 7,043,475, pp. 1-290, 2021.
Declaration of Edward A. Fox for U.S. Pat. No. 8,606,781, pp. 1-288, 2021.
Declaration of Gordon MacPherson for U.S. Pat. No. 8,489,599, pp. 1-14, 2021.
Declaration of Megan Raymond for U.S. Pat. No. 7,043,475, pp. 1-3, 2021.
Declaration of Michael F. Milea for U.S. Pat. No. 7,043,475, pp. 1-3, 2021.
Declaration of Michael F. Milea for U.S. Pat. No. 8,489,599, pp. 1-31, 2021.
Declaration of Sayem Osman for U.S. Pat. No. 7,043,475, pp. 1-7, 2021.
Declaration of Sayem Osman for U.S. Pat. No. 8,489,599, pp. 1-8, 2021.
Declaration of Sayem Osman for U.S. Pat. No. 9,208,439, pp. 1-8, 2021.
Declaration of Steve Smoot for U.S. Pat. No. 8,489,599, pp. 1-137, 2021.
Declaration of Steve Smoot for U.S. Pat. No. 9,208,439, pp. 1-142, 2021.
Declaration of Sylvia Hall-Ellis for U.S. Pat. No. 7,043,475, pp. 1-385, 2021.
Declaration of Sylvia Hall-Ellis for U.S. Pat. No. 8,489,599, pp. 1-101, 2021.
Declaration of Sylvia Hall-Ellis for U.S. Pat. No. 8,606,781, pp. 1-157, 2021.
Declaration of Sylvia Hall-Ellis for U.S. Pat. No. 8,732,584, pp. 1-122, 2021.

(56) References Cited

OTHER PUBLICATIONS

Declaration of Sylvia Hall-Ellis for U.S. Pat. No. 9,137,190, pp. 1-151, 2021.
Declaration of Sylvia Hall-Ellis for U.S. Pat. No. 9,208,439, pp. 1-123, 2021.
Declaration of Tanya S. Manno for U.S. Pat. No. 7,043,475, pp. 1-3, 2021.
Expert Declaration of Don Turnbull PhD for U.S. Pat. No. 7,043,475, pp. 1-439, 2021.
Expert Declaration of Don Turnbull PhD for U.S. Pat. No. 8,489,599, pp. 1-565, 2021.
Expert Declaration of Don Turnbull PhD for U.S. Pat. No. 9,208,439, pp. 1-353, 2021.
Complaint for Patent Infringement, Case No. 2:20-cv-10753, *Palo Alto Research Center Inc. v. Facebook, Inc.*, pp. 1-70, 2021.
Complaint for Patent Infringement, Case No. 2:20-cv-10754, *Palo Alto Research Center Inc. v. Twitter, Inc.*, pp. 1-61, 2021.
Complaint for Patent Infringement, Case No. 2:20-cv-10755, *Palo Alto Research Center Inc. v. Snap Inc.*, pp. 1-31, 2021.
Order re: Joint Stipulation Re Stay Pending Inter Partes Review, Case No. 2:20-cv-10753-AB-MRW, pp. 1-2, 2021.
Order re: Joint Stipulation Re Stay Pending Inter Partes Review, Case No. Case No. 2:20-cv-10754-AB-MRW, pp. 1-2, 2021.
Plaintiff's Disclosure of Asserted Claims and Infringement Contentions, Exhibit FB04, U.S. Pat. No. 8,606,781, *Palo Alto Research Center Inc. v. Facebook, Inc.*, Case No. 2:20-cv-10753-AB (C.D. Cal.), pp. 1-123.
Plaintiff's Disclosure of Asserted Claims and Infringement Contentions, Exhibit SN01, U.S. Pat. No. 8,489,599, *Palo Alto Research Center Inc. v. Snap, Inc.*, Case No. 2:20-cv-10755-AB (C.D. Cal.), pp. 1-99.
Plaintiff's Disclosure of Asserted Claims and Infringement Contentions, Exhibit SN02, U.S. Pat. No. 9,208,439, *Palo Alto Research Center Inc. v. Snap, Inc.*, Case No. 2:20-cv-10755-AB (C.D. Cal.), pp. 1-74.
Plaintiff's Disclosure of Asserted Claims and Infringement Contentions, Exhibit TW01, U.S. Pat. No. 8,489,599,, *Palo Alto Research Center Inc. v. Twitter, Inc.*, Case No. 2:20-cv-10754-AB (C.D. Cal.), pp. 1-133.
Sauri et al., "TimeML Annotation Guidelines," Version 1.2.1, dated Jan. 31, 2006. Available at http://www.timeml.org/site/ , pp. 1-71.
Lee et al., Context-Aware Recommendations on the Mobile Web. On the Move Meaningful Internet Systems 2005; OTM Workshops, 2005, pi 42-151 (Year 2005).
Shaban, Khaled, A Semantic Graph Model for Text Representation and Matching in Document Mining, 2006, A thesis presented to the University of Waterloo in fullfillment of the thesis requirement for the degree of Doctor of Philosophy in Electrical and Computer Engineering, Waterloo, Ontario, Canada, 2206, 1-140.
Awadallah Supporting Complex Search Tasks; ACM, pp. 829-838 (year 2014).
"CCNx Technical Documentation Index," as retrieved from URL: http://ccnx.org/releases/latest/doc/technical/ (Apr. 24, 2015), 2 pages.
Mbastian. Gephi 0.9.1 Release Notes. Feb. 14, 2016. Github. <https://github.com/gephi/gephi/releases/tag/v0.9.1 > (Year: 2016).
Gephi 0.9.1 Requirements. Dec. 8, 2015. Gephi.org. <https://web.archive.org/web/20151208052328/http:l/gephi.org:80/users/ requirements/> (Year: 2015).
Screenshots from Gephi 0.9.1. Taken May 9, 2023.1 (Year: 2023).
Heymann, Sebastien. "GSoC mid-term: new Visualization API". Feb. 25, 2015. Gephi blog. <https://gephi.wordpress.com/2011/08/12/ gsoc-mid-term-new-visualization-api/> (Year: 2015).
Mbastion. "Edge weight range filter that also hides nodes". forum-gephi.org. 7/3/20113 <https://forum-gephi.org/viewtopic.php?f=30&t=1174> (Year: 2011).
Morris, Scooter. "Edge weight range filter that also hides nodes". groups.google.com. Oct. 24, 2014. <https://groups.google.com/g/cytoscape-helpdesk/c/l7kGmj IsAa E> (Year: 2014).
Francisco Claude; Fast and Compact Web Graph Representation; 2010; ACM; pp. 1-31.
Hristova et al., "Ad-me: Wireless Advertising Adapted to the User Location, Device and Emotions," 2204 [Online Downloaded Nov. 26, 2024 https://ieeeexplore.org/stamp/stamp.jsp?arnumber=1265673.
Stopher et al., "Processing GPS Data from Travel Surveys" 2005 [Online] Downloaded Nov. 26, 2024 https://australasiantransportresearchforum.org.au/wp-content/uploads/2022/03/2005_Stopher_Jiang_FitzGerald.pdf.
Dongshan Xing "Efficient data mining for web navigation patterns"; 2002; Elsevier; pp. 55-63.
Zheng et al., "Mining Interesting Locations and Travel Sequences from GPS Trajectories" Apr. 24, 2009 [Online] Downloaded Nov. 26, 2024 https://dl.acm.org/doi/pdf/10.1145/1526816.

\* cited by examiner

300

| CONSUMER ID | MEDIA ID | NUMBER OF VOTES |
|---|---|---|
| 24 | 16131683 | 6788 |
| 24 | 16141710 | 5270 |
| 24 | 16140198 | 4963 |
| 24 | 16164258 | 4917 |
| 24 | 16131161 | 4694 |
| 24 | 16132928 | 4653 |
| 30 | 16633648 | 12913 |
| 30 | 16632778 | 12610 |
| 30 | 16331575 | 11257 |
| 30 | 16331614 | 9049 |
| 30 | 16132045 | 8954 |
| 30 | 16132036 | 8088 |

FIG. 3

```
1   create table results as
2   (select ego, mid, votes from
3       (select ego, mid, votes, rank() over (partition by ego order by votes desc) as popularity from
4           (select friends_media.ego, a3.mid, count(a3.cid) votes from
5               (select distinct e.cid ego, a2.cid friend, count(*) in_common from
6                   batched_egos e
7                   inner join accessed a on e.cid = a.cid
8                   inner join accessed a2 on a.mid = a2.mid
9                   where e.cid != a2.cid
10                  group by e.cid, a2.cid) friends_media
11              inner join accessed a3 on friends_media.friend = a3.cid
12              where friends_media.in_common >= 1
13              group by friends_media.ego, a3.mid))
14  where popularity <= 100
15  order by ego, popularity asc, mid);
```

FIG. 4

| STEP | DESCRIPTION | HIPERGRAPH PRIMITIVES |
|---|---|---|
| 1. | INITIALIZE THE REQUIRED DATA STRUCTURES AND SET THE EGO VERTEX (CONSUMER) AS THE STARTING POINT. | ARRAY INITIALIZATION |
| 2. | TRAVERSE THE EDGES REPRESENTING THE "ACCESSED" RELATIONSHIP TO A SET OF VERTICES REPRESENTING MEDIA. | REACHABILITY GRAPH TRAVERSAL |
| 3. | TRAVERSE FROM THAT SET OF MEDIA, THE EDGES REPRESENTING THE "ACCESSED" RELATIONSHIP TO A SET OF VERTICES REPRESENTING OTHER CONSUMERS. | REACHABILITY GRAPH TRAVERSAL |
| 4. | FROM EACH OF THESE CONSUMERS, TRAVERSE THEIR ADJACENT EDGES TO REACH THE SET OF VERTICES REPRESENTING THE MEDIA THEY ACCESSED. AT EACH MEDIA VERTEX, TALLY UP THE NUMBER OF CONSUMERS FROM WHICH THE SYSTEM TRAVERSES TO ARRIVE AT THE MEDIA VERTEX. | TOKEN COUNTING (VALUE ACCUMULATION) |
| 5. | SORT THE RESULTS BASED ON THE TALLIES AT EACH MEDIA VERTEX AND RETURN THE TOP K MEDIA. | NONE (CAN USE QSORT) |

FIG. 5

| HANA VS. HANA+HIPERGRAPH | 0.1K EGOS | 1K EGOS | 10K EGOS | 100K EGOS |
|---|---|---|---|---|
| 1 MONTH, ~10M ROWS | 0:21 HANA 1:10 HANA+HG | 1:07 HANA 1:07 HANA+HG | 9:51 HANA 1:44 HANA+HG | 1:11:50 HANA 0:06:46 HANA+HG |
| 3 MONTHS, ~30M ROWS | 0:57 HANA 3:25 HANA+HG | 0:40 HANA 3:33 HANA+HG | 28:54 HANA 04:41 HANA+HG | 53:46 HANA 17:36 HANA+HG |
| 1 YEAR, ~100M ROWS | 1:00 HANA 13:16 HANA+HG | 3:22 HANA 13:39 HANA+HG | Out of memory 16:21 HANA+HG | Out of memory 44:45 HANA+HG |
| MULTI-YEAR, ~300M ROWS | 02:38 HANA 40:01 HANA+HG | 32:55 HANA 40:56 HANA+HG | Out of memory 48:02 HANA+HG | Out of memory 1:59:35 HANA+HG |

| EGOS | HIVE DISK SPACE REQUIRED | HIPERGRAPH MEMORY REQUIRED | HIVE TIME HH:MM:SS | HIPERGRAPH TIME HH:MM:SS |
|---|---|---|---|---|
| 1 | 8GB | 5GB | 0:20:00 | 0:40:01 |
| 10 | 8GB | 5GB | 0:20:00 | 0:40:02 |
| 100 | 8GB | 5GB | 0:27:00 | 0:40:06 |
| 1,000 | 127GB | 5GB | 2:06:00 | 0:40:56 |
| 10,000 | 948GB | 5GB | 14:29:00 | 0:48:02 |

| EGOS | HIVE TIME HH:MM:SS | GRAPH BUILD + STREAM HH:MM:SS | HIPERGRAPH COMPUTE HH:MM:SS |
|---|---|---|---|
| 1 | 0:20:00 | 0:40:01 | 0:0:0.05 |
| 10 | 0:20:00 | 0:40:01 | 0:0:0.5 |
| 100 | 0:27:00 | 0:40:01 | 0:0:5 |
| 1000 | 2:06:00 | 0:40:01 | 0:0:55 |
| 10,000 | 14:29:00 | 0:40:01 | 0:8:01 |

1. START WITH A GIVEN SET OF VERTICES (POSSIBLY ONLY A SINGLE ONE) INITIALIZED TO USER-SPECIFIED VALUES.

2. WHILE NOT DONE
    A. PERFORM EITHER A FORWARD OR BACKWARD GRAPH TRAVERSAL BY FORWARDING THE VALUES OF THE CURRENT SET OF VERTICES TO THEIR ADJACENT VERTICES.

B. APPLY SOME AGGREGATION FUNCTION WHICH SETS EACH VERTEX TO A VALUE PROPORTIONAL TO THE VALUES FROM THOSE ADJACENT VERTICES

C. APPLY SOME THRESHOLD FUNCTION TO EACH VERTEX

3. SORT THE RESULT AND RETURN THE TOP K VERTICES RANKED BY THEIR COMPUTED VALUES.

| STEP | HIPERGRAPH | RELATIONAL |
|---|---|---|
| 2A | TRAVERSE FORWARD OR BACKWARD FROM A SET OF VERTICES TO ANOTHER SET OF VERTICES | DATABASE JOIN |
| 2B | FOR EVERY VERTEX, SUM OR COUNT ALL VALUES FROM ITS INCOMING VERTICES | GROUP-BY, SUM OR COUNT |
| 2C | APPLY TO ALL VERTICES: APPLY MAP(VERTEX, DOMAIN OF VALUES), (E.G. SET VALUE TO ZERO) | WHERE CLAUSE |

FIG. 13

SYSTEM AND METHOD FOR A REAL-TIME EGOCENTRIC COLLABORATIVE FILTER ON LARGE DATASETS

RELATED APPLICATIONS

This application is a continuation of U.S. patent application Ser. No. 15/074,922, filed Mar. 18, 2016, the contents of which are incorporated herein by reference in their entirety.

The present disclosure is related to U.S. patent application Ser. No. 13/932,377, titled "System and Method for Parallel Search on Explicitly Represented Graphs," by inventor Rong Zhou, filed 1 Jul. 2013, the disclosure of which is hereby incorporated by reference herein.

The present disclosure is related to U.S. patent application Ser. No. 14/148,435, titled "Automated Compilation Of Graph Input For The Hipergraph Solver," by inventors Eric Huang, Rong Zhou and Daniel Davies, filed 6 Jan. 2014, the disclosure of which is hereby incorporated by reference herein.

The present disclosure is related to U.S. patent application Ser. No. 14/039,941, titled "System And Method For A High-Performance Graph Analytics Engine," by inventors Rong Zhou and Daniel Davies, filed 27 Sep. 2013, the disclosure of which is hereby incorporated by reference herein.

BACKGROUND

Field

The present disclosure relates to recommendation systems. More specifically, this disclosure relates to a method and system for real-time egocentric collaborative filtering on large datasets using Hipergraph.

Related Art

HiperGraph is a stand-alone graph solver that performs analytics techniques on graph-based representation of data. Its strengths over a standard database lie in the characterization of computations as graph traversals instead of traditional, computationally-intensive relational database joins. HiperGraph specializes in graph reasoning and enables new real-time applications on a much larger volume of data for graph-based computations.

FIG. 1 presents a block diagram 100 illustrating an example of a database schema in a multimedia domain, and a corresponding example of how data may be represented in a graph model. The database in FIG. 1 has three tables. The first table 102 has "Accessed ID" as its primary key, and contains a set of rows, each representing a transaction where a particular consumer has accessed a particular piece of media content. The second table 104 has "Consumer ID" as its primary key, and each row represents a unique consumer along with its metadata. The third table 106 has "Media ID" as its primary key, and each row represents a unique digital asset along with its metadata.

The graph model 108 corresponding to this database schema has vertices representing consumers and media, and edges representing media accesses. The question presented in this example is "what new media should we recommend to a consumer based on his or her friends?" Here, a friend is defined as another consumer who has accessed at least one piece of content in common in the past.

In many cases similar to this domain, the underlying database tables may be constantly changing as additional access activities are added, implying changes to the graph itself. The changing nature of the data necessitates recomputing the same query in order to provide a time-relevant answer, and therefore performance is critical. For example, if a website dynamically provides recommendations, the website may need to respond to queries within seconds in real-time. Moreover, the fact that a server may need to answer queries from many users simultaneously interacting with the website further complicates the problem.

SUMMARY

One embodiment of the present invention provides a system for generating a product recommendation. During operation, the system obtains graph data indicating vertices and edges of a graph. The vertices represent consumers and products and an edge represents an access relationship. The system may receive a query to determine a product recommendation. The query indicates an ego for determining a product recommendation. The system may then traverse the graph from a vertex representing the ego through a plurality of edges to a plurality of vertices representing products. The system may traverse the graph from the plurality of vertices representing products to a plurality of vertices representing other consumers. The system may then traverse the graph from the plurality of vertices representing other consumers to a plurality of vertices representing other products. The system may generate a recommendation that based on the plurality of vertices representing other products.

In a variation on this embodiment, the system may generate the graph based on data from one or more database tables, and stream the graph from a Structured Query Language (SQL) database over a network to an executing application.

In a variation on this embodiment, the system may receive command-line parameters indicating a number of starting vertices, a number of recommendations to be generated, a number of traversals, or a number of media that must be shared in common between the ego and another consumer.

In a variation on this embodiment, the system may receive a second query to determine product recommendations for a plurality of egos. The system may then traverse, by a plurality of processors operating in parallel, the graph from the plurality of egos through a plurality of edges to a plurality of vertices representing products. The system may then traverse, by the plurality of processors operating in parallel, the graph from the plurality of vertices representing products to a plurality of vertices representing other consumers. The system may then traverse, by the plurality of processors operating in parallel, the graph from the plurality of vertices representing other consumers to a plurality of vertices representing other products. The system may calculate a tally for each of the plurality of vertices representing other products. The system may then sort the plurality of vertices representing other products, and generate a recommendation based on the sorted plurality of vertices representing other products.

In a variation on this embodiment, the graph has multiple edge types connecting vertices, and one of the edge types represents a like relationship between a respective consumer and a respective product, and wherein the vertex representing the ego and the plurality of vertices representing other consumers are also connected via edges representing like relationships.

In a variation on this embodiment, the system may calculate a tally for each of the plurality of vertices representing other products.

In a further variation, the system may sort and rank the plurality of vertices representing other products, and generate the recommendation to include one of: all products associated with the plurality of vertices representing other products and their corresponding tallies, products with tallies above a predetermined ranking, and all products and their corresponding tallies in which the corresponding tallies are greater than a predetermined user-specified value.

BRIEF DESCRIPTION OF THE FIGURES

FIG. 3 presents an example of formatted output of the collaborative filter, according to an embodiment.

FIG. 4 presents an example of a SQL query for the egocentric collaborative filter, according to an embodiment.

FIG. 5 illustrates an overview of an exemplary egocentric collaborative filter and implementation using HiperGraph primitives, according to an embodiment.

FIG. 9 presents a table illustrating a comparison of two egocentric collaborative filtering implementations HANA-only and a combination of HANA and HiperGraph.

FIG. 10 presents a table of experimental results comparing implementations of the egocentric collaborative filter on Hadoop/Hive with HiperGraph.

FIG. 11 presents a table comparing time performance between Hive and HiperGraph, with a breakdown of graph building, streaming, and HiperGraph reasoning.

FIG. 12 presents a table illustrating a general template for a class of egocentric collaborative techniques that leverage paragraph primitives, in accordance with an embodiment.

FIG. 13 presents a table illustrating how Hipergraph primitives may map to relational primitives, in accordance with an embodiment.

In the figures, like reference numerals refer to the same figure elements.

DETAILED DESCRIPTION

Figure 1:
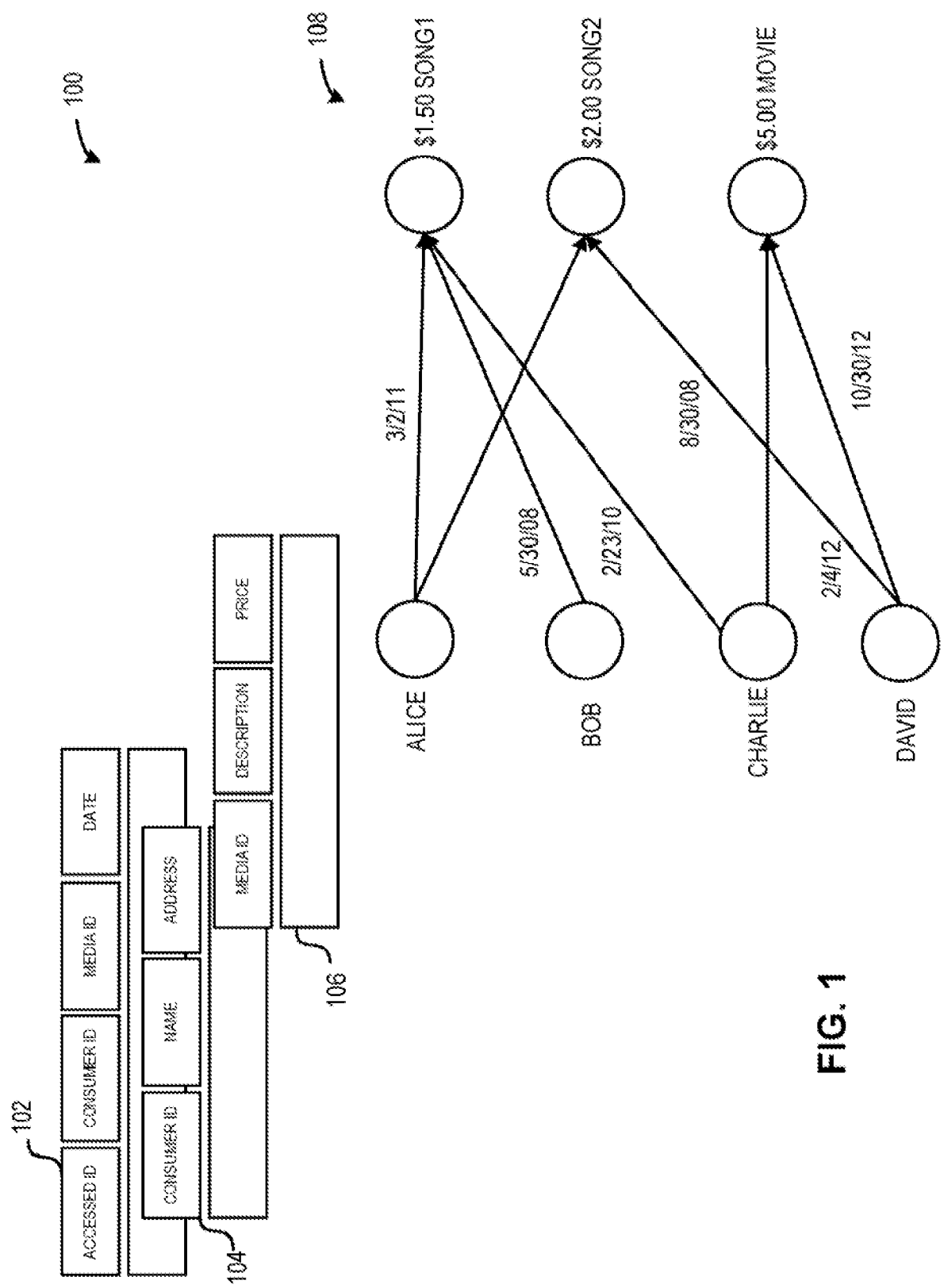
FIG. 1 presents a block diagram illustrating an example of a database schema in a multimedia domain, and a corresponding example of how data may be represented in a graph model.

The following description is presented to enable any person skilled in the art to make and use the embodiments, and is provided in the context of a particular application and its requirements. Various modifications to the disclosed embodiments will be readily apparent to those skilled in the art and the general principles defined herein may be applied to other embodiments and applications without departing from the spirit and scope of the present disclosure; Thus, the present invention is not limited to the embodiments shown, but is to be accorded the widest scope consistent with the principles and features disclosed herein.

Overview

Embodiments of the present invention solve the problem of improving performance of a collaborative filtering process by using Hipergraph primitives to perform operations on graph data rather than relying on a Structured Query Language (SQL) database to perform equivalent operations on data in relational tables. An egocentric collaborative filtering system may generate a graph model from consumer access data stored in a database and then apply Hipergraph primitives to efficiently perform collaborative filtering. For example, the system can use Hipergraph primitives to traverse forward or backward from one set of vertices to another set of vertices in order to perform a database join. By performing the join using a graph rather than using traditional relational tables, the system can significantly speed up computations and reduce the amount of memory required.

The recommendation technique this disclosure describes is one of a class of techniques which the inventors call egocentric collaborative filters. The term egocentric refers to the property that the computations reference a specific vertex which the inventors call the "ego," and frequently the set of graph operations that the system performs may originate from the ego. For example, the system can traverse a graph to determine media that a user (e.g., ego) accesses, and from vertices representing those media traverse the graph to determine other consumers that access the same media as the ego. The system can then traverse the graph again to determine media that the other consumers access to generate a recommendation.

The disclosure explains how a class of such techniques implemented using HiperGraph can achieve a significant boost in performance compared to standard approaches. Such performance improvements include that HiperGraph's intermediary computations when performing traversals does not significantly increase memory requirements. In contrast, for SQL databases, the intermediary computations associated with executing join operations significantly increases such memory requirements. For problem sizes of 1,000 recommendation queries or larger, experiments have demonstrated that the disclosed techniques dominate other approaches. This is seen in best-in-class comparisons to open source graph reasoning systems an enterprise in-memory SQL server, and a Hive/Hadoop cluster.

System Architecture

Figure 2:
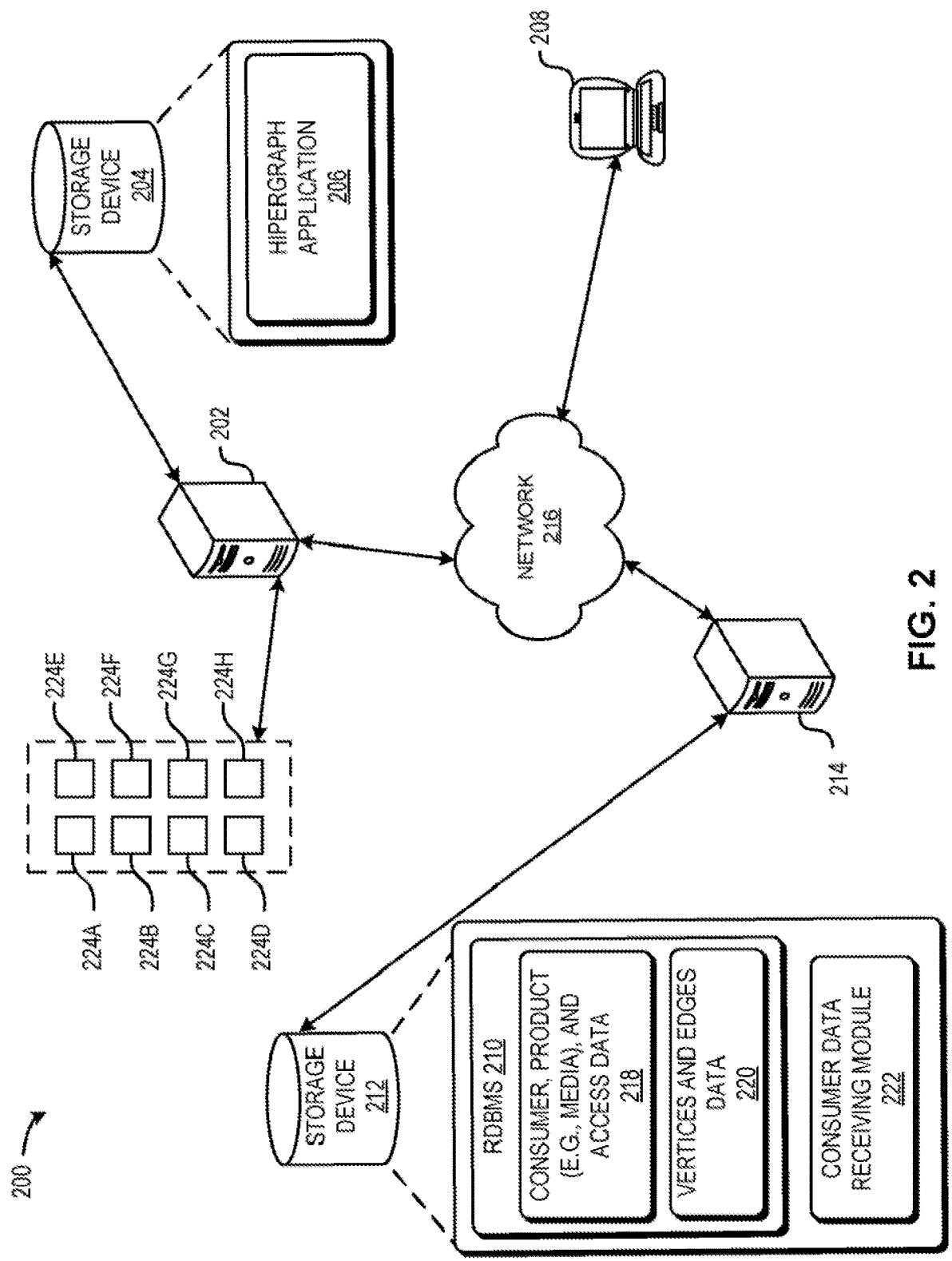
FIG. 2 presents a block diagram illustrating an exemplary architecture of an egocentric collaborative filtering system, according to an embodiment.

FIG. 2 presents a block diagram illustrating an exemplary architecture of an egocentric collaborative filtering system 200, according to an embodiment. System 200 may generate graphs and traverse through graphs to facilitate various applications such as collaborative filtering.

System 200 may include a Hipergraph server 202 with a storage 204. A Hipergraph application 206 may be installed on storage device 204. Hipergraph server 202 may receive a query from a client 208 (or receive a query locally on server 202). Hipergraph server 202 may receive queries that are written in a declarative language.

The query may request recommendations for one or more consumers e.g., egos). Hipergraph application 206 may receive a graph from RDBMS 210 installed on a storage device 212 of a server 214. RDBMS 210 may stream the graph data to Hipergraph application 206 over a network 216. Note that in some embodiments. Hipergraph application 206 and RDBMS 210 may be installed on the same server and system 200 may copy the graph from one portion of the server memory to another in order to transfer graph data from RDBMS 210 to Hipergraph application 206.

System 200 may receive consumer, product (e.g., media), and access data 218, and generate vertices and edges 220. System 200 may store in storage device 212 code for a consumer data receiving module 222 that receives the consumer, product, and access data. System 200 may retrieve the program code for Hipergraph application 206 from storage device 204. Note that various implementations of the present invention may include any number of servers and storage devices.

In some implementations Hipergraph server 202 may include a graph analytics engine or other components of egocentric collaborative filtering system 200 to perform the techniques described herein. In some implementations, system 200 may execute dynamic vertex-to-processor mapping to divide up the vertices of a graph into subranges, assign the various subranges to processors, and process the vertices using the respective processors. This improves utilization of available processors. For example, system 200 may dynamically divide the vertices and assign the vertices to processors 224A-224H, which operate on the assigned vertices.

How is Problem Solved Today—Input and Output Description

The input data is a list of egos for which the system computes recommendations, as well as the accessed table in FIG. 1. The hulk of the work performed does not need to reference the consumer or the media tables (such tables are only necessary When needing to map the ID numbers back to their human-readable names). The inventors use an actual dataset which contains on the order of tens of millions of vertices and hundreds of millions of edges that correspond to the rows of the accessed table.

FIG. 3 presents an example 300 of formatted output of the collaborative filter, according to an embodiment. As illustrated in FIG. 3, output 300 includes rows of triples that include a consumer ID, a media ID, and a number of votes. The consumer ID column indicates for which consumer the system performs the recommendation. The media ID column indicates the item that the system recommends to the consumer, and the number of votes column indicates how many votes their friends cast for that media. This disclosure defines the ego's "friend" as other consumers who access at least one media in common with the ego. Each friend casts one vote for each media the friend accesses in common with the ego.

Note that the examples presented herein describe consumers accessing media and generating a recommendation for media, but embodiments of the present invention may generate recommendations for any type of purchased, consumed, viewed, or accessed products.

Graph Database Comparison

Various graph-based systems currently available include Neo4j, a graph database and GraphLab, an open-source package for machine learning. HiperGraph outperforms both of these technologies at a fine-grained primitive level. Because HiperGraph has been demonstrated to have significantly faster primitives for graph traversals, the techniques disclosed herein which make use of several such primitives chained together in series can only be faster by comparison. See U.S. patent application Ser. No. 14/039,941 entitled "System And Method For A High-Performance Graph Analytics Engine," by inventors Rong Zhou and Daniel Davies, filed 27 Sep. 2013, which describes experimental results using Hipergraph.

SQL Comparison

FIG. 4 presents an example 400 of a SQL query for the egocentric collaborative filter, according to an embodiment. Due to the prevalence of the relational model, data is typically stored in SQL databases and SQL can be used in a collaborative filtering implementation. The inventors compared two different SQL systems and the details are described below. Aside from minor system-specific syntax, the queries are nearly identical, and are presented in FIG. 4.

The set of egos that the system computes recommendations for is contained in table batched_egos, as seen in line 6. Table accessed is as described earlier, and all tables have column names cid representing consumer ID and pid representing media ID. Lines 6-8 join the desired set of egos with the accessed table twice, so that the system can find the set of friends that access the same media as that of the ego.

Line 9 excludes the ego from being considered a friend of him or herself. Finally, the group-by clause in line 10 computes the number of media that the ego accesses in common with each friend. Thus, lines 5-10 generate an intermediary table called friends_media which contains three columns: the ego, the friend, and the number of media accesses in common between the two.

The friends_media intermediary table is joined in line 11 with the accessed table again to find the media that might be recommended, and the group-by clause in line 13 tallies up the number of friends that vote for that media. Here, a friend who accesses a particular media is considered to cast one vote for that media. Note that the where clause in line 12 requires that the database system consider only friends who have at least one media purchase in common with the ego. Therefore, lines 4-13 generate an intermediary table of three columns: the ego, the media to recommend, and a count of the number of friends who vote for that media.

The select statement of line 3 sorts the previous results using a ranking function over the number of votes, and the entire query from lines 2-15 selects the top 100 most popular (or alternatively, most voted on media recommendations for each ego. Line 15 sorts these recommendations in the order required for the final output.

Note that in some embodiments of the present invention, an egocentric collaborative filtering system can determine a total amount of points, stars, or other ratings measure assigned to a media or other product by consumers that are friends, and the system sorts the media or other product according to the determined total amount. The system can also assign a greater weighting to those friends that have a greater number of common media accesses with the ego, or assign a greater weighting to those friends that have a greater number of edges different edge types in common with the ego. The system can also assign greater weighting to friends with common accesses that have occurred more recently, or assign greater weighting to those friends with a greater number of common accesses within a predetermined time period.

The system may use a batch of egos as input for computing recommendations, instead of starting with a single ego. The application must answer recommendation queries constantly, and it is highly inefficient for the SQL database to conduct multiple joins for every single ego serially. The system can achieve higher efficiency by processing the initial egos all simultaneously in a group. At some point, with a large enough ego batch size the system runs out of memory because the intermediary tables for a large accessed table exceed memory capacity. In experiments the inventors have tuned this and other parameters to give the SQL database the best performance possible while still respecting its memory constraints. For example, the inventors found that the SQL databases perform best when the entire query is expressed as a single nested statement, due to the maturity of the query optimizers.

Exemplary Egocentric Collaborative Filter And Implementation Using Hipergraph Primitives FIG. 5 illustrates an overview 500 of an exemplary egocentric collaborative filter and implementation using HiperGraph primitives, according to an embodiment. The disclosed egocentric collaborative filtering technique makes use of various HiperGraph primitive operations. The description below outlines the structure of the egocentric collaborative tiller technique implemented for a specific set of parameters.

As illustrated in FIG. 5, an exemplary implementation may include initializing data structures and starting with the ego vertex. The system may traverse edges representing accessed relationships to a set of vertices representing media. The system then traverses from the set of vertices representing media, the edges representing accessed relationships to a set of vertices representing other consumers, From each of these consumers, the system traverses their adjacent edges to reach the set of vertices representing the media they accessed. At each media vertex, the system may tally up the number of consumers from which the system traverses to arrive at the media vertex. The system may then sort the results based on the tallies at each media vertex and return the top k media.

Five Stages of a Technique For Egocentric Collaborative Filtering

Figure 6:
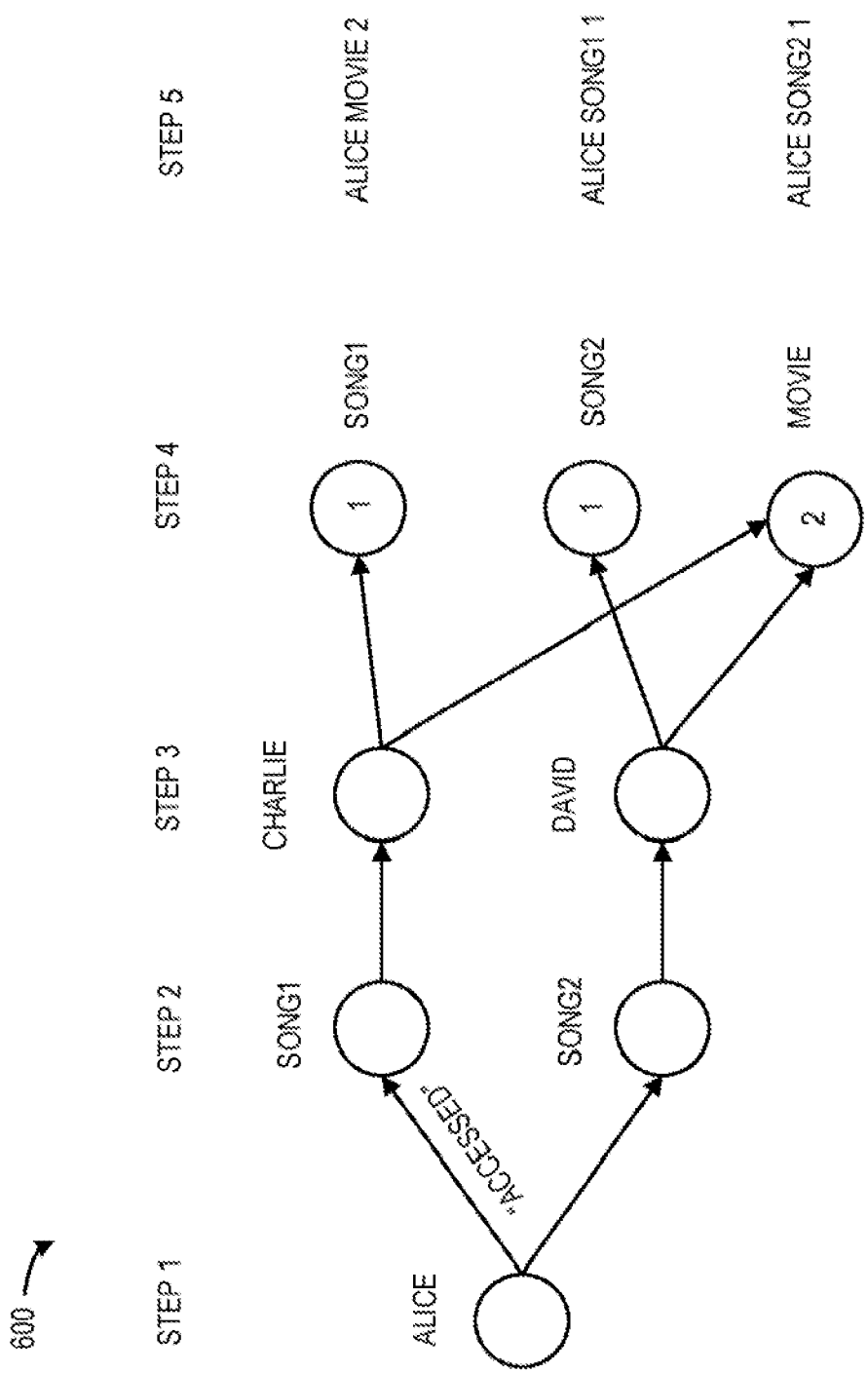
FIG. 6 presents a block diagram illustrating five stages of a technique for egocentric collaborative filtering, according to an embodiment.

FIG. 6 presents a block diagram 600 illustrating five stages of a technique for egocentric collaborative filtering, according to an embodiment. Note that in step 4 of FIG. 6 the number of consumers voting for a given media is different from the number of consumers that access the media. The set of consumers in step 4 are those determined in step 3 that access a media in common with the ego. Also, the description above is a specific instantiation of the parameterized egocentric collaborative filter which the inventors have implemented. Specifically, one embodiment permits the user to specify the following parameters on the command-line:

The number of ego vertices for which the system will perform steps 1-5 of FIG. 6. An outer loop runs through all desired egos, and computations are logically independent from one another due to local data structures. This allows the system to compute the egos in parallel.

A set of edge types that determine the set of consumers in step 3. For example, the consumers in step 3 might alternatively be determined by the set of vertices for which the ego shares in "accessed" media in common and a "like" media in common. This requires that the input graph have multiple edge types connecting vertices together. The set of consumers generated must be connected via the media in all of the specified ways and the set of media must be connected to the ego in all of the specified ways as well.

The number of media that must be shared in common between the ego and the set of consumers computed in step 3.

The final filtering mechanism, which is one of the three following options:
  Return all media and their corresponding tallies.
  Return the top k media and their tallies, ranked in decreasing order of their tally count, where k is user-specified.
  Return all media and their corresponding tallies if their tallies are greater than a predetermined threshold value n, where n is user-specified.

HiperGraph and SOL Database

Figure 7:
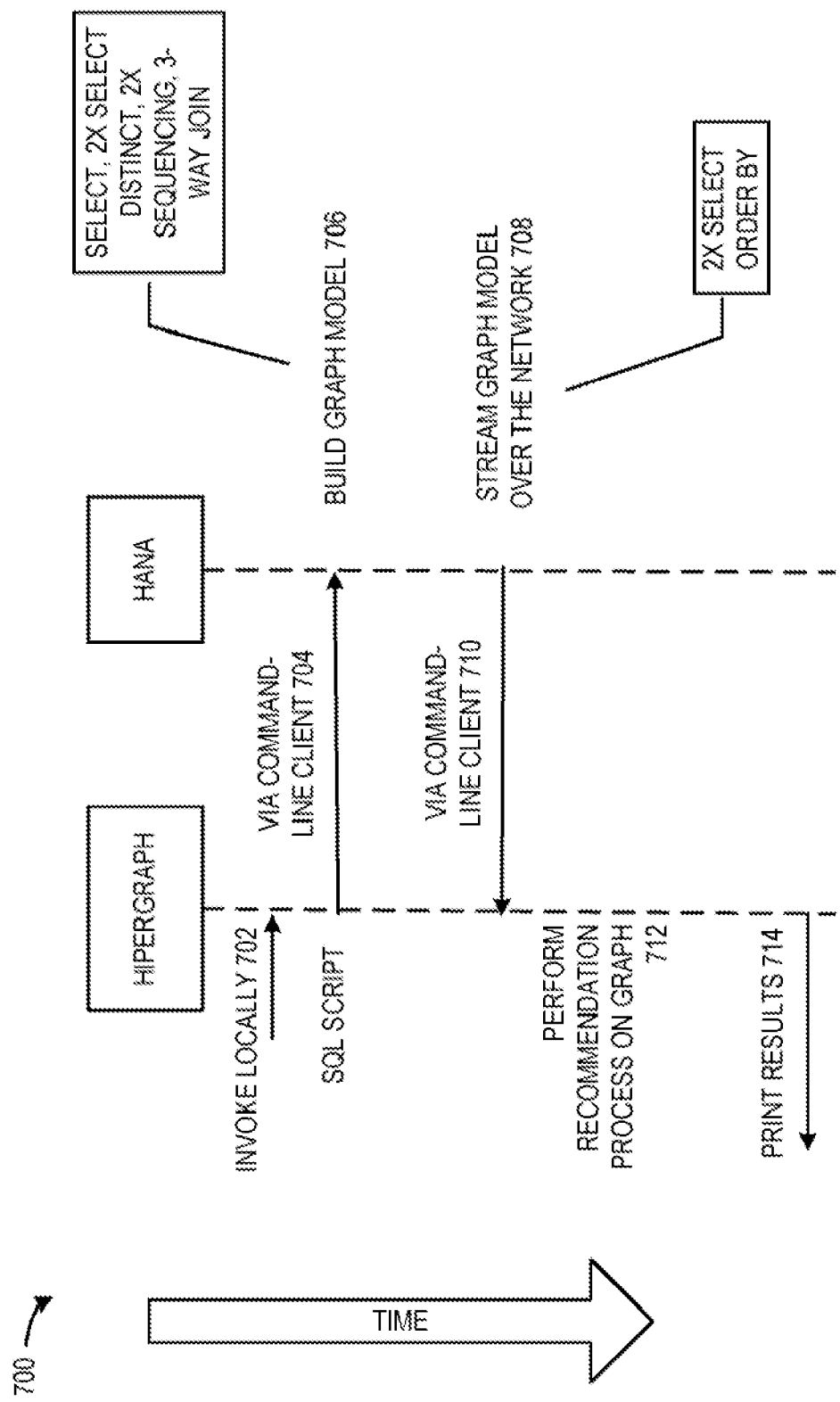
FIG. 7 presents a sequence diagram showing how HiperGraph and a SQL database communicate with one another, according to an embodiment.

FIG. 7 presents a sequence diagram 700 showing how HiperGraph and the SQL database communicate with one another, according to an embodiment. In the figure, HANA is a specific instance of an RDBMS. Recall that HiperGraph requires a graph model in order to reason over data. Since the data is typically stored in a SQL database, one implementation involves integrating HiperGraph with the SQL database so that the graph model can be automatically generated and streamed over to HiperGraph. The architecture for integrating a RDBMS and HiperGraph is illustrated in the sequence diagram of FIG. 7.

When a media recommendation is required, the system can invoke HiperGraph (operation 702), which uses a SQL-like language and a command-line client to communicate with a SQL database (operation 704). In this case, the system uses SAP HANA, an in-memory enterprise database system, and the command-line client provided by SAP, which communicates via standard input and standard output. Experiments demonstrate that the command line client from SAP is faster than a manual ODBC connection.

Within the SQL database, the system builds the graph model (operation 706) with various calls to SQL select, sequencing, and join constructs as mentioned in U.S. patent application Ser. No. 14/148,435, entitled "Automated Compilation Of Graph Input For The Hipergraph Solver," by inventors Eric Huang, Rong Zhou, and Daniel Davies, filed 6 Jan. 2014. After the system builds the model, the system streams the model over the network back to HiperGraph (operations 708 and 710), which then is able to perform reasoning on the graph model (operation 712) and output the results (operation 714). This example and the experiments use SAP HANA, because SAP HANA is an in-memory database representing the best-in-class for SQL servers. SAP HANA is one of the fastest, if not the fastest, enterprise in-memory SQL server available. Note that various implementations may use any SQL server, since the experimental setup leverages standard SQL interfaces and language to construct the graph model and integrate with HiperGraph. Typical enterprise RDBMSs built around disk storage will likely be significantly slower as SAP HANA has 1 TB of memory and performs all computations in RAM without touching the disk. All the experiments use the exact same dataset, which has on the order of tens of millions of vertices and hundreds of millions of edges.

Exemplary Process for Real-Time Egocentric Collaborative Filtering

Figure 8:
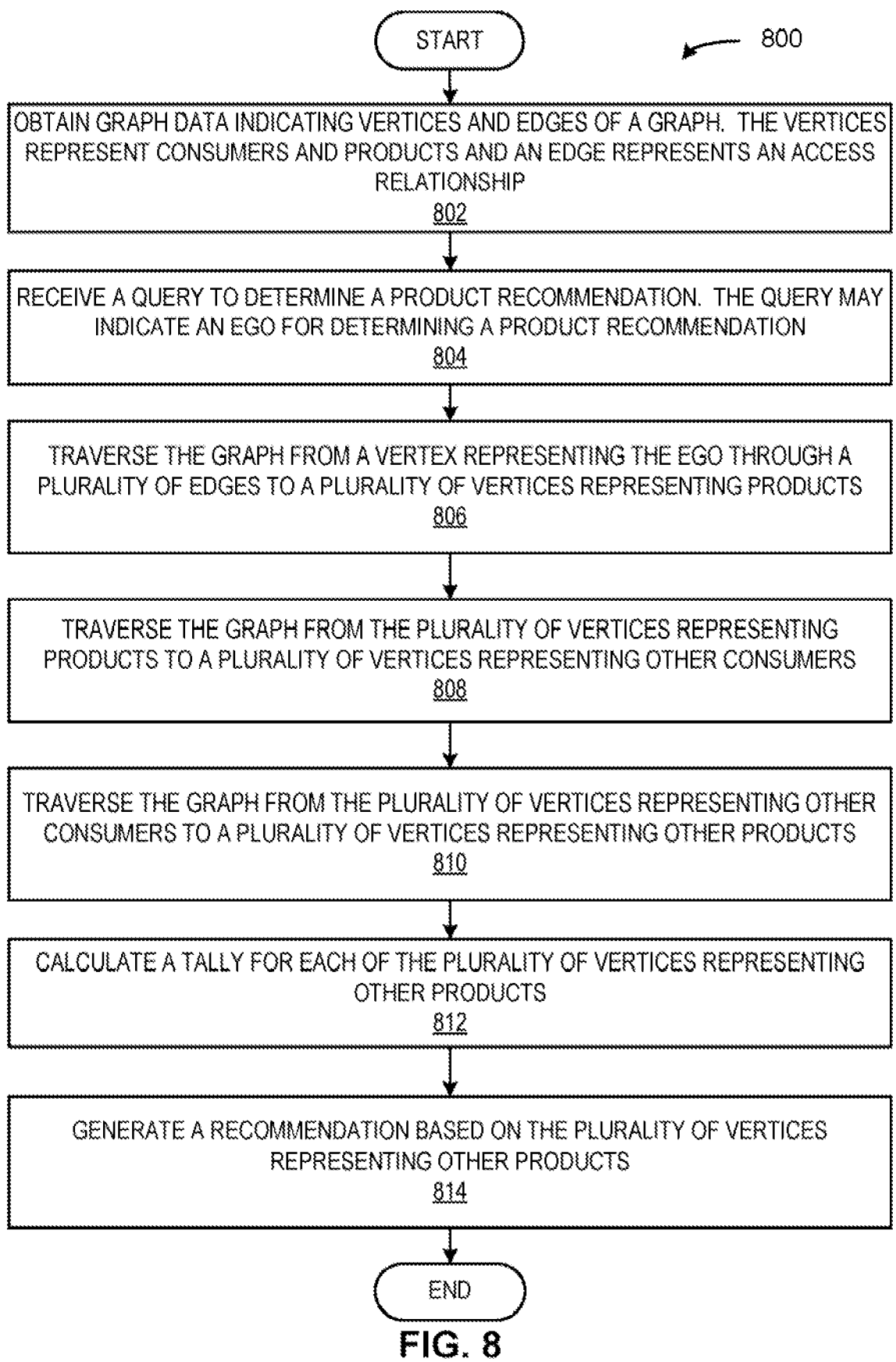
FIG. 8 presents a flowchart illustrating an exemplary process for real-time egocentric collaborative filtering, according to an embodiment.

FIG. 8 presents a flowchart 800 illustrating an exemplary process for real-time egocentric collaborative filtering, according to an embodiment. During operation, system 200 obtains graph data indicating vertices and edges of a graph. The vertices represent consumers and products and an edge represents an access relationship (operation 802). The system may receive a query to determine a product recommendation. The query may indicate an ego for determining a product recommendation (operation 804). The system may then traverse the graph from a vertex representing the ego through a plurality of edges to a plurality of vertices representing products (operation 806). The system may then traverse the graph from the plurality of vertices representing products to a plurality of vertices representing other consumers (operation 808). The system subsequently traverses the graph from the plurality of vertices representing other consumers to a plurality of vertices representing other products (operation 810). The system may calculate a tally for each of the plurality of vertices representing other products (operation 812). The system may generate a recommendation based on the plurality of vertices representing other products (operation 814).

Egocentric Collaborative Filter Using Hipergraph Performance

A relational database management system may load reference, and modify a dataset that includes tens of millions of vertices and hundreds of millions of edges, but performing many joins on such a dataset would be infeasible. Thus, the system uses HiperGraph to compute media recommendations for "consumers who access at least one media that the queried consumer also accesses," since the system may avoid relational joins implied by this query and perform graph traversals in HiperGraph. The result is that computing recommendations of the form of the egocentric collaborative filter using HiperGraph significantly outperforms using the traditional SQL database.

The inventors ran multiple experiments using various dataset sizes from 1 month of an accessed transaction table up to 3 years' worth of data, and also varied the number of recommendation computations from 100 egos up to 100,000 egos.

FIG. 9 presents a table illustrating a comparison of two egocentric collaborative filtering implementations HANA-only and a combination of HANA and HiperGraph FIG. 9 shows the results of experiments. Each cell of the table compares the HANA (SQL database) example described with respect to FIG. 4 to the HANA and HiperGraph combination architecture of FIG. 7. Each cell is a different query size and dataset size. Notice that in the lower-right cells the HANA database runs out of memory because the combination of batched egos with the size of the accessed datasets causes the intermediary tables (resulting from all the joins) to exceed memory capacity in contrast, the HANA plus Hipergraph implementation successfully computes and returns the results.

The four top right cells in the table represent cases where the HANA plus Hipergraph implementation outperforms the standard HANA installation as well. The cells in the first two results columns (e.g., 0.1 k egos column and 1 k egos column represent cases where the standard HANA installation outperforms the HANA plus Hipergraph implementation. Notice that for a very small set of egos on the scale of one thousand, the HANA plus Hipergraph implementation does not perform better than the standard HANA installation. However, when needing to provide recommendations for 10 k egos, the HANA plus Hipergraph implementation becomes competitive, and beyond that the HANA plus Hipergraph implementation significantly outperforms the standard HANA installation.

Comparing Hadoop/Hive with HiperGraph

Another standard approach uses a Hadoop/MapReduce framework as the database. When working with large datasets, a standard architecture may be to use Hadoop to store the data, and then use the MapReduce framework to reason over it. In particular Hive, an application program interface (API) layer that sits on top of Hadoop, interprets SQL-like statements, optimizes the query, and runs the necessary MapReduce programs to compute results. The Hive/Hadoop combination represents another approach for solving this problem.

The inventors have implemented and benchmarked such a system using the same datasets.

FIG. 10 presents a table 1000 of experimental results comparing implementations of the egocentric collaborative filter on Hadoop/Hive with HiperGraph. FIG. 10 compares the time for Hive/Hadoop to compute recommendations to the time required for HANA/HiperGraph to do the same. For various batch sizes of egos, the inventors measured the amount of time required to finish computing recommendations for that set of egos as well as the amount of memory and disk space required to perform the computations.

There are various points to consider when interpreting these results. Note that the experiment uses the full dataset of hundreds of millions of rows instead of a subset, because it is only for datasets this large that someone skilled in the art would consider using Hive/Hadoop, thereby motivating this experiment. Note also that the experiment directly compares the amount of disk space Hive requires to the amount of memory that HiperGraph requires, because these are the resources that both systems use in order to hold intermediary computations. Thus, this comparison of resource usage is more appropriate for assessing scalability as opposed to a memory-memory comparison (which Hive doesn't leverage), or a disk-disk comparison (which HiperGraph doesn't leverage). Finally, because HiperGraph requires building a graph model but Hive does not, for a fair comparison the HiperGraph results include the graph model building and network transmission times.

Note that for a small number of batch requests, HiperGraph's time is dominated by the graph modeling and network streaming, which is a flat cost of 40:01 for the entire dataset.

Comparing Time Performance Between Hive and Hipergraph

FIG. 11 presents a table 1100 comparing time performance between Hive and HiperGraph, with a breakdown of graph building, streaming, and HiperGraph reasoning. FIG. 11 breaks down HiperGraph's total time into the time required to build and stream the graph and the time to compute over this graph. This one-time, up-front cost pays back significantly when computing a much larger set of recommendations. For 1,000 and 10,000 egos, HiperGraph completes the computation significantly faster than Hive even when counting the time for building and streaming the graph. Recall that at 1,000 and 10,000 egos, the intermediary tables that Hive generates due to the SQL joins increases the required disk space significantly, and for an input dataset that is only a few gigabytes the required disk space approaches one terabyte. HiperGraph, on the other hand, does not suffer from significantly increased storage requirements because the database joins that Hive must perform require negligible memory when performed as graph traversals in HiperGraph. This is why HiperGraph maintains a flat memory requirement for larger and larger sized batches of egos.

Note that Hive attempts to process all egos simultaneously whereas HiperGraph processes them individually in serial (in some embodiments Hipergraph may process the egos in parallel). Although one may say that both Hive and HiperGraph are making tradeoffs between memory/disk required with computation time, the experiments reveal that HiperGraph dominates Hive/Hadoop in this tradeoff game, because HiperGraph has exceeded Hive in both performance and memory/disk efficiency. The inventors performed the experiments in this section with hardware that included Hive/Hadoop running on a 10-server cluster. The SAP HANA SQL database had access to 1 TB of RAM, which was representative of the best-in-class for SQL databases. The server that Hipergraph was running on was a 24-core Intel Xeon 3.33 GHz system with 96 GB of RAM (even though the memory capacity of the hardware was not fully utilized).

General Template And Mapping Hipergraph Primitives To Relational Primitives

FIG. 12 presents a table illustrating a general template for a class of egocentric collaborative techniques that leverage paragraph primitives, in accordance with an embodiment. As illustrated in FIG. 12, the template includes operations that start with a given set of vertices (possibly only a single one) initialized to user-specified values. While not done, the system may (a) perform either a forward or backward graph traversal by forwarding the values of the current set of vertices to their adjacent vertices, (b) apply sonic aggregation function which sets each vertex to a value proportional to the values from those adjacent vertices, and (c) apply some threshold function to each vertex. The system may then sort the result and return the top k vertices ranked by their computed values.

FIG. 13 presents a table illustrating how Hipergraph primitives may map to relational primitives, in accordance with an embodiment. There is evidence from experiments that suggest significant gains in performance in addition to memory/disk space efficiency compared to SQL installations on the same class of techniques. One may be able to achieve the same types of performance gains and memory efficiency for the class of techniques that uses the primitives shown in FIG. 13. The map function offers some flexibility with defining a function to map the vertex value to another set of values.

Although this disclosure uses the multimedia domain for an exemplary implementation, the techniques presented in this disclosure are more general, because vertices and edges in a graph representation map directly to entities and relations in standard database representations. Instead of consumers, media, and accesses, different implementations may have people, places, and event attended. For example, some implementations may use doctors, patients, and medical claims. The collaborative filtering algorithm can apply to various other domains as well.

Exemplary Apparatus

Figure 14:
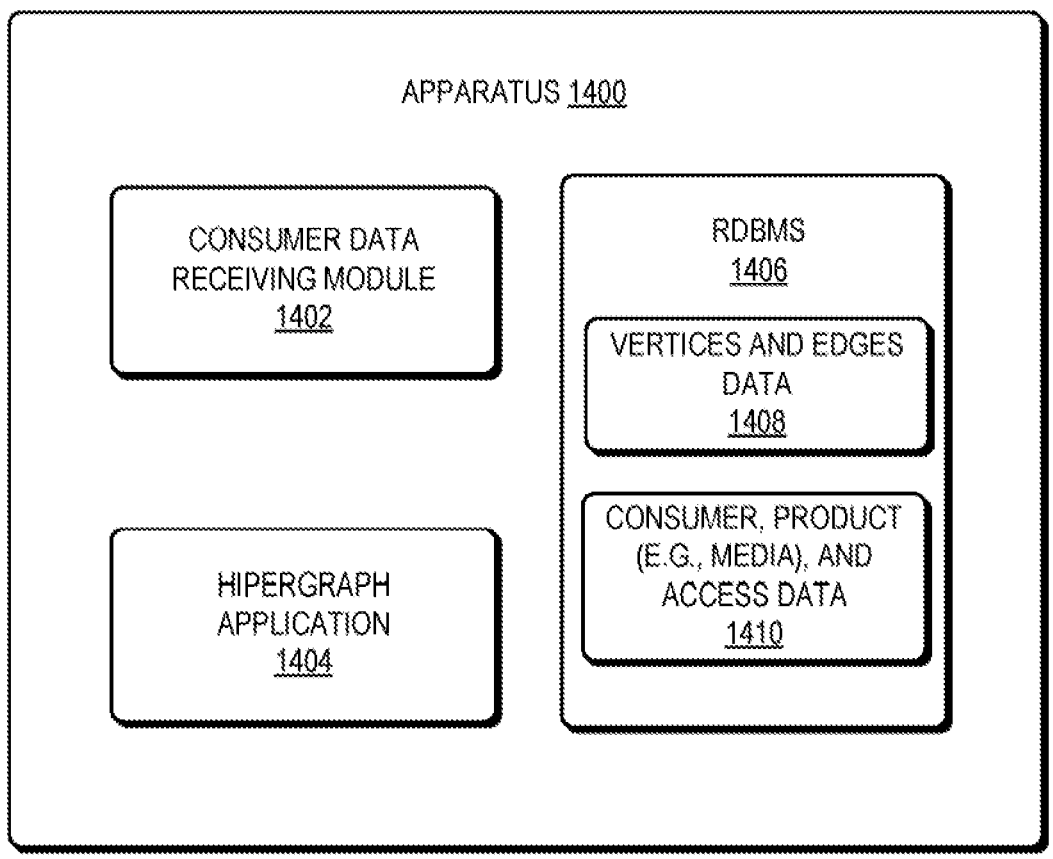
FIG. 14 presents a block diagram illustrating an exemplary apparatus that facilitates egocentric collaborative filtering, in accordance with an embodiment.

FIG. 14 presents a block diagram illustrating an exemplary apparatus 1400 that facilitates egocentric collaborative filtering, in accordance with an embodiment. Apparatus 1400 can comprise a plurality of modules which may communicate with one another via a wired or wireless communication channel. Apparatus 1400 may be realized using one or more integrated circuits, and may include fewer or more modules than those shown in FIG. 14. Further, apparatus 1400 may be integrated in a computer system, or realized as a separate device which is capable of communicating with other computer systems and/or devices. Specifically, apparatus 1400 can comprise a consumer data receiving module 1402, a Hipergraph application 1404, a RDBMS 1406, vertices and edges data 1408, and consumer, product (e.g., media), and access data 1410. Note that apparatus 1400 may also include additional modules not depicted in FIG. 14.

In some embodiments, consumer data receiving module 1402 can receive consumer, product (e.g., media), and access data. Hipergraph application 1404 may perform operations on a graph to provide a recommendation. RDBMS 1406 may include a storage for storing vertices and edges data 1408 and consumer, product (e.g., media), and access data 1410. RDBMS 1406 may generate the graph based on the consumer, product, and access data.

Exemplary System

Figure 15:
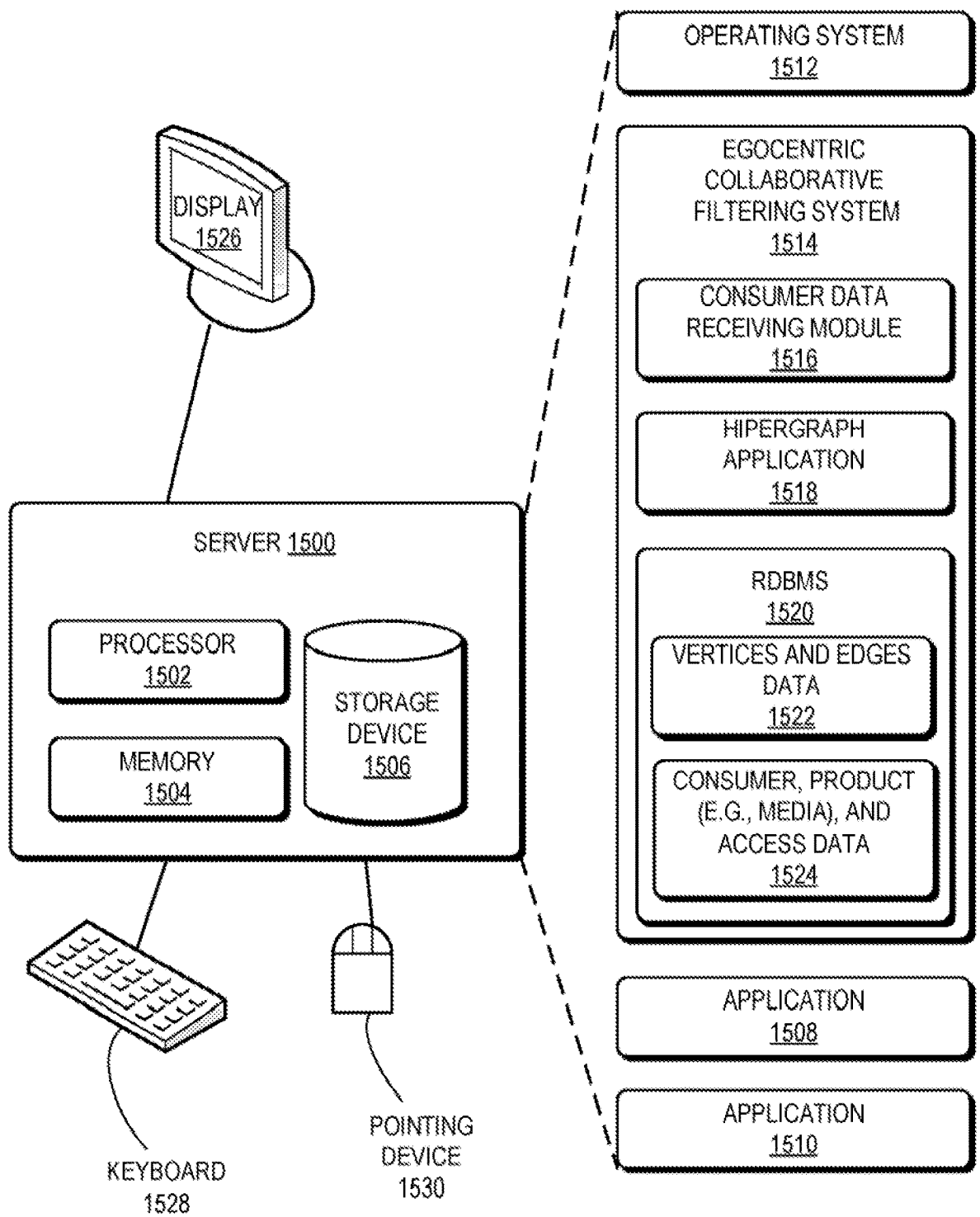
FIG. 15 illustrates an exemplary egocentric collaborative filtering server, in accordance with an embodiment.

FIG. 15 illustrates an exemplary egocentric collaborative filtering server 1500, in accordance with an embodiment. In one embodiment, server 1500 includes a processor 1502, a memory 1504, and a storage device 1506. Storage device 1506 stores a number of applications, such as applications 1508 and 1510 and operating system 1512. Storage device 1506 also stores egocentric collaborative filtering system 1514 that includes a consumer data receiving module 1516, a Hipergraph application 1518, a RDBMS 1520, vertices and edges data 1522, and consumer, product (e.g., media), and access data 1524. Server 1500 may generate and copy the vertices and edges data 1522 to a memory section accessible to Hipergraph application 1518. During operation, one or more applications, such as egocentric collaborative filtering system 1514, are loaded from storage device 1506 into memory 1504 and then executed by processor 1502. While executing the program, processor 1502 performs the aforementioned functions. System 1500 may be coupled to an optional display 1526, a keyboard 1528, and a pointing device 1530.

In some embodiments, consumer data receiving module 1516 can receive consumer, product (e.g., media), and access data. Hipergraph application 1518 may perform operations on a graph to provide a recommendation. RDBMS 1520 may include a storage for storing vertices and edges data 1522 and consumer, product (e.g., media), and access data 1524. RDBMS 1520 may generate the graph based on the consumer, product, and access data.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for generating a product recommendation, comprising:
   retrieving a dataset comprising information associated with consumers and products from a database running on a database management system (DBMS) that supports execution of a query language;
   generating graph data indicating vertices and edges of a graph from the retrieved dataset, wherein the vertices represent the information associated with the consumers and products and an edge represents an access relationship between at least one consumer of the consumers and at least one product of the products indicated in the dataset;
   receiving a query of the graph data to determine a product recommendation for a first consumer of the consumers;
   traversing the graph data from a vertex representing the first consumer through a plurality of edges to a plurality of vertices representing at least one product of the products based on at least one edge-type criterion;
   traversing the graph data from the plurality of vertices representing the at least one product of the products to a plurality of vertices representing other consumers based on the at least one edge-type criterion;
   traversing the graph data from the plurality of vertices representing the other consumers to a plurality of vertices representing other products of the products based on the at least one edge-type criterion;
   generating a product recommendation from one or more of the plurality of vertices representing the other products that meets at least one threshold criterion; and
   returning the product recommendation in response to the query.

2. The method of claim 1, wherein the product is a piece of media content.

3. The method of claim 1, wherein the product recommendation is for a piece of media content.

4. The method of claim 1, wherein the at least one edge-type criterion comprises at least one of a like relationship, an accessed relationship, a purchased relationship, and a viewed relationship.

5. The method of claim 1, further comprising:
   generating the graph data based on data from one or more database tables; and
   streaming the graph data for a SQL database over a network to an executing application.

6. The method of claim 1, further comprising receiving command-line parameters indicating at least one of a number of starting vertices, a number of recommendations to be generated, a number of traversals, and a number of media that must be shared in common between an ego and another consumer.

7. The method of claim 1, further comprising calculating a tally for each of the plurality of vertices representing other products.

8. The method of claim 7, wherein generating the recommendation further comprises:
   sorting and ranking the plurality of vertices representing other products; and
   generating the recommendation to include at least one of:
   all products associated with the plurality of vertices representing other products and their corresponding tallies;
   products with tallies above a predetermined ranking; and
   all products and their corresponding tallies, wherein the corresponding tallies are greater than a predetermined user-specified value.

9. A computing system for generating a product recommendation, the system comprising:
   one or more processors,
   a non-transitory computer-readable medium coupled to the one or more processors having instructions stored thereon that, when executed by the one or more processors, cause the one or more processors to perform a method for generating a product recommendation, the method comprising:
   retrieving a dataset comprising information associated with consumers and products from a database running on a database management system (DBMS) that supports execution of a query language;
   generating graph data indicating vertices and edges of a graph from the retrieved dataset, wherein the vertices represent the information associated with the consumers and products and an edge represents an access relationship between at least one consumer of the consumers and at least one product of the products indicated in the dataset;
   receiving a query of the graph data to determine a product recommendation for a first consumer of the consumers;
   traversing the graph data from a vertex representing the first consumer through a plurality of edges to a plurality of vertices representing at least one product of the products based on at least one edge-type criterion;
   traversing the graph data from the plurality of vertices representing the at least one product of the products to a plurality of vertices representing other consumers based on the at least one edge-type criterion;
   traversing the graph data from the plurality of vertices representing the other consumers to a plurality of vertices representing other products of the products based on the at least one edge-type criterion;
   generating a product recommendation from one or more of the plurality of vertices representing the other products that meets at least one threshold criterion; and
   returning the product recommendation in response to the query.

10. The computing system of claim 9, wherein the product is a piece of media content.

11. The computing system of claim 9, wherein the product recommendation is for a piece of media content.

12. The computing system of claim 9, wherein the at least one edge-type criterion comprises at least one of a like relationship, an accessed relationship, a purchased relationship, and a viewed relationship.

13. The computing system of claim 9, wherein the method further comprises:
   generating the graph data based on data from one or more database tables; and
   streaming the graph data for a SQL database over a network to an executing application.

14. The computing system of claim 9, wherein the method further comprises receiving command-line parameters indicating at least one of a number of starting vertices, a number of recommendations to be generated, a number of traversals, and a number of media that must be shared in common between an ego and another consumer.

15. The computing system of claim 9, wherein the method further comprises calculating a tally for each of the plurality of vertices representing other products.

16. The computing system of claim 15, wherein the method further comprises:
   sorting and ranking the plurality of vertices representing other products; and
   generating the recommendation to include at least one of:
      all products associated with the plurality of vertices representing other products and their corresponding tallies;
      products with tallies above a predetermined ranking; and
      all products and their corresponding tallies, wherein the corresponding tallies are greater than a predetermined user-specified value.

\* \* \* \* \*